(12) United States Patent
Nakaoka et al.

(10) Patent No.: US 7,370,090 B2
(45) Date of Patent: May 6, 2008

(54) PRINT PORTAL SYSTEM ON NETWORK

(75) Inventors: Yasushi Nakaoka, Nagano-ken (JP);
Masaaki Hanaoka, Nagano-ken (JP);
Masanori Mukaiyama, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/528,634

(22) Filed: Sep. 28, 2006

(65) Prior Publication Data

US 2007/0027990 A1    Feb. 1, 2007

Related U.S. Application Data

(63) Continuation of application No. 09/959,011, filed as application No. PCT/JP01/01218 on Feb. 20, 2001, now Pat. No. 7,266,590.

(30) Foreign Application Priority Data

| Feb. 21, 2000 | (JP) | ............................... 2000-42297 |
| Aug. 10, 2000 | (JP) | ............................... 2000-242396 |
| Aug. 10, 2000 | (JP) | ............................... 2000-242509 |
| Aug. 10, 2000 | (JP) | ............................... 2000-242560 |
| Aug. 10, 2000 | (JP) | ............................... 2000-242700 |
| Aug. 10, 2000 | (JP) | ............................... 2000-242876 |

(51) Int. Cl.
*G06F 15/16* (2006.01)
*G06F 3/12* (2006.01)
*G06F 1/00* (2006.01)
*G06G 17/00* (2006.01)

(52) U.S. Cl. .................... 709/219; 358/1.15; 705/400; 709/246

(58) Field of Classification Search ................ 709/219, 709/246; 358/1.15; 705/400
See application file for complete search history.

(56) References Cited

U.S. PATENT DOCUMENTS

| 5,509,074 | A | 4/1996 | Choudhury et al. |
| 5,655,152 | A | 8/1997 | Ohnishi et al. |
| 6,185,611 | B1 | 2/2001 | Waldo et al. |
| 6,208,427 | B1 | 3/2001 | Lee |

(Continued)

FOREIGN PATENT DOCUMENTS

JP          A 03-58219          3/1991

(Continued)

OTHER PUBLICATIONS

"Lets create Web page with Macromedia Flash!", ASCH, vol. 24, No. 4, pp. 372-375, Apr. 2000.

(Continued)

*Primary Examiner*—George C. Neurauter, Jr.
(74) *Attorney, Agent, or Firm*—Oliff & Berridge, PLC

(57) ABSTRACT

The technique of the present invention intermediates between an arbitrary client and an arbitrary printer connecting with a network to actualize practical printing works. A print portal system utilizing a server connected to the network intermediates between the client and the printer to execute a printing operation. The client outputs a printing requirement, which specifies print data of interest and a printer as an output resource, to the print portal system. The print portal system converts the input print data into data of a general purpose format, which does not depend upon the type of the printer, and transfers the converted print data to the specified printer.

9 Claims, 74 Drawing Sheets

U.S. PATENT DOCUMENTS

| | | |
|---|---|---|
| 6,278,528 B1 | 8/2001 | Ohtsuka et al. |
| 6,336,124 B1 | 1/2002 | Alam et al. |
| 6,618,772 B1 | 9/2003 | Kao et al. |
| 6,738,841 B1 | 5/2004 | Wolff |
| 6,801,340 B1 | 10/2004 | Endo |
| 7,266,590 B2 | 9/2007 | Nakaoka et al. |
| 2002/0041388 A1 | 4/2002 | Aoki |
| 2002/0138557 A1 | 9/2002 | Mukaiyama et al. |
| 2002/0161830 A1 | 10/2002 | Mukaiyama et al. |
| 2002/0186408 A1 | 12/2002 | Nakaoka et al. |
| 2007/0027990 A1 | 2/2007 | Nakaoka et al. |

FOREIGN PATENT DOCUMENTS

| | | |
|---|---|---|
| JP | A 04-65272 | 3/1992 |
| JP | A 04-192056 | 7/1992 |
| JP | A-5-143653 | 6/1993 |
| JP | A 06-89193 | 3/1994 |
| JP | A 06-175957 | 6/1994 |
| JP | A 06-195289 | 7/1994 |
| JP | A 06-324823 | 11/1994 |
| JP | A 07-121323 | 5/1995 |
| JP | A 07-200423 | 8/1995 |
| JP | A 07-239828 | 9/1995 |
| JP | A 07-329402 | 12/1995 |
| JP | A 08-101752 | 4/1996 |
| JP | A 08-179901 | 7/1996 |
| JP | A 08-272557 | 10/1996 |
| JP | A 09-006557 | 1/1997 |
| JP | A-9-50441 | 2/1997 |
| JP | A 09-81337 | 3/1997 |
| JP | A 09-130573 | 5/1997 |
| JP | A 09-146731 | 6/1997 |
| JP | A 09-223096 | 8/1997 |
| JP | A 09-288552 | 11/1997 |
| JP | A 09-330192 | 12/1997 |
| JP | A 10-16355 | 1/1998 |
| JP | A 10-55431 | 2/1998 |
| JP | A-10-107943 | 4/1998 |
| JP | A 10-161823 | 6/1998 |
| JP | A 10-161961 | 6/1998 |
| JP | A-10-171093 | 6/1998 |
| JP | A 10-171609 | 6/1998 |
| JP | A 10-191453 | 7/1998 |
| JP | A 10-222527 | 8/1998 |
| JP | A 10-224538 | 8/1998 |
| JP | A 10-232749 | 9/1998 |
| JP | A 10-232899 | 9/1998 |
| JP | A 10-260794 | 9/1998 |
| JP | A 10-301732 | 11/1998 |
| JP | A 10-312249 | 11/1998 |
| JP | A 10-319795 | 12/1998 |
| JP | A 10-326165 | 12/1998 |
| JP | A 11-015610 | 1/1999 |
| JP | A 11-31050 | 2/1999 |
| JP | A 11-95952 | 4/1999 |
| JP | A 11-119958 | 4/1999 |
| JP | A 11-138954 | 5/1999 |
| JP | A 11-143657 | 5/1999 |
| JP | A 11-146118 | 5/1999 |
| JP | A 11-161808 | 6/1999 |
| JP | A 11-192760 | 7/1999 |
| JP | A 11-194903 | 7/1999 |
| JP | A 11-249848 | 9/1999 |
| JP | A 11-249849 | 9/1999 |
| JP | A 11-249857 | 9/1999 |
| JP | A 11-249861 | 9/1999 |
| JP | A 11-259461 | 9/1999 |
| JP | A 11-309924 | 11/1999 |
| JP | A 11-312066 | 11/1999 |
| JP | A 11-316664 | 11/1999 |
| JP | A-11-316720 | 11/1999 |
| JP | A 11-327863 | 11/1999 |
| JP | A 11-348386 | 12/1999 |
| JP | A 11-353145 | 12/1999 |
| JP | A 2000-10747 | 1/2000 |
| JP | A 2000-35869 | 2/2000 |
| JP | A 2000-56936 | 2/2000 |
| JP | 2000-66854 | 3/2000 |
| JP | 2000-066984 A | 3/2000 |
| JP | 2000-067121 | 3/2000 |
| JP | A 2000-78328 | 3/2000 |
| JP | A 2000-94777 | 4/2000 |
| JP | A 2000-105678 | 4/2000 |
| JP | A 2000-112691 | 4/2000 |
| JP | A 2000-115435 | 4/2000 |
| JP | A 2000-137592 | 5/2000 |
| JP | A 2000-147676 | 5/2000 |
| JP | A 2000-148425 | 5/2000 |
| JP | A 2000-163243 | 6/2000 |
| JP | A 2000-172469 | 6/2000 |
| JP | A 2000-200163 | 7/2000 |
| JP | A 2000-200170 | 7/2000 |
| JP | A 2000-207164 | 7/2000 |
| JP | A 2000-222160 | 8/2000 |
| JP | 2000-276834 | 9/2000 |
| JP | A 2001-312388 | 11/2001 |
| JP | A-2002-55915 | 2/2002 |
| WO | WO 99/36835 | 7/1999 |

OTHER PUBLICATIONS

Kikuchi et al., "The Keitai Changes Again," Nikkei Electronics, Japan, Nikkei BP Corp., vol. 769, pp. 109-119, May 8, 2000.

PLACE OF ACCOMMODATION
(XX HOTEL)

Fig. 71

| Subjects of Authentication | Objects | Methods |
|---|---|---|
| User | • To identify accessed user as authorized user by print portal system<br>• To identify accessed user as user authorized to use pay contents<br>• To assure adequate charging and payment | Compare user information (ID, Password) with registration in user database |
| Content Provider | • To identify content provider as legal system user of print portal system<br>• To confirm if content to be printed is pay content | Compare content information (for example, URL) with registration in content provider database |
| Printing Service Provider | • To identify printing service provider as legal system user of print portal system<br>• To confirm if printing service provider is payment collector | Compare output resource information (for example, IP address) with registration in printer database |

PRINT PORTAL SYSTEM ON NETWORK

This is a Continuation of application Ser. No. 09/959,011 filed Oct. 17, 2001 now U.S. Pat. No. 7,266,590. The disclosure of the prior application is hereby incorporated by reference herein in its entirety.

TECHNICAL FIELD

The present invention relates to a technique of intermediating between client computers and printing apparatuses, both connected to a network, to execute printing operations via the network.

BACKGROUND ART

A variety of printers are used as an output device of computers. The printer is conventionally one-to-one connected to a computer via a specific cable like a two-way parallel interface (hereinafter referred to as 'local connection'), and receives data from the computer to carry out printing. With recent advancement of LANs (Local Area Networks), multiple printers connecting with a network share one or plural printers connected to the network.

Application of a certain protocol called IPP (Internet Printing Protocol) actualizes printing between an arbitrary client and an arbitrary printing apparatus, both connecting with the Internet. In this application, however, the output resource is restricted to printing apparatuses having known URIs (Uniform Resource Indicators). The simple application of IPP thus does not attain printing with the high utility that allows free choice of the output resource on the network.

In any of the known applications mentioned above, the state of connection of the printer with the computer is generally fixed. In other words, printing is typically carried out at a fixed location for each owner of the computer.

The recent development of the information infrastructure, such as the Internet, and the improvement in mobility of terminals used for access to the information infrastructure, such as mobile computers and cellular phones, enable access to information from any locations. In such circumstances, the technique of allowing free choice of the output resource for printing on the network has highly been demanded. One desired procedure uses a closest printing apparatus to carry out printing immediately after collection of information to be printed. Such a printing requirement should readily be executable from any mobile terminal.

In the structure of allowing free choice of the output resource on the network, however, there are a diversity of requirements as discussed below.

Requirements Relating to Transmission of Print Data

The print data is generally converted into print control data proper to each printer (hereinafter referred to as 'raw data') by a printer driver and supplied to the printer. In order to enhance the degree of freedom in selection of the printing apparatus, it is required to assure the flexibility of print data supplied to the printing apparatus.

Requirements Relating to Accuracy and Stability of Printing

The enhanced degree of freedom in selection of the output resource leads to the possibility that printing is carried out with an unintentional output resource due to wrong specification by the client. The printing apparatus specified as the output resource may be located at a place apart from the client. Even under such conditions, it is required to ensure successful printing. The printing system utilizing the printing apparatus requires various costs, for example, of expendables like printing paper and ink, power supply to the printing apparatus, and maintenance of the printing apparatus. Proper charging for these costs is required without mistakes.

Requirements Relating to Prevention of Illegal Printing

The enhanced degree of freedom in selection of the output resource leads to the possibility that faithless printing requirements damage the benefits of the owners of the respective printing apparatuses and the well-intentioned common users. This includes the case of non-required printing of an extremely large volume and the case of leaving prints uncollected after the user's output of a printing requirement. These cases are disadvantageous to the owners of printing apparatuses, since they can not properly charge for expendables like ink and paper. These cases are also disadvantageous to the well-intentioned common users, since the mass-volume printing interferes with normal use of the printing apparatuses.

In order to prevent illegal printing, it is required to make the relationship between the respective users and available printing apparatuses under certain management. An increase in number of available printing apparatuses as the possible options significantly increase the loading of management. The requirement is thus construction of a system that allows flexible selection among a large number of printing apparatuses, while avoiding an extreme increase in loading of management.

Requirements Relating to Enhancement of Utility

In the actual services, there are requirements to collectively print a plurality of contents. Especially in the case of printing gained information at any out-home or out-office place, collective printing of multiple contents is highly demanded to reduce the required printing time and printing cost and to simplify the required operations.

The user may desire to print an identical document at multiple places. Documents like catalogs, application forms, and estimate sheets used on business correspond to such requirements. If the user is required to always carry document data for printing such typical documents, this damages the utility of the printing environment that allows free choice of the output resource.

From these viewpoints, the requirement is thus construction of a system having high utility in the printing process.

Requirements Relating to Ensuring Accurate Delivery of Prints

In the printing environment that allows free choice of the output resource, there is a possibility that printing requirements from unspecific plural people are concentrated on one identical printing apparatus. It is thus required to ensure accurate delivery of resulting prints to the right users. It is also required to readily find the cause if the user receives a print different from the requirement.

Requirements Relating to Protection of Profits of Printer Owners

For example, it is assumed that a business proprietor locates a printer in a shop and provides printing services with this printer via the Internet. In such cases, there may be a business requirement that the shop owner who owns the printer desires to restrict printing of contents, which may benefit competitors' shops. There may also be another business requirement that the content provider who provides contents on Web pages via the Internet desires to restrict the output resource to printers located at specific shops. The requirement on business is thus the functionality of controlling the output resource and other printing conditions according to contents to be printed.

Each printing service provider naturally desires to make its services unique and different from those of other printing service providers. The system that allows arbitrary choice of the output resource should thus be constructed for each printing service provider who provides printing services. Under such circumstances, to attain the functionality of restricting output resources, individual registration is required between each content provider and each printing service provider who provides printing services. The registration work is remarkably troublesome when there are a large number of content providers and printing service providers.

DISCLOSURE OF THE INVENTION

The object of the present invention is to meet at least part of the requirements described above and to provide a printing system that allows free selection of an output resource for printing on a network. The present invention provides a print portal system that intermediates between multiple content provider servers and multiple printing apparatuses to execute a printing operation in response to an instruction from a client connected to a network.

The client is a hardware structure, which has the function of gaining access to the network and is used by a user of the print portal system. Personal computers and cellular phones are typical examples of the client.

The network of the present invention may be either a LAN (Local Area Network) or a WAN (Wide Area Network). The system of the present invention is especially effective for the wide area network like the Internet. In the description below, the server may represent a single server or a group of multiple servers that attain a diversity of processing in a distributed manner.

The present invention is directed to a first print portal system, which includes: multiple lower-layer portal modules that manage the multiple printing apparatuses and interact with one of the printing apparatuses under management, which is designated by the client, to transmit print data to the designated printing apparatus; and an upper-layer portal module that manages the multiple lower-layer portal modules and interacts with one of the lower-layer portal modules under management, which is designated by the client, to transmit the print data to the designated lower-layer portal module. Namely the first print portal system uses the two different layers, that is, lower-layer portal servers including the lower-layer portal modules and an upper-layer portal server including the upper-layer portal module, to attain the intermediate of printing.

The upper-layer portal server included in the first print portal system has: a lower-layer portal server management module that manages a plurality of lower-layer portal servers, which manage the multiple printing apparatuses and interact with a selected one of the printing apparatuses under management to transmit print data to the selected printing apparatus; and an upper-layer portal module that transmits the print data from one of the content provider servers to one of the lower-layer portal servers, which is designated by the client.

Here the printing apparatus represents a unit including a printer as the hardware structure to execute printing and a controller for controlling the operations of the printer, for example, a computer. In the process of printing with a printer, a printer driver generally functions to convert print data into control signals proper to the printer (hereinafter referred to as raw data) and transfer the raw data to the printer. Namely the printing apparatus represents a unit that carries out conversion into raw data and executes printing.

The functions of the lower-layer portal module include the function of monitoring the state of each printing apparatus and the function of controlling a printing requirement transmitted from the upper-layer portal module. The former function collects the working status of each printing apparatus via communication and transmits the printing requirement only to an available printing apparatus that stands by for printing. This function enhances the reliability of printing on the network. Namely this function effectively prevents the printing requirement from being output to an unavailable printing apparatus, thus reducing potential troubles that the user can not receive proper prints.

The latter function, for example, keeps a log relating to the output, changes the output resource of the printing requirement, or cancels the printing requirement. This function is different from the spooler function, since the function of the present invention does not manage the print data kept in the lower-layer portal module but manages the print data transmitted to the printing apparatus. This function flexibly handles a diversity of user's requirements in the process of printing, for example, a change of the printing apparatus specified as the output resource or cancellation of the printing requirement.

The lower-layer portal module may have the proper functions set for printing with printing apparatuses under its own management. Such proper functions include, for example, a function of appropriately laying out multiple contents specified as the object of printing on the surface of paper and printing the laid-out contents and a function of adding a preset banner advertisement to a content and printing the content with the banner advertisement. In the system of the present invention, the multiple lower-layer portal modules may be owned by different business proprietors. Each lower-layer portal module may thus give services with additional values proper to each business proprietor.

The upper-layer portal module is a unit that places a plurality of lower-layer portal modules under management and transmits print data to one of the lower-layer portal modules based on a specification by the client. The print data is transferred to the printing apparatus for printing, through the upper-layer portal module and the lower-layer portal module. The upper-layer portal module functions as an interface in communication between the content provider server and the client. Namely the upper-layer portal module provides a common interface to the multiple lower-layer portal modules. The upper-layer portal module comprehensively carries out diverse controls required on business, for example, restricting available printing apparatuses for each content provider or for each user. Neither the content providers nor the users are required to individually register with each printing service provider, but flexibly use diverse printing services only through access to the upper-layer portal module. The arrangement of the present invention ensures such utility without damaging the unique characteristics of each printing service provider that owns the lower-layer portal module.

The upper-layer portal module also gives advantages to printing service providers. For successful business, the printing service provider is required to increase the number of users who utilize the printing service and to expand the range of available print data or contents. Significant loading is imposed on each service provider who individually tries the business expansion. In the print portal system of the present invention, on the other hand, the upper-layer portal module manages all the content providers and the users. The arrangement of this system readily increases the number of system users by simply asking the content providers and the users to utilize the printing service. The upper-layer portal module accordingly provides the environment that allows easy expansion of the cooperation of the content providers, the users, and the printing service providers in the printing system via the network.

In accordance with one preferable application of the first print portal system, the upper-layer portal module has an interface providing unit that provides an interface window, which is displayed on the client in the course of the printing operation, according to a format common to the plurality of lower-layer portal servers.

This arrangement enhances the utility of printing service via the network. Providing an interface window according to a common format enables the user to utilize the printing services provided by the diverse lower-layer portal modules through similar operations.

The interface according to the common format does not mean that the details of the display are restricted to any uniform pattern. Only requirement is unification of basic operations and corresponding displays, such as the selection of a desired printing apparatus and the specification of print data.

It is also desirable that the print portal server has the function of customizing the interface. In the case of a user who generally specifies a restricted number of printing apparatuses, customization is desirable to preferentially display the generally used printing apparatuses in the interface for selecting the output resources. This enhances the utility.

In accordance with another preferable application of the first print portal system, the print portal server further includes: an input module that receives address information representing an address of the print data on the network from the client; and a data fetching module that fetches the print data via the network, based on the address information.

A URL (Uniform Resource Locator) or an IP address of a mail server may be used for the address information. The client is required to specify only the address information for printing. The arrangement thus enhances the utility. This application is especially effective for the client having a relatively poor storage capacity. The application utilizing the address information may be used to print electronic mail data stored in a mail server or data accumulated in a server for display of Web pages.

In accordance with still another preferable application of the first print portal system, the print portal server further includes: a print data receiving module that is capable of receiving the print data following any of a plurality of different formats via the network; and a converted data gaining module that gains the print data converted into a predetermined general purpose format. The upper-layer portal module interacts with the designated lower-layer portal server to transmit the converted print data to the designated lower-layer portal server.

Each printing apparatus generates raw data proper to the printing apparatus according to a general purpose format and carries out printing. This application enables diverse printing apparatuses to be included in a list of available output resources. The arrangement does not require the client to possess the function of conversion into raw data, thus enhancing the utility.

The general purpose format may be PDF or a page description language like PostScript (registered trademark). Such format allows the layout of a print to be kept rather easily. Such format is capable of converting any print data, so that the technique of the present invention is applicable to a diversity of print data.

A second print portal system of the present invention utilizes a print portal server that intermediates between multiple content provider servers and multiple printing apparatuses to execute a printing operation in response to an instruction from a client connected to a network. The print portal server includes: an input module that receives a printing requirement including designation of a printing apparatus as an output resource from the client; a management module that discriminates a first class of a printing apparatus under management of the print portal server from a second class of a printing apparatus under management of another print portal server; and a job control module that, when the designated printing apparatus is included in the first class, interacts with the designated printing apparatus to transmit the printing requirement to the designated printing apparatus, and when the designated printing apparatus is included in the second class, interacts with the another print portal server to transmit the printing requirement to the another print portal server.

The print portal server may have a double-layered structure including an upper layer and a lower layer like the first print portal system, or may alternatively have a single-layered structure.

The second print portal system readily attains extension of the system by combining a plurality of print portal servers.

For example, it is assumed that a plurality of print portal servers connected to individual clients and printing apparatuses are present on the network. In the arrangement of the second print portal system, the management module of one print portal server and the management module of another print portal server share information. The management module regards the printing apparatus of the second class, that is, the printing apparatus under management of another print portal server, as the object of its own management, while storing the name of the another print portal server that actually manages the printing apparatus of the second class. The management module thus causes printing apparatuses of the second class to be included in the list of available printing apparatuses submitted to the client. When the client specifies a printing apparatus of the second class as the output resource, the second print portal system transfers the printing requirement to another print portal server that manages the printing apparatus of the second class. This arrangement thus readily attains the intermediate of printing.

A third print portal system of the present invention utilizes a print portal server that intermediates between multiple content provider servers and multiple printing apparatuses to execute a printing operation in response to an instruction from a client connected to a network. The print portal server includes: a first input module that receives at least specific information for specifying print data from the client; a second input module that receives designation information for specifying a printing apparatus, which is designated by the client as an output resource, from the client after the input of the specific information; and a portal module that interacts with the designated printing apparatus to transmit the print data to the designated printing apparatus, based on the designation information.

The print portal server may have a double-layered structure including an upper layer and a lower layer like the first print portal system, or may alternatively have a single-layered structure.

The third print portal system enables the output resource to be specified after the acceptance of the input of print data. This arrangement ensures flexible selection of the output resource by taking into account the relation to the print data.

For example, it is assumed that this system is applied to print a content provided by the content provider server. A content may have restriction of printing conditions, such as the availability of color printing, the availability of double-face printing, or the paper size. In the structure of transmitting print data after specification of the printing apparatus, there is a possibility that the printing operation is rejected, because of the restriction. The third print portal system specifies the printing apparatus by taking into account such restriction, thus enhancing the utility. In one possible modification, the first input module may input information for specifying a printing condition as well as print data, whereas the second input module may determine whether or not the designation information of the printing apparatus is suitable, based on the printing condition.

Another advantage of the third print portal system is to allow specification of the printing apparatus at a different timing from the timing of specification of print data. For example, the user first specifies print data and issues a printing requirement when finding a content to be printed. The user then specifies the printing apparatus when finding an available printing apparatus. In the structure of allowing the time interval between the specifications, it is desirable that identification information, such as a user ID or a job number, is used to map the specification of the print data to the specification of the printing apparatus.

The print portal system of the present invention may be constructed to facilitate issuance of a printing requirement.

A fourth print portal system of the present invention utilizes a Web server as the content provider server.

The Web server connects with a network, wherein a print portal server is connected to the network to transmit data supplied from the Web server to a printing apparatus connecting with the network and thereby execute a printing operation with the printing apparatus. The Web server has a data supply module that supplies data for displaying a predetermined Web page via the network. The Web page includes link information on a link to a preset print portal server connected to the network.

The print portal server may have a double-layered structure including an upper layer and a lower layer like the first print portal system, or may alternatively have a single-layered structure.

The fourth print portal system allows issuance of a printing requirement, based on the link information provided by the Web server. When the user finds a content to be printed on a Web page, this arrangement enables the user to immediately output a printing requirement on the Web page, thus advantageously enhancing the utility of the print portal system.

In accordance with one preferable application of the fourth print portal system, the Web server further has a transfer module that transfers at least specific information for specifying the Web server on the network to the preset print portal server, in response to a request based on the link information.

The transfer module functions to smoothen the printing process.

A fifth print portal system of the present invention utilizes a Web page browsing apparatus as the client.

The Web page browsing apparatus connects with a network, wherein a print portal server is connected to the network to transmit data supplied from a predetermined Web server to a printing apparatus connecting with the network and thereby execute a printing operation with the printing apparatus. The Web page browsing apparatus includes: a display unit that displays a predetermined Web page via the network; and a requirement output unit that outputs a printing requirement, which does not include information for specifying a printing apparatus as an output resource but includes information for specifying the predetermined Web page under display to the print portal server.

The Web page browsing apparatus of the present invention enables the user to readily output a printing requirement, while browsing Web pages. The Web page provided by the content provider server is not required to include the link information. This arrangement advantageously relieves the load of the content provider server.

The Web page browsing apparatus is constructed by, for example, installing software called a browser on the hardware structure, such as a personal computer. The browser having the above functions thus allows construction of the Web page browsing apparatus of the present invention. The technique of the present invention is accordingly attained by a software providing the browsing functions of Web pages or a module exerting the functions of the requirement output unit.

A sixth print portal system of the present invention utilizes a print portal server that intermediates between multiple content provider servers and multiple printing apparatuses to transmit print data therebetween and execute a printing operation in response to an instruction from a client connected to a network. The print portal server includes: an input module that receives printing conditions from at least two designators among the printing apparatus, the client, and the content provider server; a condition selection module that selects one of the input printing conditions, based on a preset priority order assigned to designators of the printing conditions; and a portal module that transmits the print data together with the selected printing condition.

In the print portal system of the present invention, each designator may specify the printing conditions. Here the printing conditions represent, for example, the settings of printing paper, availability of color printing, and availability of double-face printing. In some cases, different designators may specify contradictory printing conditions. The sixth print portal system selects the printing conditions by taking into account the priority order.

The priority order may be set arbitrarily.

For example, the setting may give the higher priority to the printing apparatus than the client.

In another example, the setting may give the higher priority to the content provider server than the client.

The print portal system of the present invention may be constructed to allow specification of the output resource.

A seventh print portal system of the present invention utilizes a print portal server that intermediates between multiple content provider servers and multiple printing apparatuses to transmit print data therebetween and execute a printing operation in response to an instruction from a client connected to a network. The print portal server includes: a storage module that maps address information for specifying an address of each printing apparatus on the network to identification information allocated to the each printing apparatus irrespective of the address information, and stores the mapping; an input module that inputs the identification information from the client; and a portal module that transmits the print data, based on the address information mapped to the input identification information.

The seventh print portal system utilizes the identification information to make the printing apparatus apparently hidden from the network. This arrangement effectively reduces illegal accesses to the printing apparatus, while ensuring the high degree of freedom in selection by legal users who gain the identification information.

The address information may be a URI utilized in IPP or an IP address utilized in TCP/IP, which is the standard protocol of the Internet. The identification information may be an arbitrary number or an arbitrary sequence of letters set irrespective of the address information.

An eighth print portal system of the present invention utilizes a print portal server that intermediates between multiple content provider servers and multiple printing apparatuses to transmit print data therebetween and execute a printing operation in response to an instruction from a client connected to a network. The print portal server includes: a database that classifies the multiple printing apparatuses into groups of a hierarchical structure and manages the printing apparatuses; and an interface providing module that provides the client with an interface window for successively specifying the printing apparatuses from a top-most layer in the hierarchical structure.

This arrangement allows the user's sequential selection in the hierarchical structure, thus facilitating the specification of a printing apparatus meeting the user's requirement.

A ninth print portal system of the present invention utilizes a print portal server that intermediates between multiple content provider servers and multiple printing apparatuses to transmit print data therebetween and execute a printing operation in response to an instruction from a client connected to a network. The print portal server includes: a database that manages preset attribute information assigned to each printing apparatus; an input module that receives a selection condition for selecting one of the printing apparatuses from the client; and a retrieval module that retrieves a printing apparatus suitable for the selection condition based on the database, and provides the client with a result of the retrieval.

When a mobile terminal is used as the client, input of positional information regarding the position of the mobile terminal leads to retrieval of the location of a nearby printing apparatus. When different prices are set in different printing apparatuses, the price may be used for the selection condition of retrieval. The performance of the printing apparatus, such as the availability of color/monochromatic printing or the resolution, may be used for the selection condition of retrieval. The arrangement of locating a desired printing apparatus based on the diverse selection conditions desirably enhances the utility of the printing service.

In accordance with one preferable application of the ninth print portal system, the print portal server further has: a receiver module that receives designation of a printing apparatus as an output resource from the client, based on the result of the retrieval; and a portal module that transmits the print data to the designated printing apparatus.

There is a degree of freedom in user's final selection of the printing apparatus. This arrangement thus enhances the utility.

A tenth print portal system of the present invention utilizes a print portal server that intermediates between multiple content provider servers and multiple printing apparatuses to transmit print data therebetween and execute a printing operation in response to an instruction from a client connected to a network. The print portal server includes: a registration module that registers requirement source identification information for identifying at least one of a user who desires the printing operation, the client, and the print data; an input module that accepts an input of the requirement source identification information via an information collector unit provided in the printing apparatus for input of external information; and an output resource specification module that compares the input information with the requirement source identification information registered in the registration module and thereby specifies an output resource for the printing operation.

The requirement source identification information may be a user ID or a user password as information for identifying the user, an IP address or an MAC address of the client or ID information proper to the client as information for identifying the client, or a job number assigned to the print data as information for identifying the print data.

The tenth print portal system receives information for identifying the output source from the output source and actually identifies the output source via the reverse pathway. This arrangement enables the user to readily specify the printing apparatus, while advantageously preventing output with an unintentional printing apparatus due to wrong specification.

For example, a keyboard, a touch panel, or another interface provided in the printing apparatus may be used for the information collector unit.

In the tenth print portal system, the information collector unit may be a radio communication circuit that is capable of receiving and transmitting information when the client is located in a neighborhood of the printing apparatus.

For example, infrared or Bluetooth (trademark) is usable for this purpose.

The print portal system of the present invention may be constructed to reduce the possibility of wrong specification by the user and enhance the accuracy of printing.

An eleventh print portal system of the present invention utilizes a print portal server that intermediates between multiple content provider servers and multiple printing apparatuses to transmit print data therebetween and execute a printing operation in response to an instruction from a client connected to a network. The print portal server includes: an input module that receives a printing requirement from the client; an execution confirmation module that displays at least part of information included in the printing requirement and asks the client to confirm whether or not a printing operation is to be executed in response to the printing requirement; and a portal module that transmits the print data when the client gives an instruction to execute printing in response to a requirement for the confirmation.

The eleventh print portal system carries out printing after the user's confirmation, thus enhancing the accuracy of printing under the conditions meeting the user's intention.

For example, display of the output resource specified by the user enhances the accuracy with regard to the specification of the output resource. In the case of printing with a high degree of freedom in printing conditions and output resource between the client and the printing apparatus connecting with the network, there is a possibility that a printing apparatus against the intention of the user is used for printing. Such wrong output is not allowable for prints with high secrecy. The eleventh print portal system requires the user to check the specified output resource prior to actual printing. This arrangement effectively prevents wrong specification of the output resource.

In the eleventh print portal system, the print portal server further has a cost calculation module that calculates a cost required for the printing operation in response to the printing requirement, and the execution confirmation module displays the cost.

This arrangement enables the user to obtain prints within a cost meeting the user's intention without a fear of being charged an unexpectedly high cost.

A twelfth print portal system of the present invention utilizes a print portal server that intermediates between multiple content provider servers and multiple printing apparatuses to transmit print data therebetween and execute a printing operation in response to an instruction from a client connected to a network. The print portal server includes: an input module that receives the print data and a printing requirement including specification of a printing apparatus from the client; a test print output module that outputs preset data, which is different from the print data, to the specified printing apparatus for test printing, prior to actual printing of the print data; and a portal module that transmits the print data to the specified printing apparatus when the client confirms that the test printing is normal.

The preset data may be advertisement data.

The test printing is used to check the specification in the printing apparatus. The test printing using the preset data different from the print data assures the secrecy of the print data even in the case of wrong specification in the printing apparatus.

A thirteenth print portal system of the present invention utilizes a print portal server that intermediates between multiple content provider servers and multiple printing apparatuses to transmit print data therebetween and execute a printing operation in response to an instruction from a client connected to a network. The print portal server includes: an input module that receives a printing requirement, which includes specification of a printing apparatus as an output resource, from the client; a working state detection module that detects a working state of the specified printing apparatus; and a prohibition module that prohibits the transmission of the print data, when the detected working state falls into a preset condition that possibly causes failure of printing.

The thirteenth print portal system intends to ensure accuracy of printing. In the system of printing via the network, there is a possibility that the client is apart from the printing apparatus specified as the output resource. Such separation may prevent the user from directly observing the status of the specified printing apparatus. The thirteenth print portal system prohibits the printing operation when the printing apparatus is under the condition that possibly causes failure of printing. This arrangement effectively reduces failure of printing via the network.

The preset condition that possibly causes failure of printing may be insufficiency of ink or toner, insufficiency of printing paper, or wear of a movable part used for printing, such as a drum. The preset condition may be determined by comprehensively considering these conditions or by utilizing only one of these conditions. A diversity of known techniques may be applied to detect the working state via communication.

The determination of whether or not the working state falls into the preset condition may be absolute or relative. An example of the absolute method determines that the working state falls into the preset condition that possibly causes failure of printing, when the remaining quantity of ink becomes less than a preset level. An example of the relative method detects insufficiency of ink, based on the comparison between the remaining quantity of ink and the print data specified by the client. In this method, it is determined that the working state may cause failure of printing, when the print data requires a greater volume than a certain quantity of ink. It is, however, determined that the working state does not cause failure of printing, when the print data requires a smaller volume than the certain quantity of ink.

In the thirteenth print portal system, it is desirable that the prohibition module informs the client of the detected working state.

The user is thus notified of the current status of the specified printing apparatus. This arrangement enhances the utility of printing via the network. The information may be given to the client in various forms, for example, in the form of a display or in the form of an alarm.

A fourteenth print portal system of the present invention utilizes a print portal server that intermediates between multiple content provider servers and multiple printing apparatuses to transmit print data therebetween and execute a printing operation in response to an instruction from a client connected to a network. The print portal server includes: an input module that receives specification of a printing apparatus as an output resource and a printing condition from either one of the client and the content provide server; a working state setting module that sets a working state of the specified printing apparatus to be suited to the specified printing condition; and a portal module that transmits the print data to the specified printing apparatus, when it is confirmed that the working state is suited to the specified printing condition.

Like the thirteenth print portal system, the fourteenth print portal system intends to ensure accuracy of printing. In the structure of specifying a desired printing apparatus on the network, the user may not be allowed to directly set printing conditions, such as the size of printing paper. The fourteenth print portal system enables the setting of the working state of the specified printing apparatus to be suited to the printing condition specified by the client. For example, the system selects a paper tray corresponding to the desired paper size for printing.

The fourteenth print portal system raises the degree of freedom in user's setting of the printing condition, thus further enhancing the utility of printing via the network. When no size selection of printing paper is allowed, that is, when the size of printing paper printable with each printing apparatus is restricted to one size, the user is required to find the output resource that uses the printing paper of the user's desired size or to accept printing on a different size of printing paper. In the fourteenth print portal system, each printing apparatus has a plurality of available paper sizes and allows setting of a desired paper size. This arrangement ensures printing in a desired specification with an arbitrary printing apparatus, thus significantly enhancing the utility.

A fifteenth print portal system of the present invention utilizes a print portal server that intermediates between multiple content provider servers and multiple printing apparatuses to transmit print data therebetween and execute a printing operation in response to an instruction from a client connected to a network. The print portal server includes: an input module that receives a printing requirement, which includes identification of a user who issues the printing requirement and of the print data and specification of a printing apparatus as an output resource; an input source identification information generator module that generates input source identification information, which includes information proper to at least either one of the user and the print data; and a portal module that transmits the input source identification information and the print data to the specified printing apparatus.

The input source identification information includes at least one of information for identifying the user (hereinafter referred to as 'user information') and source information. The user information includes the name of the user and a user ID allocated to the user for the use of the system. The source information includes the URL (Uniform Resource Locator) of a specified content and the name of the content.

The fifteenth print portal system causes the input source identification information to be printed with the print data. This arrangement effectively prevents confusion of prints between plural users, when printing requirements from the plural users are concentrated on an identical printing apparatus. This arrangement effectively ensures accurate delivery of a resulting print to the right user in the case of printing a document with high secrecy.

The arrangement of printing the source information facilitates confirmation of whether the resulting print matches the printing requirement. When the resulting print is different from the user's requirement, this arrangement enables an error, if any, to be readily found in the specification of the print content.

In the fifteenth print portal system, the input source identification information generator module may combine the input source identification information with a marginal area of the print data, or may generate the input source identification information as data to be printed in a different page from a printed page of the print data.

The former arrangement generates composite data including the input source identification information combined with the marginal area of the print data. In the case where the print data has the volume of multiple pages, the input source identification information may be printed in every page or in only one or plural specified pages. The latter arrangement provides data of a general purpose format corresponding to the page including the input source identification information. This data is attached to either the head or the end of the print data and is output to the printing apparatus.

In accordance with one preferable application of the fifteenth print portal system, the portal module transmits the print data and the input source identification information to the specified printing apparatus according to a predetermined general purpose format.

The input source identification information may be generated at any timing, that is, before, during, or after the conversion into the general purpose format.

A sixteenth print portal system of the present invention utilizes a print portal server that intermediates between multiple content provider servers and multiple printing apparatuses to transmit print data therebetween and execute a printing operation in response to an instruction from a client connected to a network. The print portal server includes: a management module that manages authentication of at least one of a user of the client, each of the content provider servers, and each of the printing apparatuses as a legal system user with a permission to use the print portal server; and a portal module that carries out the intermediation only between legal system users with the permission to use the print portal server, based on information of the management module.

In the structure that allows free selection of the output resource on the network, it is required to prevent illegal accesses in practice. The sixteenth print portal system effectively prevents such illegal accesses. Namely the sixteenth print portal system allows only the authenticated system users to use the system for printing. The print portal system totally manages the authentication of the system users. This arrangement ensures effective prevention of illegal accesses.

A seventeenth print portal system of the present invention utilizes a print portal server that intermediates between multiple content provider servers and multiple printing apparatuses to transmit print data therebetween and execute a printing operation in response to an instruction from a client connected to a network. The print portal server includes: a management module that manages authentication for access between at least two of a user of the client, each of the content provider servers, and each of the printing apparatuses; and a portal module that carries out the intermediation only in an authenticated range of access, based on information of the management module.

Like the sixteenth print portal system, the seventeenth print portal system effectively prevents illegal accesses. The sixteenth print portal system controls the permission to use the system. The seventeenth print portal system, on the other hand, controls the authentication for access between the system users. For example, the latter technique is effectively applied for restriction of printing with a specific printing apparatus or printing of a specific content to selected users.

An eighteenth print portal system of the present invention utilizes a print portal server that intermediates between multiple content provider servers and multiple printing apparatuses to transmit print data therebetween and execute a printing operation in response to an instruction from a client connected to a network. The print portal server includes: an input module that receives a printing requirement from the client; a decision module that determines whether or not a user who issues the printing requirement is located in a neighborhood of any of the printing apparatuses; and a portal module that transmits the print data, when it is determined that the user is located in the neighborhood of a printing apparatus.

In the eighteenth print portal system of the present invention, the printing operation is carried out, provided that the user is located in the vicinity of the specified printing apparatus. This arrangement effectively reduces faithless printing requirements. The faithless printing requirement is, for example, a requirement for a specific printing apparatus to print a large volume, while resulting prints are not necessary.

In accordance with one preferable application of the eighteenth print portal system, the decision module has an identification information input unit that receives identification information, which is proper to each of the printing apparatuses and is shown on surface of the printing apparatus, from the client. The decision module carries out the determination, based on the input identification information.

The ID code shown on the surface of each printing apparatus is generally observable only from the vicinity of the printing apparatus. Input of this ID code accordingly proves that the user is located in the vicinity of the printing apparatus. The ID code may be identical with information for specifying a printing apparatus as an output resource, or may be provided separately from such information. In order to maintain the effect of preventing faithless printing requirements, it is desirable to change the ID code at preset timings.

In accordance with another preferable application of the eighteenth print portal system, the decision module has a specific information input unit that receives specific information for identifying either one of the client and its user via an interface provided in the printing apparatus for collecting external information. The decision module carries out the determination, based on the input specific information.

In this application, the specific information input unit may be a radio communication circuit that is capable of receiving and transmitting information when the client is in the vicinity of the printing apparatus.

A nineteenth print portal system of the present invention utilizes a print portal server that intermediates between multiple content provider servers and multiple printing apparatuses to transmit print data therebetween and execute a printing operation in response to an instruction from a client connected to a network. The print portal server includes: an input unit that receives information for identifying an address of charging a printing cost from the client, prior to actual execution of the printing operation; and a portal module that transmits the print data in response to the input.

Requirement for input of account information effectively reduces faithless printing requirements. Even in the case of a faithless printing requirement, the system charges the user with certainty for the printing operation corresponding to the printing requirement. This arrangement thus protects the owner of the printing apparatus from the potential loss of the profit. The account information may be the number of a credit card, the number of a bank account permitted to use for settlement of the printing cost, or a password exclusively used for accounting.

The technique of the present invention is not restricted to the applications of the print portal system and the print portal server discussed above, but may be actualized as corresponding print portal methods. The present invention may also be attained by programs for causing the server to exert the functions discussed above, a diversity of signals equivalent to the programs, and recording media in which such programs are recorded. Typical examples of the recording media include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

BRIEF DESCRIPTION OF THE DRAWINGS

FIG. 71 shows objects and methods of authentication;

BEST MODES OF CARRYING OUT THE INVENTION

Figure 1:
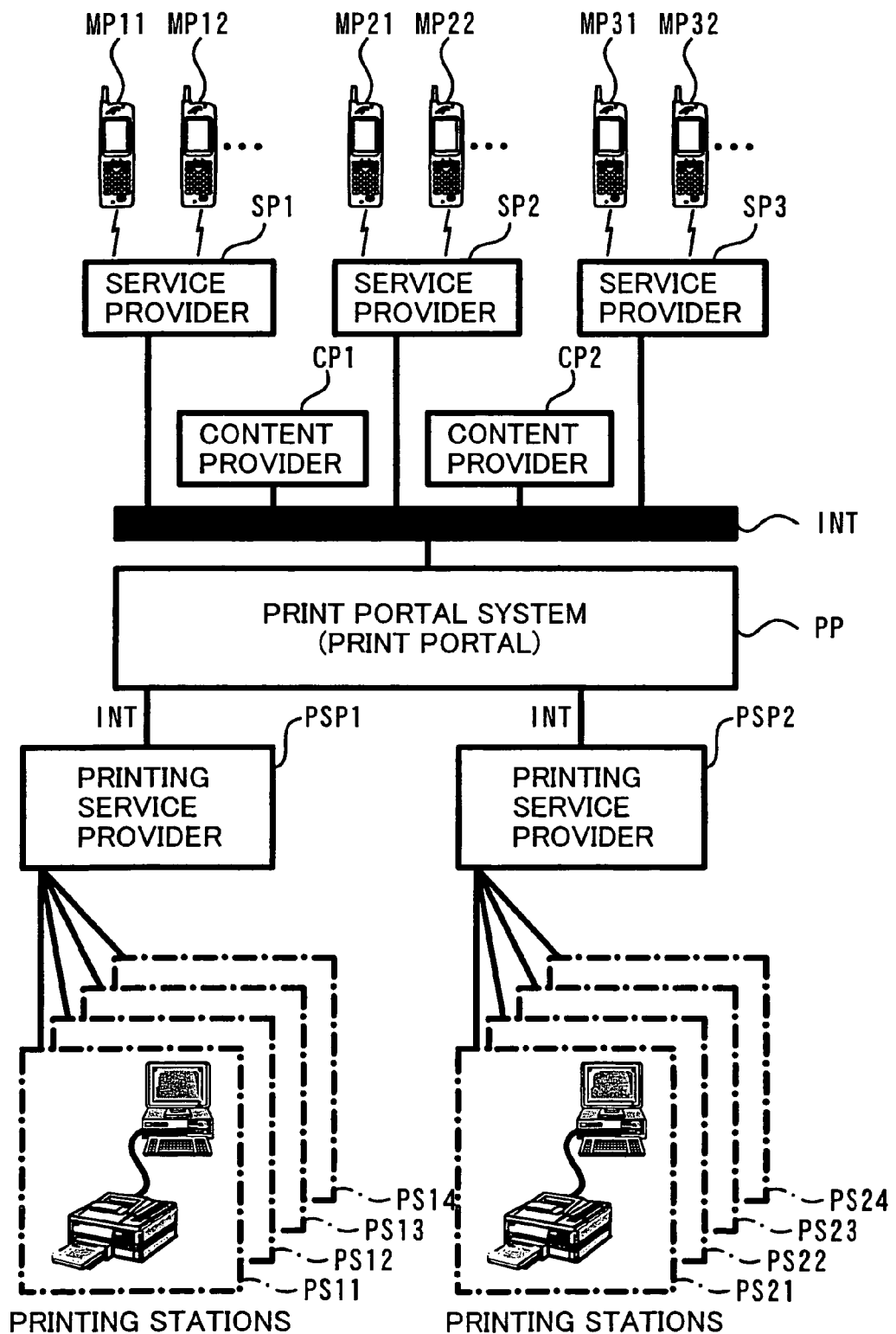
FIG. 1 illustrates the general architecture of a printing system.

Some modes of carrying out the invention are discussed below in the following sequence:

A. Basic System Architecture
  A1. Overview of System
  A2. Functionality
  A3. Configuration of Functional Blocks
  A4. Connection with Printing Service Provider
  A5. Print request
  A6. File Conversion B. Examples of Printing
  B1. Printing Mails
  B2. Printing Web Pages
  B3. Printing Tickets
  B4. Printing User's Own Documents
  B5. Delivery of Electronic Newspapers (1)
  B6. Delivery of Electronic Newspapers (2)
  B7. Image Processing Service C. Various Processes of Designating Output resource D. Additional Functionality of Printing
  D1. Addition of Input Source ID Information
  D2. Layout Print
  D3. Addition of Ad E. Customization Functionality
  E1. Customization Functionality for Users
  E2. Customization Functionality for Content Providers
  E3. Customization Functionality for Printing Stations F. Settings of Printing Conditions G. Accounting
  G1. Accounting
  G2. Authentication H. Maintenance and Management of Printers I. Mediation via Single-Layer Server A. Basic System Architecture A1. Overview of System FIG. 1 illustrates the general architecture of a printing system. This embodiment regards the system that executes printing via the Internet. The similar architecture may be applicable to a relatively limited network environment, such as a LAN (Local Area Network) or computer communication.

In the system of this embodiment, a diversity of servers and clients are connected to the Internet INT. For convenience of explanation, the connection is shown in a hierarchical manner, but the respective constituents enable mutual transmission of information via the Internet INT. For clarity of illustration and explanation, only a limited number of constituents are shown, although there is no limit of in number of connections. The technique of the embodiment executes a printing operation with an arbitrary printer under the system architecture including a large number of servers and clients connected with one another via the Internet INT.

This embodiment uses, as the clients, mobile phones MP11, MP12, MP21, MP22, MP31, MP32 having the access functionality to the Internet. Each of these mobile phones, for example, MP11 gains access to the Internet via any of service providers SP1, SP2, and SP3. The clients are not restricted to the mobile phones but may be personal computers.

Content providers CP1 and CP2 are also connected to the Internet INT. In the system of this embodiment, these content providers, for example, CP1, provide contents to be printed. The content providers include Web page providers on the Internet INT.

In the system of this embodiment, printing stations, for example, PS11, are output resources. The printing stations like PS11 represent printers that enable transmission of data via the Internet. The printing station is constructed, for example, by combining a computer connected to the Internet with a printer locally connected to the computer. The printing stations may be located in rather private spaces with relatively limited users like individual houses and offices or in rather public spaces like stores and hotels.

In the system of this embodiment, in response to an instruction from the client MP11, contents provided by the content provider CP1 are transmitted to the printing station, which executes an actual printing operation. Two different-layered servers, that is, upper-layer and lower-layer servers, mediate data between the clients and the printing stations.

In the illustrated example, the upper-layer server is a printing mediation system (print portal) PP, and the lower-layer servers are printing service providers PSP1 and PSP2.

The lower-layer servers, such as the printing service provider PSP1, function to manage the printing stations like PS11. In the illustrated example, the printing service provider PSP1 manages printing stations PS1 to PS14, whereas the printing service provider PSP2 manages printing stations PS21 to PS24. In the case where the printing stations like PS11 are located in individual stores, for example, the respective printing service providers PSP1 may be owned by different business proprietors. A business proprietor A owns the printing service provider PSP1 and manages the printing stations PS11 to PS14 located in its head quarter and branch shops. A business proprietor B owns the printing service provider PSP2 and manages the printing stations PS21 to PS24. Such arrangement enables each business proprietor to manage its own printing stations and supply unique services relating to the mediation of print data, for example, discount service.

The upper-layer server, that is, the print portal PP, manages the printing service providers PSP1 and PSP2. The print portal PP thus indirectly manages the printing stations like PS11 via the printing service providers PSP1 and PSP2. The upper-layer server provides common functionality even when the printing service providers PS1 and PS2 are run by the different business proprietors. For example, the upper-layer server provides a standard interface in response to a print request from the client MP11. This desirably enhances the utility of the users.

The upper-layer server and the lower-layer server are functionally parted from each other, and each server may not be constructed as a single server. The functionality of the upper-layer server and the lower-layer server discussed below may be distributed into multiple servers.

A2. Functionality

The internal structure of each constituent included in the system of the embodiment will be discussed later. In order to elucidate the functionality of the servers and the other constituents, the following description regards a concrete example of printing E mails utilizing the print portal.

Figure 2:
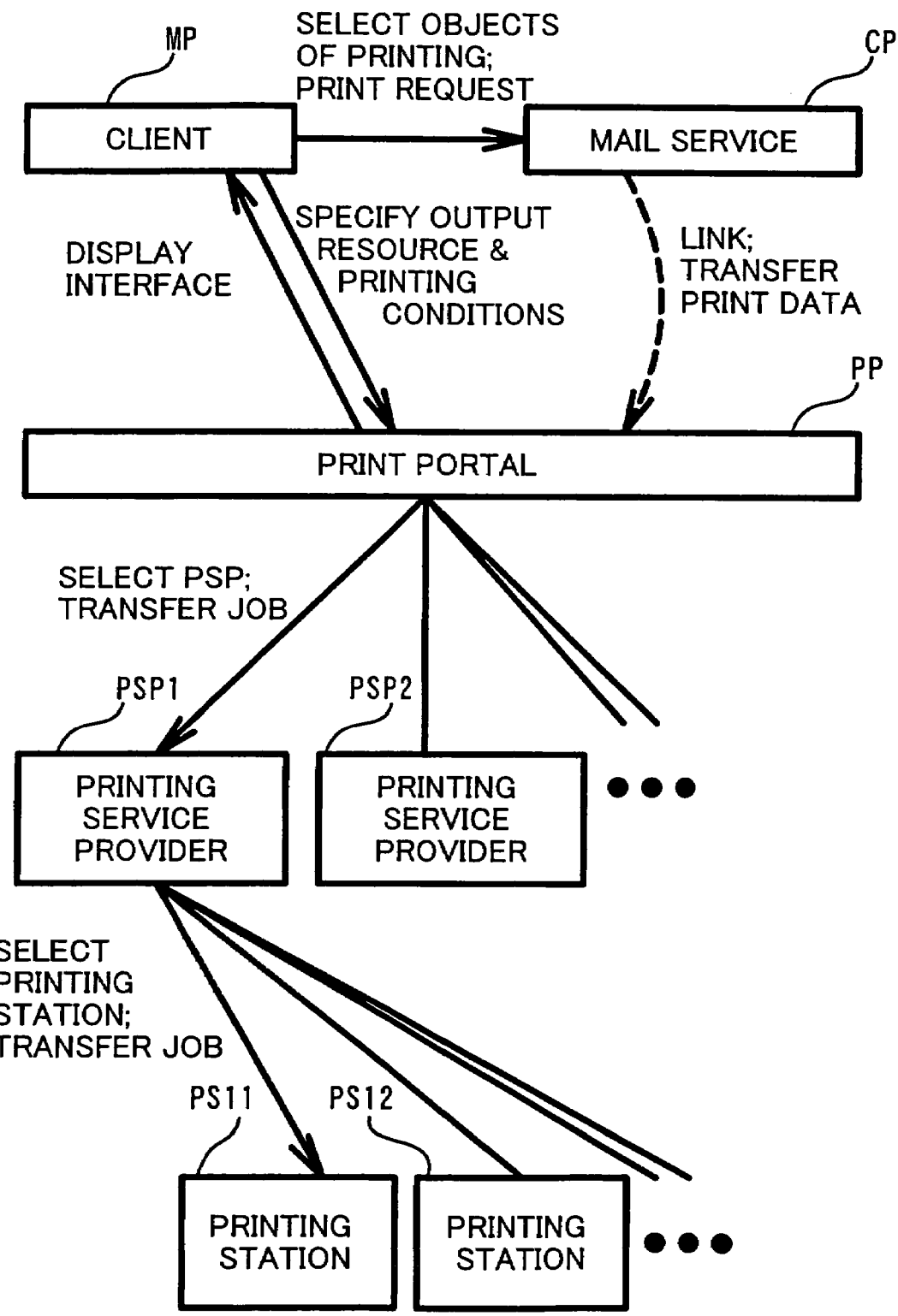
FIG. 2 shows flow of data in the process of printing E mails.
Figure 3:
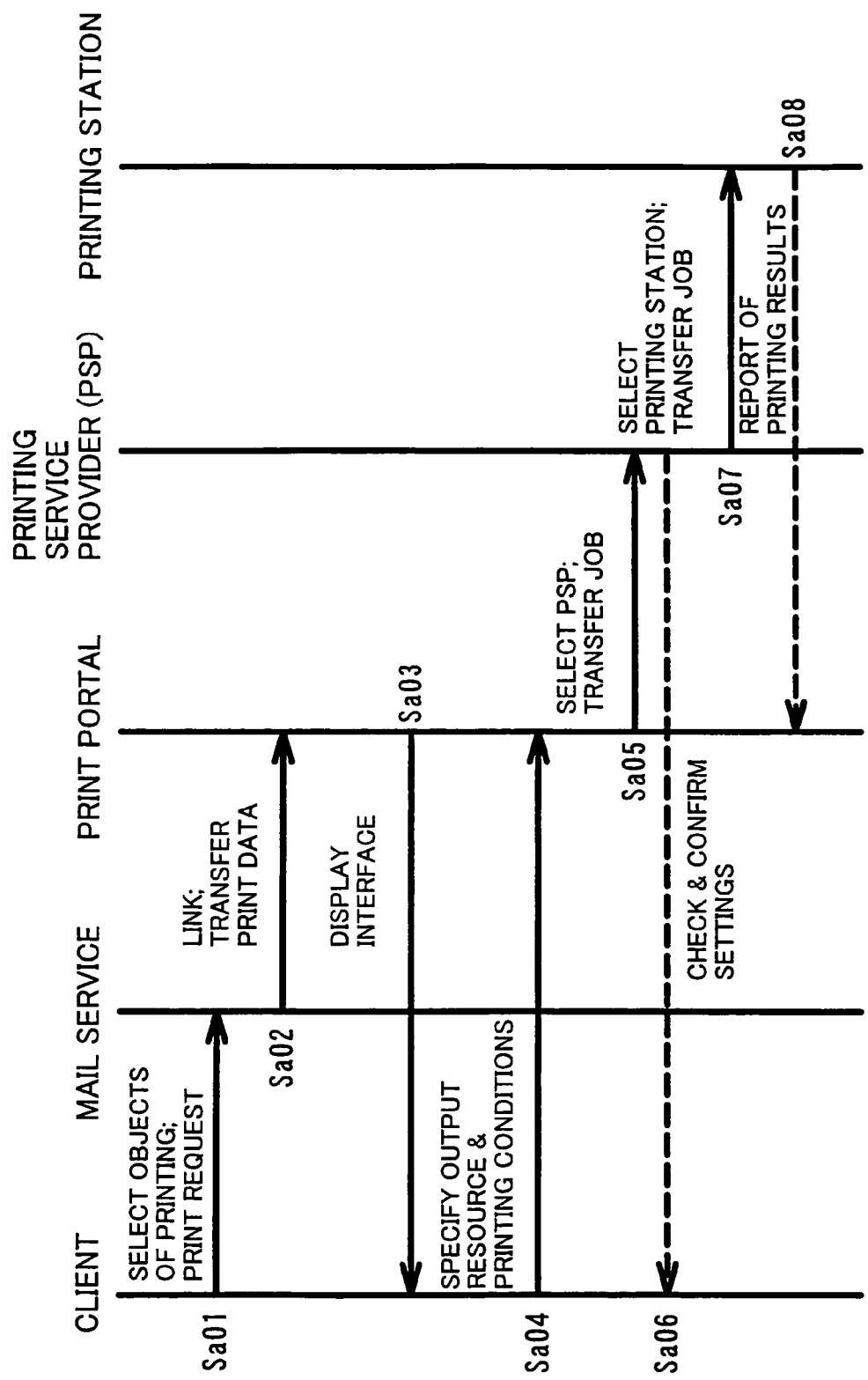
FIG. 3 is a time chart in the process of printing E mails.
Figure 4:
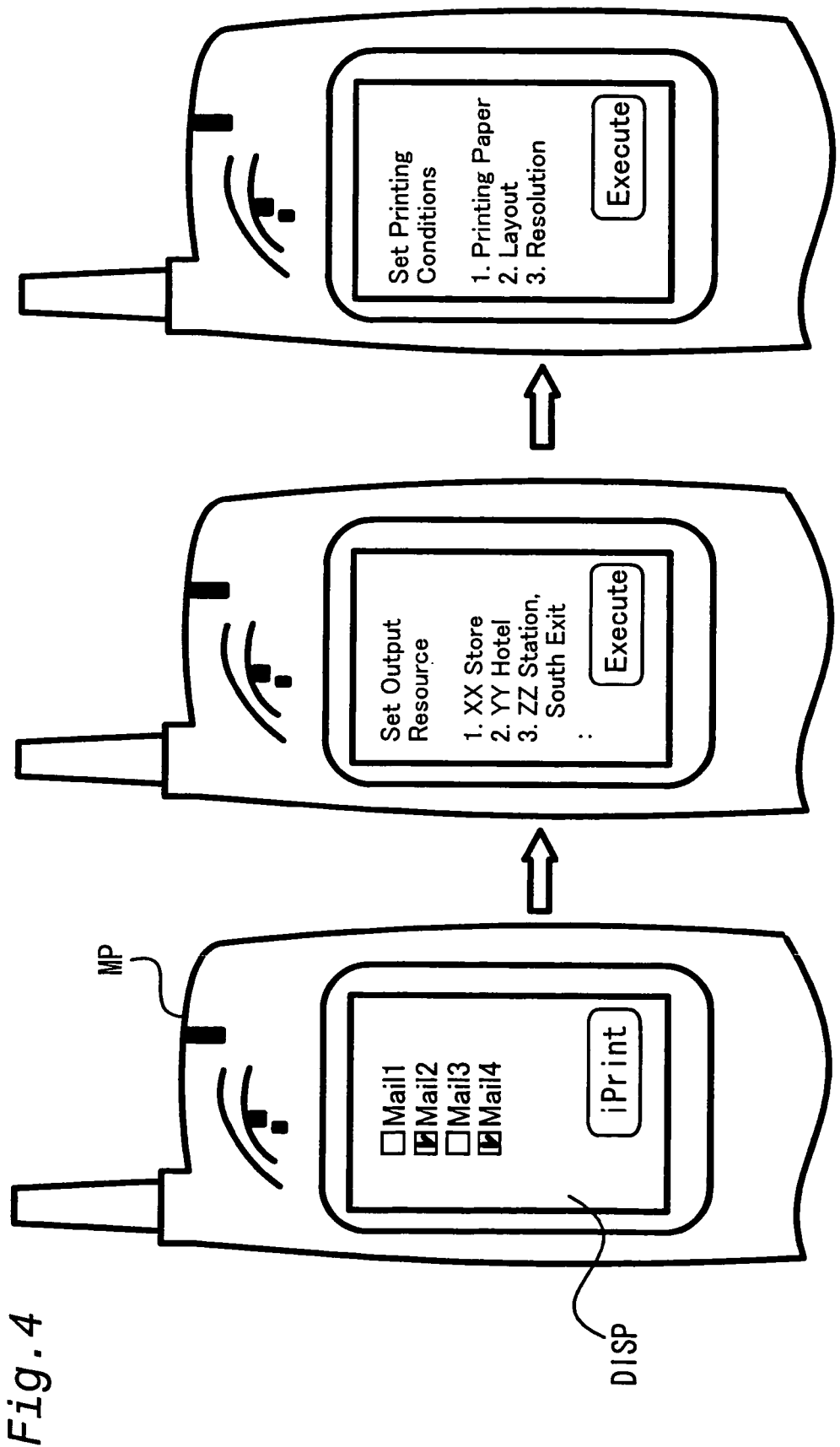
FIG. 4 shows an exemplified interface in the process of printing E mails.

FIG. 2 shows flow of data in the process of printing E mails. FIG. 3 is a time chart in the process of printing E mails. FIG. 4 shows an exemplified interface in the process of printing E mails. The functionality of the respective units is discussed with referring to these drawings. In the case of E mails, a mail service CP corresponds to a content provider.

The user first gains access from a client MP to the mail service CP, checks E mails addressed to the user, and selects one or plural mails to be printed. A series of interface windows appearing on a display unit DISP of the mobile phone is shown in FIG. 4. The left-side window shows that there are four mails Mail 1 to Mail 4 addressed to the user and that Mail 2 and Mail 4 have been selected as objects of printing. This interface is provided by the mail service CP. When the user presses a button 'iPrint' on the window, a requirement for execution of printing is transmitted from the mail service CP to the print portal PP (see Sa01 in FIG. 3 and FIG. 2).

When the mail service CP is registered in advance as a content provider in the print portal PP, the button 'iPrint' appears on the window. This button functions as a link to the print portal PP. In response to the requirement for printing by a press of the 'iPrint' button, the destination of access by the client MP is changed to the print portal PP. Print data, that is, data of Mail 2 and Mail 4, is then transmitted from the mail service CP to the print portal PP (see Sa02 in FIG. 3 and FIG. 2).

The print portal PP subsequently provides the client MP with interfaces for specifying the output resource and printing conditions (see Sa03 in FIG. 3 and FIG. 2).

The center drawing of FIG. 4 shows an interface window for designating the output resource. Available printing stations are enumerated for the designation of the output resource. The list of the available output resources may be displayed in a hierarchical manner. For example, when the user selects 'XX Store' in the list shown in FIG. 4, all shops belonging to the XX Store chain are enumerated. One modified procedure may cause the use to select one among available printing service providers on the first stage of the hierarchical designation.

The right-side drawing of FIG. 4 shows an interface window for specifying the printing conditions. Typical examples of the printing conditions include the paper size, the layout, and the resolution. Selection of a 'Printing Paper' menu enables the detailed settings for the printing paper, for example, the size A4 or B5. Selection of a 'Layout' menu enables the detailed settings for the layout, for example, 1 page/sheet or 2 pages/sheet. Selection of other menus enables the detailed settings for other printing conditions. The settings of printing are not restricted to this example, but a diversity of fields may be provided by taking into account the utility.

When the user completes the specification of the output resource and the printing conditions with the above interface, the specified information is transmitted to the print portal PP (see Sa04 in FIG. 3 and FIG. 2). The print portal PP selects the printing service provider PSP1 as the destination of transmission of a print job, based on the received information, and transfers the print job to the selected printing service provider PSP1 (see Sa05 in FIG. 3 and FIG. 2). Here the printing service provider PSP1, which manages the printing station PS11 designated by the user as the output resource, is selected as the destination of transmission of the print job.

The printing service provider PSP1 that has received the print job selects the printing station PS11 and transfers the print job to the selected printing station PS11 (see Sa07 in FIG. 3 and FIG. 2). Here the printing station PS11 designated by the user is selected as the destination of transmission.

The print data is converted to a PDF file, which is a general purpose format, in the course of mediation with the print portal PP and the printing service provider PSP1. The printing station PS11 analyzes the PDF file and executes a printing operation.

As shown by Sa06 in FIG. 3, a display including the designated output resource and the specified printing conditions may be given to the client MP for the purpose of check and confirmation, prior to the transfer of the print job from the printing service provider PSP1 to the printing station PS11.

On completion of the printing operation, a report of printing results may be transmitted from the printing station PS11 to the print portal PP. The print portal PP detects the normal completion of the printing operation based on the report, and carries out post services like accounting.

The above example mediates printing with the two different layered servers, that is, the print portal PP as the upper-layer server and the printing service providers like PSP1 as the lower-layer servers.

The use of the two-layered servers for the mediation have advantages discussed below.

The lower-layer server may be organized by each business line, in order to provide unique services characteristic of the business line and allow discrimination from other business proprietors. Each business proprietor can rather readily take in the users and the content providers registered with the print portal PP as the potential customers of its business line.

Even when the lower-layer servers are individually organized by different business lines, the upper-layer server provides the users with a standard interface. This enhances the utility of the print portal.

The user who has been registered with the print portal PP can readily utilize a diversity of lower-layer servers under the control of the print portal PP. This arrangement does not require time-consuming, complicated registration and other related work for each lower-layer server, thus enhancing the utility. The content providers share such advantages. The content provider that has been registered with the print portal PP can readily increase in number the users and the output resources of the offered contents.

The printing mediation system is not restricted to the construction utilizing the two-layered servers, but may be organized by a single-layer server configuration having the combined functions of the print portal and the printing service providers. This configuration is discussed later as a modified example of the embodiment.

A3. Configuration of Functional Blocks

Figure 5:
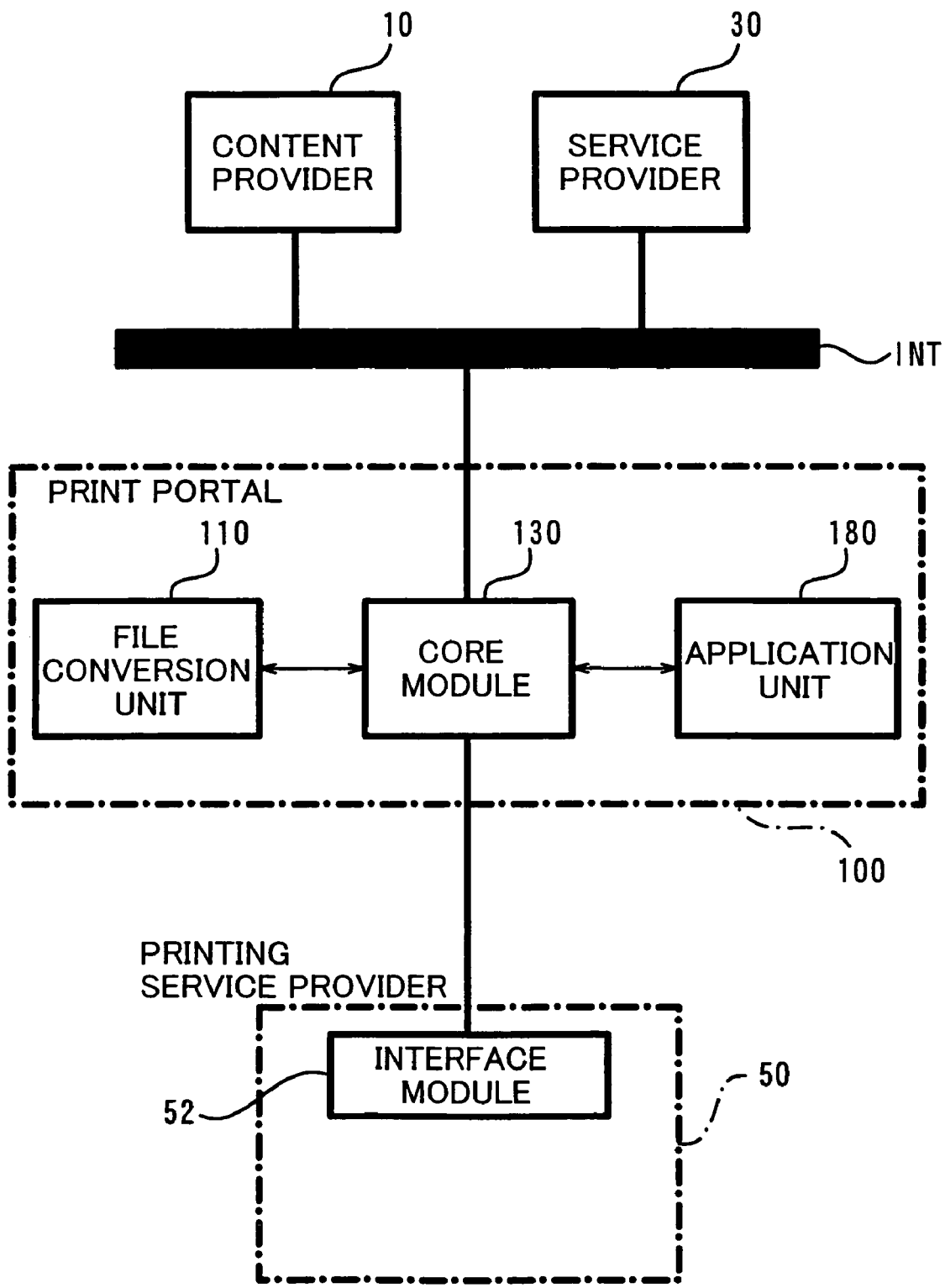
FIG. 5 shows functional blocks of a print portal.

FIG. 5 shows functional blocks of the print portal. For convenience of explanation, the respective constituents are expressed by numbers different from the symbols of FIG. 1, although the constituents of the identical names have the same functions.

As illustrated, a print portal 100 mainly includes three functional blocks, a core module 130, a file conversion unit 110, and an application unit 180. In this embodiment, these functional blocks are attained by the software.

The file conversion unit 110 converts the format of print data to a predetermined intermediate file in the course of mediation of the print data. The PDF is used as the general purpose format in this embodiment.

The application unit 180 executes the main functions of the print portal PP to mediate the print data and a diversity of additional functions. The additional functions include, for example, addition of advertisement (ad) and accounting, which will be discussed later.

The core module 130 cooperates with the file conversion unit 110 and the application unit 180 to mediate the print data. The core module 130 takes charge of communication with a content provider 10, a service provider 30, and a printing service provider 50. The printing service provider 50 has an interface module 52 to ensure the flexibility of a protocol in connection with the print portal PP.

Figure 6:
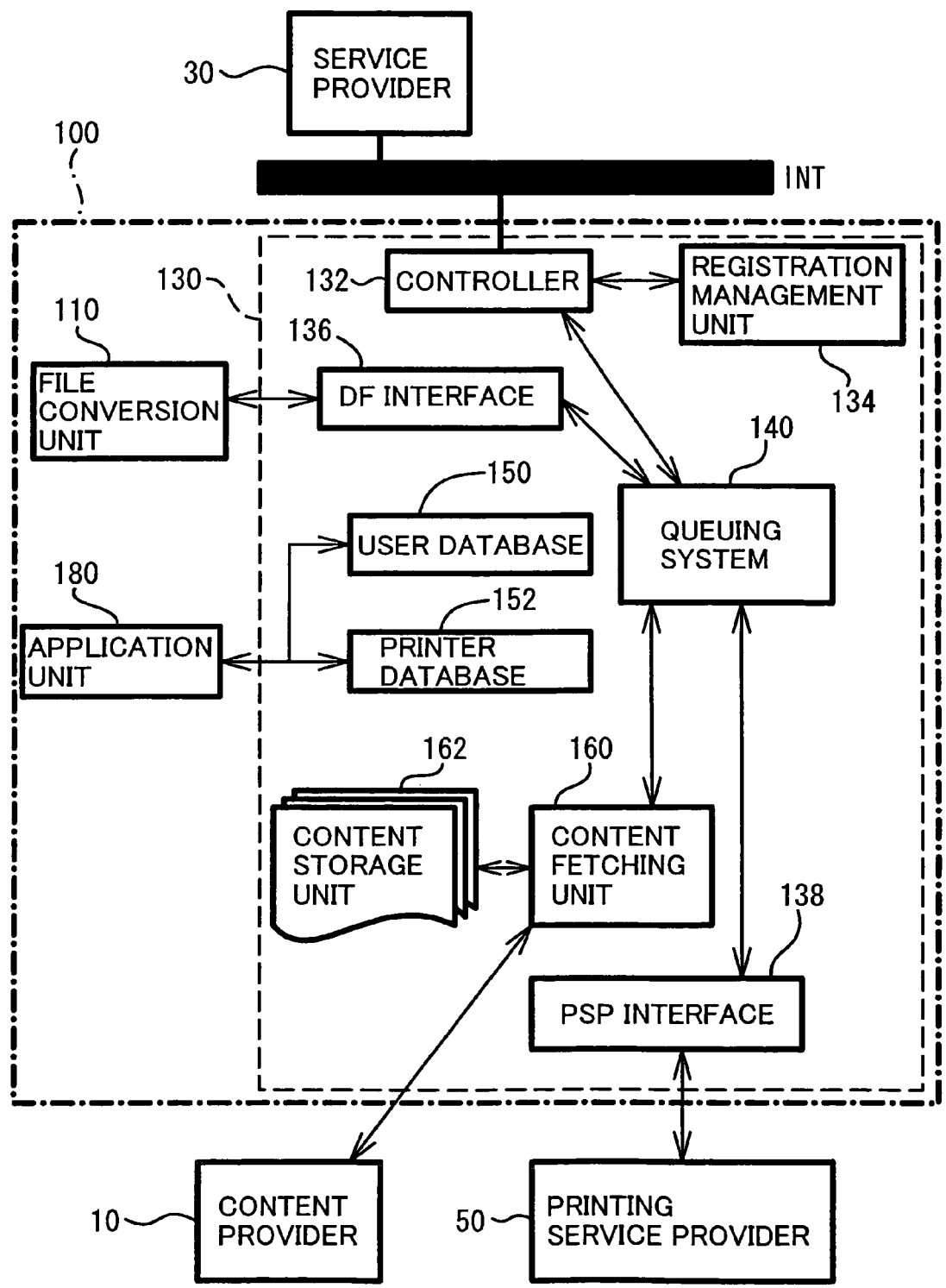
FIG. 6 illustrates the internal structure of a core module 130.

FIG. 6 illustrates the internal structure of the core module 130. This internal structure is only illustrative, and the core module 130 may have any of other diverse constructions.

A controller 132 controls the operations of the respective functional blocks of the print portal 100 and transmission of information to and from the outside via the internet INT. The control includes registration and management of users and providers, control of the status of print jobs, acceptance and cancellation of print requests, and retrieval of printers as the output resource. The controller 132 also provides an interface window to allow transmission of data between the print portal 100 and the outside.

A registration management unit 134 takes charge of registration and management of the user utilizing the print portal PP, the content provider 10, and the printing service provider 50. The registration management unit 134 creates an interface window for the registration and management and stores and updates registration-related data in a predetermined data base.

A queuing system 140 relays the operations of the respective functional blocks. In this embodiment, the respective functional blocks are constructed by the object-oriented software. Each functional block refers to a message registered in the queuing system 140, detects the presence of a job to be processed, and executes the actual processing. On completion of the processing, a message representing conclusion of the processing is registered in the queuing system 140. The respective functional blocks execute the processing with the queuing system 140 as the relay. The print portal PP accordingly actualizes a series of processing, from acceptance of a print request to completion of a printing operation.

In order to attain the series of processing, the queuing system 140 has a content fetching queue, a file conversion queue, a job sending queue, and a job canceling queue.

A content fetching unit 160 gains access to the content provider 10 and fetches a content specified by the user as an object of printing. The fetched content is temporarily stored in a content storage unit 162. The content fetching unit 160 refers to the content fetching queue provided in the queuing system 140 and performs the above operation according to the message accumulated in the content fetching queue. After fetching the content, the content fetching unit 160 registers a message to require file conversion of the content in the fine conversion queue provided in the queuing system 140.

The file conversion unit 110 functions to convert the content to the PDF format. The PDF is the general purpose format. Conversion of the print data to this format advantageously enables output of the print data to a diversity of printers. Another advantage is relatively accurate reproduction of the selected layout in prints. The PDF allows conversion from practically any print data including documents and pictures, so that a wide range of contents can be the object of printing. A page description language, such as Postscript (registered trademark), may alternatively be used as the general purpose format.

In the structure of this embodiment, with a view to relieving the load applied to each server, the file conversion unit 110 is constructed as a separate server from the core module 130. The core module 130 accordingly has a DF interface 136 to allow transmission of data to and from the file conversion unit 110.

The DF interface 136 transfers data to the file conversion unit 110, in response to the message accumulated in the file conversion queue provided in the queuing system 140. When receiving a processed PDF file from the file conversion unit 110, the DF interface 136 registers a message of print job transmission in the job sending queue provided in the queuing system 140. One possible modification omits the DF interface 136 and constructs the file conversion unit 110 to gain direct access to the queuing system 140.

A PSP interface 138 functions to transmit a print job to the printing service provider 50. More specifically, the PSP interface 138 transmits a print job to the designated printing service provider 50, in response to the message accumulated in the job sending queue provided in the queuing system 140. The PSP interface 138 also sends a message of job cancellation accumulated in the job canceling queue. The transmission is attained according to a diversity of protocols set by the printing service provider 50, for example, HTTP (Hypertext Transport Protocol).

The core module 130 includes a diversity of databases, such as a user database 150 and a printer database 152. Although only two databases are illustrated in this embodiment, a greater number of databases may be provided in the core module 130. The registration management unit 134 manages these databases. The databases are utilized for the processing executed in the core module 130, as well as for the processing executed by the application unit 180.

Figure 7:
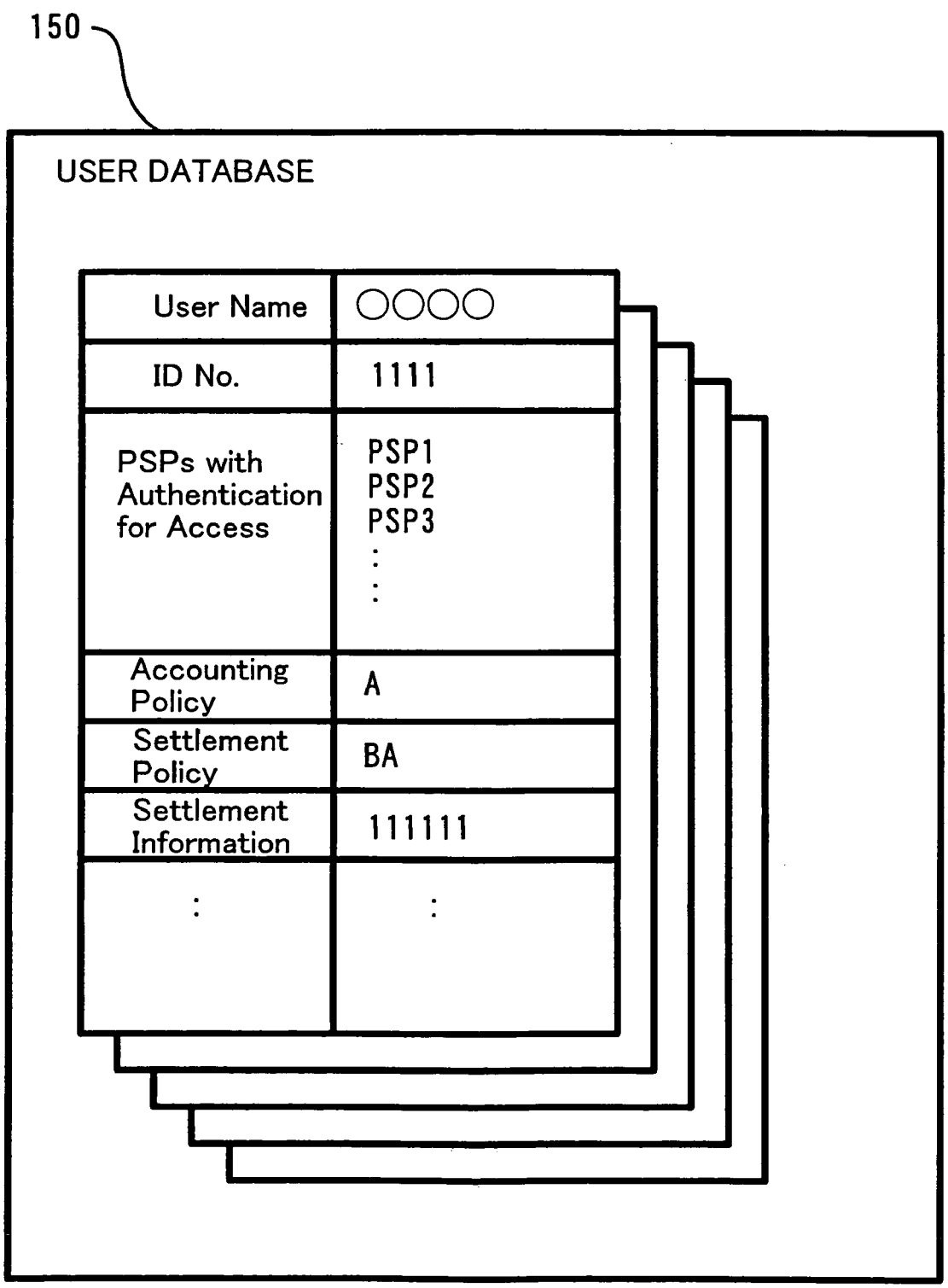
FIG. 7 shows the overview of a user database 150.

FIG. 7 shows the overview of the user database 150. The user database 150 includes files provided for the respective users of the print portal 100. Each file stores user-related attribute information, for example, the user name, the ID number, the available printing service providers (PSPs) with authentication for access, the accounting policy, the settlement policy, and the settlement information. The information on the accounting policy shows selection of the charge system, for example, a fixed rate system or a page rate system. The information on the settlement policy specifies, for example, credit card settlement. The settlement information represents each user's account and current settlement status. Various pieces of information other than those mentioned above may also be registered in the user database 150.

Figure 8:
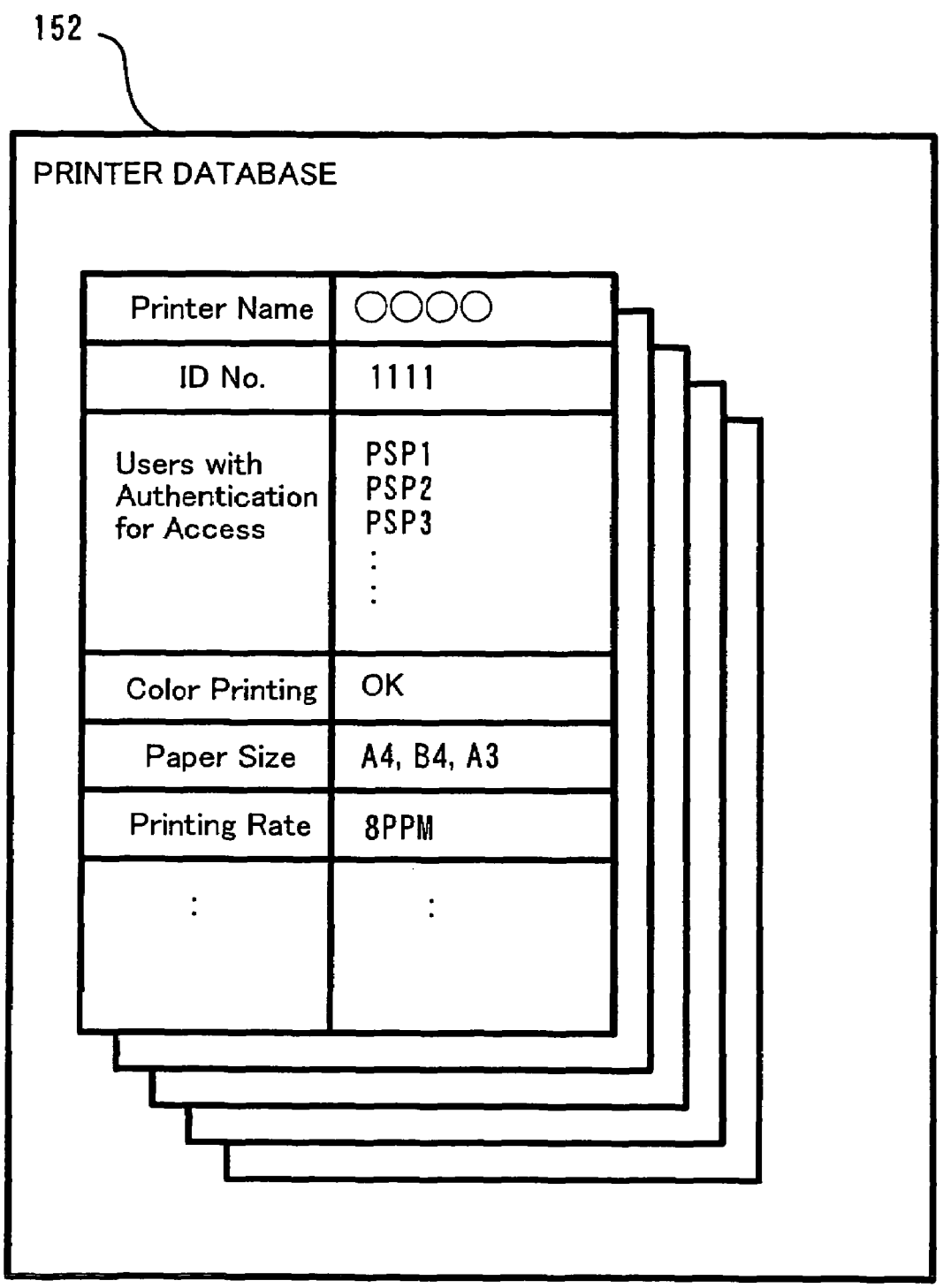
FIG. 8 shows the overview of a printer database 152.

FIG. 8 shows the overview of the printer database 152. Like the user database 150, the printer database 152 manages a diversity of attribute information with regard to the respective printers. In this embodiment, the printer name, the ID number, and the authorized users with authentication for access are some registered pieces of information. The ID number represents an index utilized to identify the printer in the printing process with the print portal 100. The printer database 152 also stores information on the performances of each printer, for example, the availability of color printing, the printable paper size, and the printing rate. Various pieces of information other than those mentioned above may also be registered in the printer database 152. In the structure of this embodiment, the printer database 152 stores the information by the unit of printing stations. The printer database 152 may alternatively store the information by the unit of printing service providers.

As described above, the series of processing is executed in the print portal 100, based on the messages registered in the queuing system 140. The functions of the queuing system 140 are discussed concretely with the example of the printing operation shown in FIGS. 2 to 4.

Figure 9:
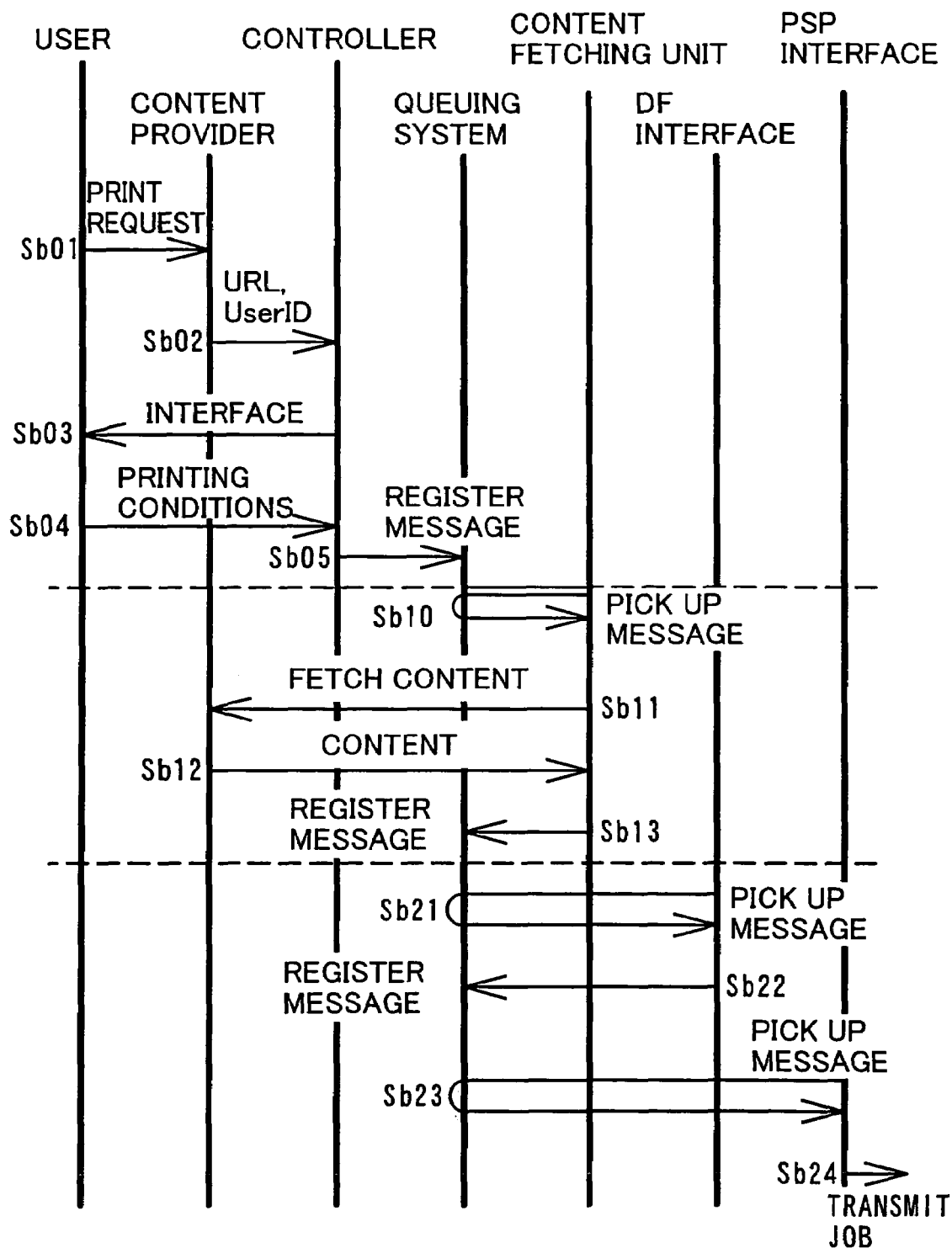
FIG. 9 is a time chart of the processing via a queuing system 140.

FIG. 9 is a time chart of the processing via the queuing system 140. The user presses the 'iPrint' button to send a print request (step Sb01) on the interface provided by the content provider. The content provider receives the print request and transmits the URL (Uniform Resource Locator) of a content to be printed and the user ID to the controller 132 in the print portal 100 (step Sb02). The controller 132 provides the user with an interface for specifying the printing conditions (step Sb03). When the user sets the printing conditions on the interface (step Sb04), the controller 132 registers a message representing acceptance of the print request in the queuing system 140 (step Sb05), in response to the setting of the printing conditions. This concludes the process of accepting the print request.

The print portal 100 then fetches the content specified by the print request. This content fetching process is carried out in parallel to the print request acceptance process. The content fetching unit 160 refers to the queuing system 140 at regular intervals and picks up a message accumulated therein (step Sb10). The content fetching unit 160 gains access to the content provider according to the picked-up message (step Sb11) and fetches the specified content (step Sb12). On completion of fetching the content, the content fetching unit 160 registers a message representing conclusion of the content fetching process in the queuing system 140 (step Sb13). This concludes the process of fetching the content.

The print portal 100 subsequently carries out file conversion of the content. This file conversion process is carried out in parallel to the print request acceptance process and the content fetching process. The DF interface 136 refers to the queuing system 140 at regular intervals and picks up a message accumulated therein (step Sb21). The DF interface 136 causes the file conversion unit 110 to carry out the file conversion according to the picked-up message. On completion of file conversion, the DF interface 136 registers a message representing conclusion of the file conversion in the queuing system 140. This concludes the process of file conversion.

The print portal 100 then transmits the print job to the printing service provider. The transmission is carried out in parallel to the above processes. The PSP interface 138 refers to the queuing system 140 at regular intervals and picks up a message accumulated therein (step Sb23). The PSP interface 138 sends the print job to the designated printing service provider according to the picked-up message (step Sb24). This concludes the process of sending the print job.

As discussed above, the print portal 100 implements the four processes to accept the print request, fetch the content, convert the file, and send the print job in the course of mediation of printing. With regard to each print job, these processes are performed in sequence. The respective functional blocks, however, do not perform the processing in a synchronous manner. In the print portal 100, the respective functional blocks execute the individual processes at intrinsic timings, while the queuing system 140 relays these processes to actualize a series of processing as a whole.

In this embodiment, the use of the queuing system 140 ensures the excellent extensibility.

Figure 10:
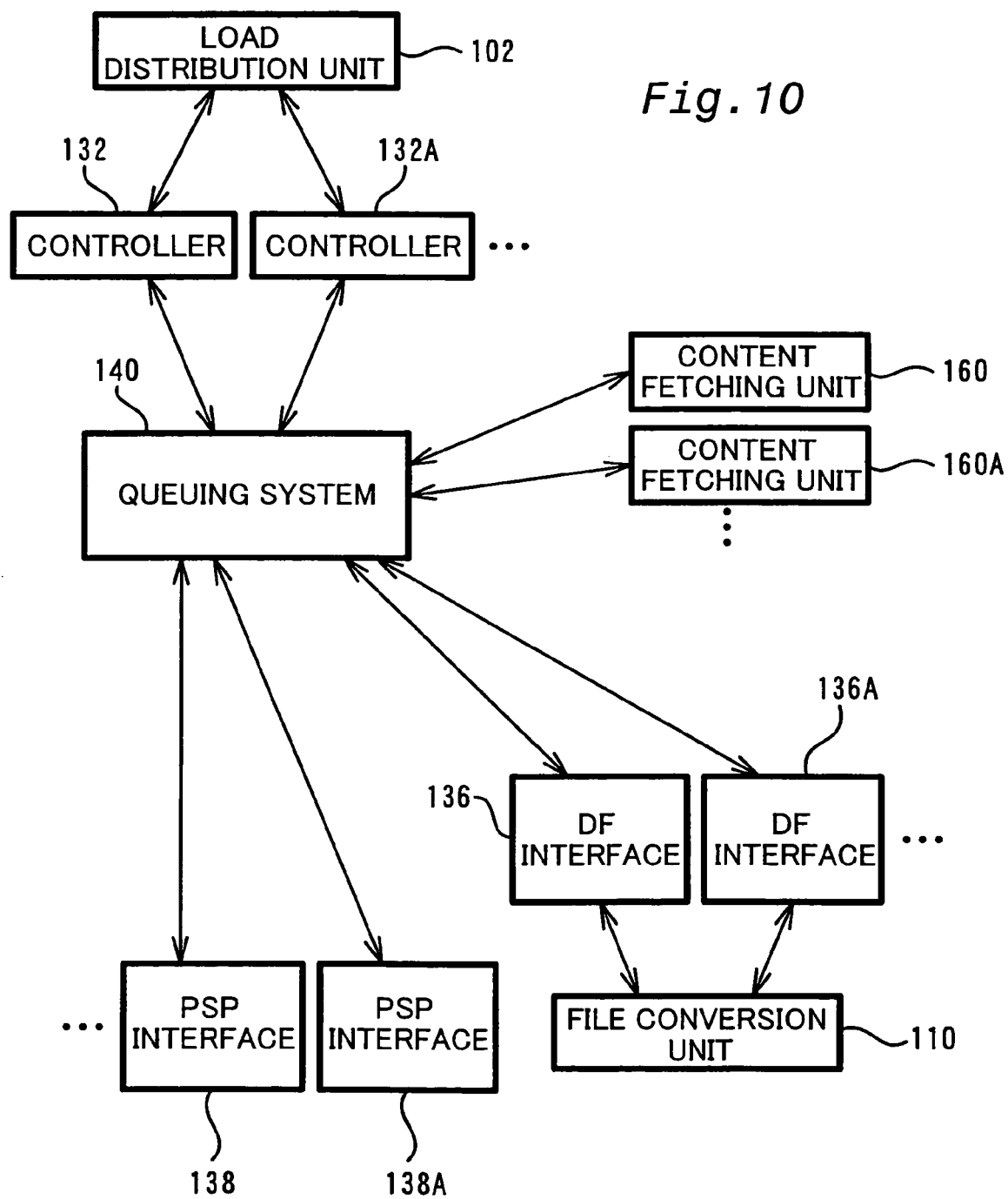
FIG. 10 shows possible extension of the system.

FIG. 10 shows possible extension of the system. As illustrated, arbitrary numbers of the controllers 132, the content fetching units 160, the DF interfaces 136, and the PSP interfaces 138 are connectable via the queuing system 140. The respective units may be constructed by different servers. In the case where the structure has multiple controllers like controllers 132 and 132A, it is desirable to provide a load distribution unit 102 as a single interface with the outside. The load distribution unit 102 accepts print requests and selectively uses the controllers 132 and 132A by taking into account the current loading applied to the controllers 132 and 132A.

In the structure of this embodiment, the respective functional blocks independently execute the processing, based on the messages accumulated in the queuing system 140. This arrangement ensures easy extension of the system. The example of FIG. 10 multiplies all the functional blocks. The extension of the system can be actualized flexibly according to the loading applied to the respective functional blocks.

The example of FIG. 10 shows the extension of the system in the core module 130. Similar extension of the system may be applied for the file conversion unit 110.

Figure 11:
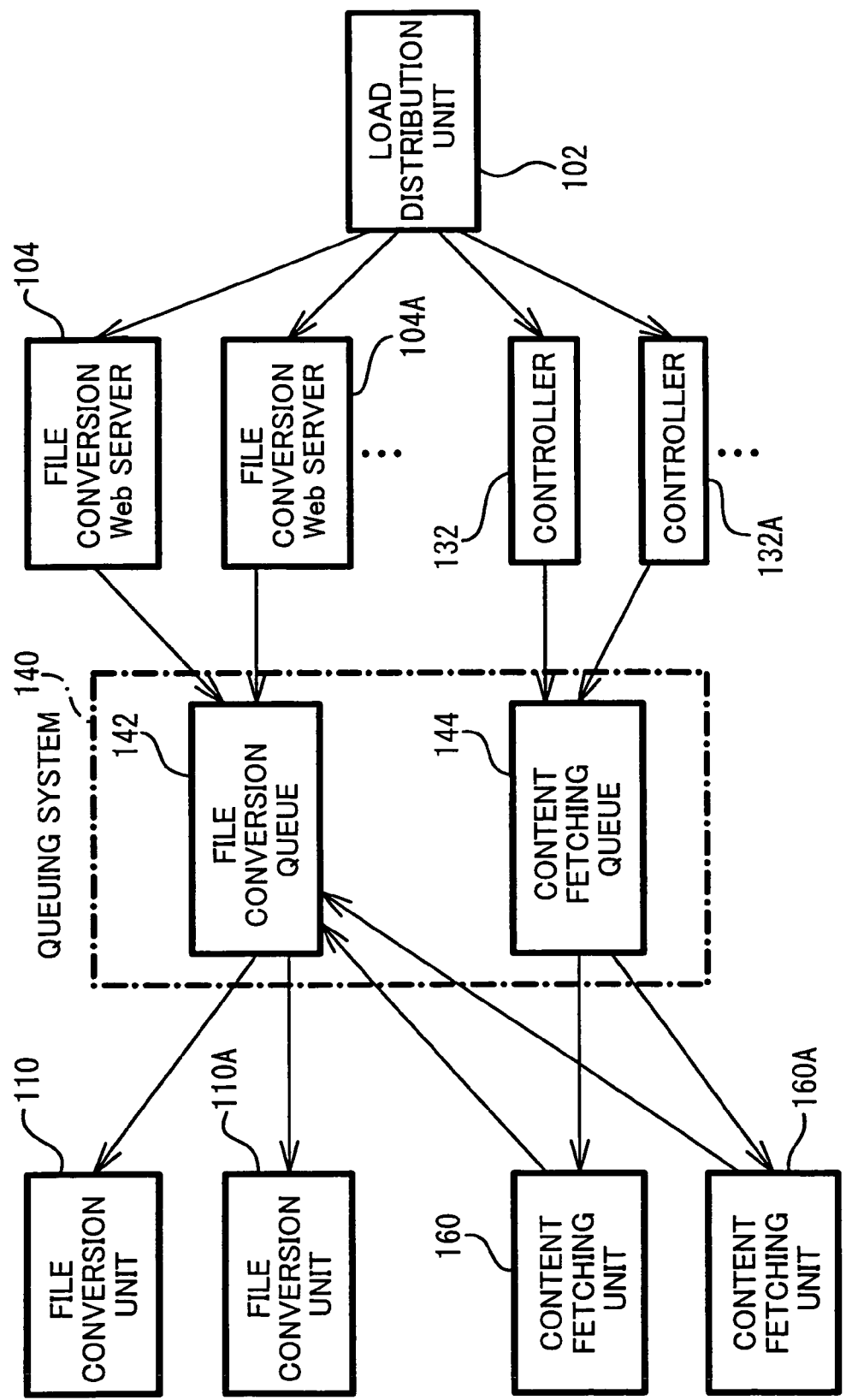
FIG. 11 shows possible extension of the file conversion unit.

FIG. 11 shows possible extension of the file conversion unit. This example includes multiple file conversion units 110 and 110A provided via the queuing system 140. These file conversion units 110 and 110A may be constructed by different servers, with a view to relieving the load.

In the example of FIG. 11, there are the multiple controllers 132 and 132A and content fetching units 160 and 160A.

File conversion Web servers 104 and 104A are also provided as additional functional blocks. The file conversion Web servers 104 and 104A carry out only the file conversion, regardless of the mediation of printing. Namely the file conversion Web servers 104 and 104A are not the essential functional blocks for the mediation of printing.

The user sends either a print request or a file conversion requirement to the load distribution unit 102. The load distribution unit 102 transmits the print request to either one of the controllers 132 and 132A, while transmitting the file conversion requirement to either one of the Web servers 104 and 104A. In the case of the file conversion requirement, the content as the object of conversion is transmitted together with the requirement.

The controllers 132 and 132A register the print request in a content fetching queue 144. The content fetching units 160 and 160A fetch a content according to the registered message and register a message of requiring file conversion in a file conversion queue 142. The file conversion Web servers 104 and 104A are not required to fetch a content and thus directly register a message of requiring file conversion in the file conversion queue 142.

The file conversion units 110 and 110A individually refer to the file conversion queue 142 and execute the processing in response to a message registered therein, if any. The individual operations of the two file conversion units 110 and 110A enable distribution of the loading of file conversion.

The examples of FIGS. 10 and 11 extend the system utilizing a single queuing system 140. Providing multiple queuing systems 140 in parallel allows greater-scaled system extension.

A4. Connection with Printing Service Provider

Figure 12:
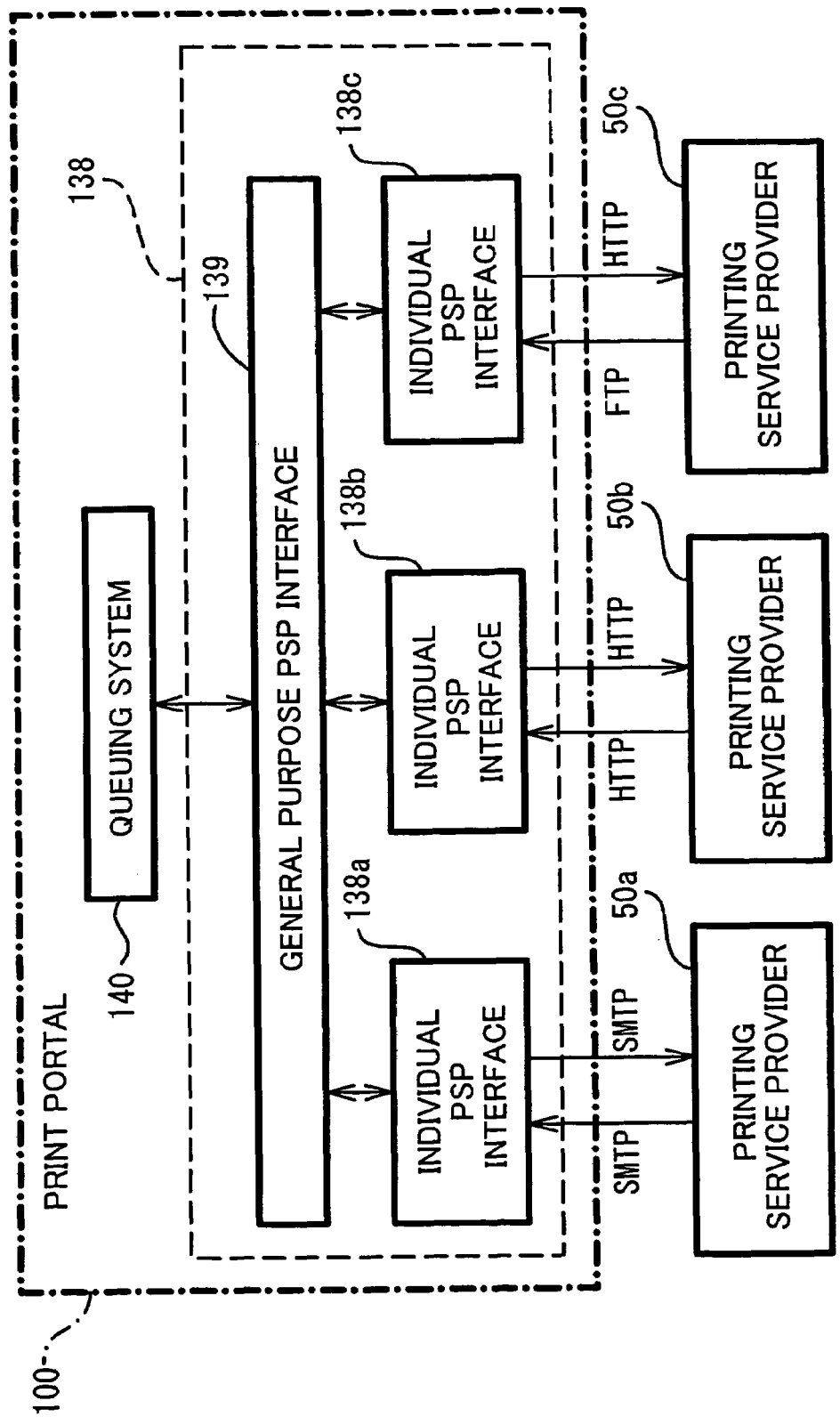
FIG. 12 shows interfaces with printing service providers.

FIG. 12 shows interfaces with the printing service providers. As mentioned previously, the printing service providers are managed by different business proprietors from that of the print portal 100. The different printing service providers may accordingly have different requirements of the protocol for mediation with the print portal 100. In this embodiment, the PSP interface is structured to accept diverse protocols.

As illustrated, the PSP interface 138 has two-layered interfaces. The upper-layer interface is a general purpose PSP interface 139. The general purpose PSP interface 139 transmits messages and data to and from other functional blocks, such as the queuing system 140, included in the print portal 100.

The lower-layer interface includes individual PSP interfaces 138a, 138b, and 138c. The individual PSP interfaces like 138a are provided for the respective printing service providers, and transmit data to and from the general purpose PSP interface 139 according to protocols adequate for the respective requirements.

In one example, the individual PSP interface 138a communicates with the printing service provider 50a by SMTP (Simple Mail Transfer Protocol) for both sending and receiving. The individual PSP interface 138b communicates with the printing service provider 50b by HTTP for both sending and receiving. The individual PSP interface 138c transmits data to the printing service provider 50c by HTTP, while receiving data from the printing service provider 50c by FTP (File Transfer Protocol). The individual PSP interfaces may transmit data by diverse protocols other than those discussed above, according to requirements of the printing service providers.

Figure 13:
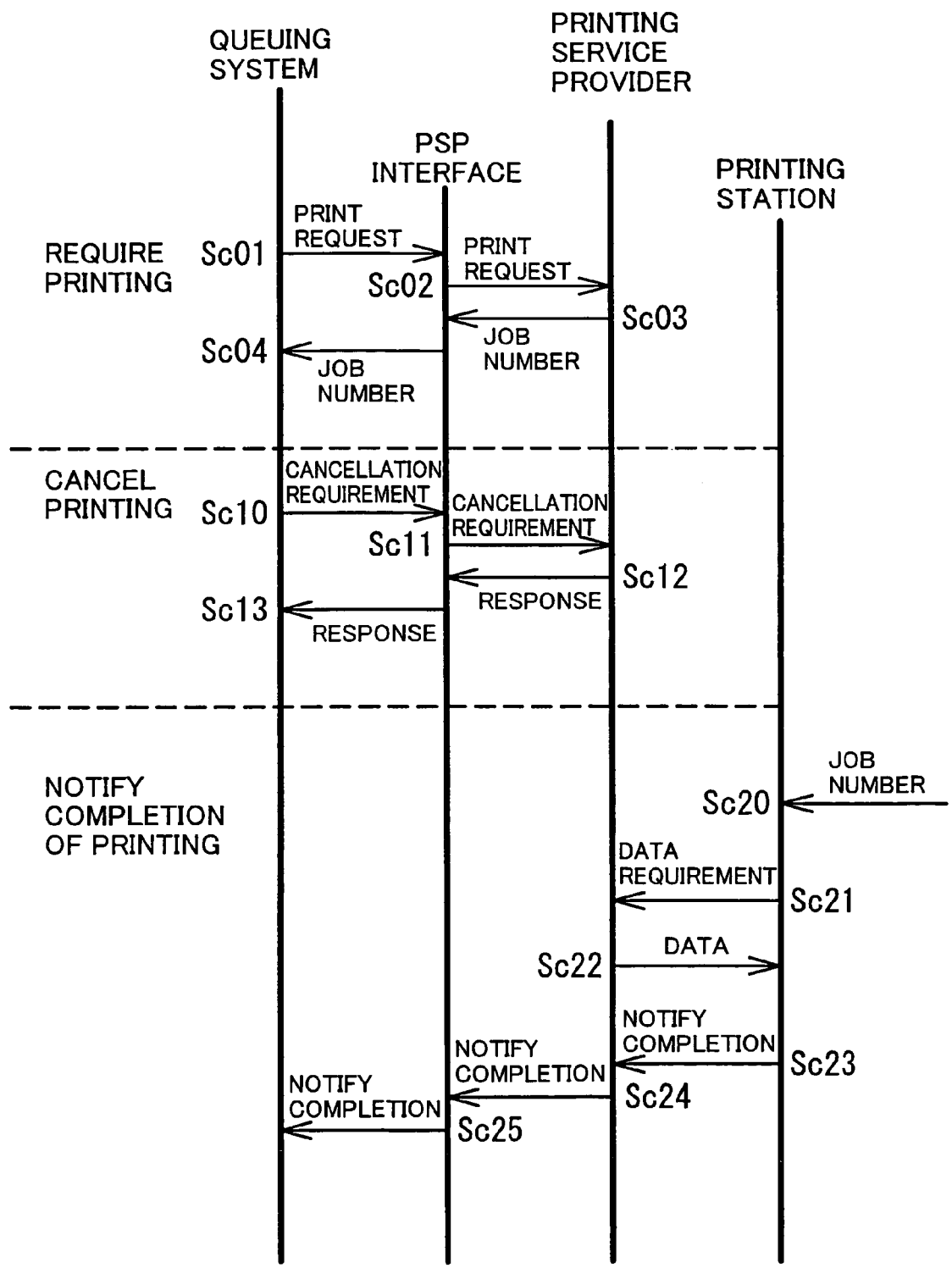
FIG. 13 shows flow of data between the print portal and the printing service provider in the printing process.

FIG. 13 shows flow of data between the print portal and the printing service provider in the printing process. In the print portal 100, on conclusion of the processes of fetching the content and converting the file, a message of requiring job transmission is registered in the queuing system 140. This message is equivalent to a print request sent to the printing service provider.

The PSP interface 138 monitors the queuing system 140 at regular intervals and picks up a print request (step Sc01). The PSP interface 138 then transmits the print request to the printing service provider designated by this message (step Sc02). The printing service provider sends a job number as the response (step Sc03), and the PSP interface registers the job number in the queuing system 140 (step Sc04). In this example, the printing service provider temporarily holds the print request. One possible modification omits the transmission of the job number and causes the printing service provider to directly transmit the print request to the designated printing station.

When the user gives an instruction to cancel the printing operation, data transmission is carried out in a similar manner. In response to registration of a cancellation requirement in the queuing system 140, the PSP interface picks up the cancellation requirement (step Sc10) and transmits the cancellation requirement to the printing service provider (step Sc11). The printing service provider sends a response message (step Sc12), and the PSP interface registers the response message in the queuing system 140 (step Sc13). The transmission of the message of canceling the printing operation is carried out in parallel to the transmission of the print request.

In the example of FIG. 13, the printing operation is executed in response to input of the job number into the printing station. The user inputs the job number through an operation of, for example, a panel, on the printing station (step Sc20). The printing station accordingly requires the printing service provider to send data (step Sc21), receives the required data (step Sc22), and carries out an actual printing operation. On completion of the printing operation, the printing station sends a notification representing conclusion of the printing operation to the printing service provider (step Sc23). The notification is registered in the queuing system via the PSP interface (steps Sc24 and Sc25).

In response to detection of the concluded printing operation, the print portal 100 notifies the user of completion of the printing process, deletes various data relating to the concluded job, and carries out post services like accounting.

A5. Print Request

As discussed previously with FIGS. 2 to 4, in this embodiment, the printing process starts in response to a click of the 'iPrint' button displayed on the window of the client. At the starting time, the destination of access by the client is changed from the content provider, which provides a content to be printed, to the print portal, and information representing the address of the content is transferred from the content provider to the print portal. The following describes transmission of data between the client, the content provider, and the print portal at the starting time of the printing process.

Figure 14:
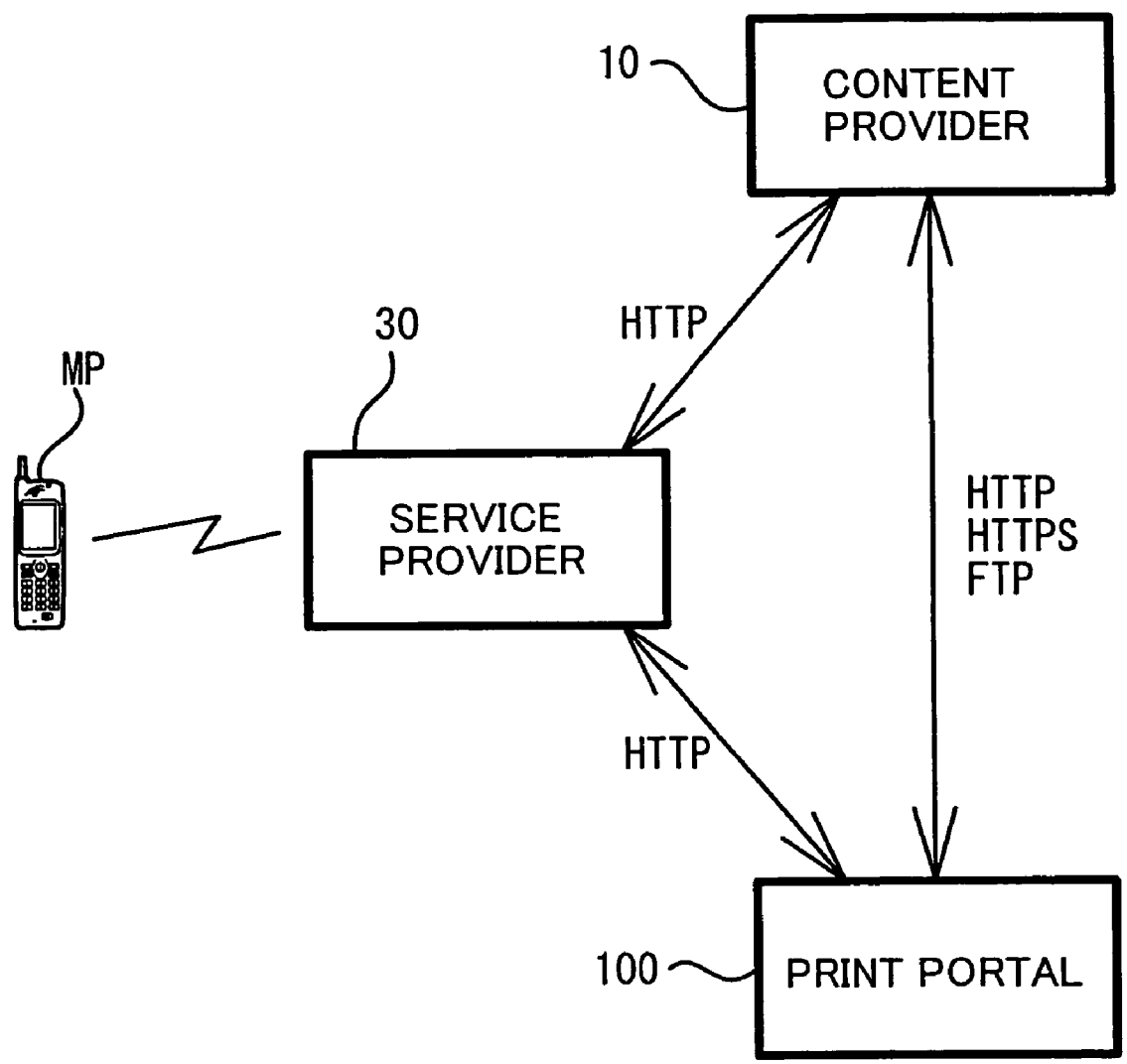
FIG. 14 shows the state of communication between the content provider, the service provider, and the print portal.

FIG. 14 shows the state of communication between the content provider, the service provider, and the print portal. The procedure of this embodiment is on the premise that these three entities are mutually communicable. The service provider 30 communicates with the content provider 10 and the print portal 100 by HTTP, whereas the content provider 10 communicates with the print portal 100 by HTTP, HTTPS, and FTP. The applicable protocols are not restricted to this example.

Figure 15:
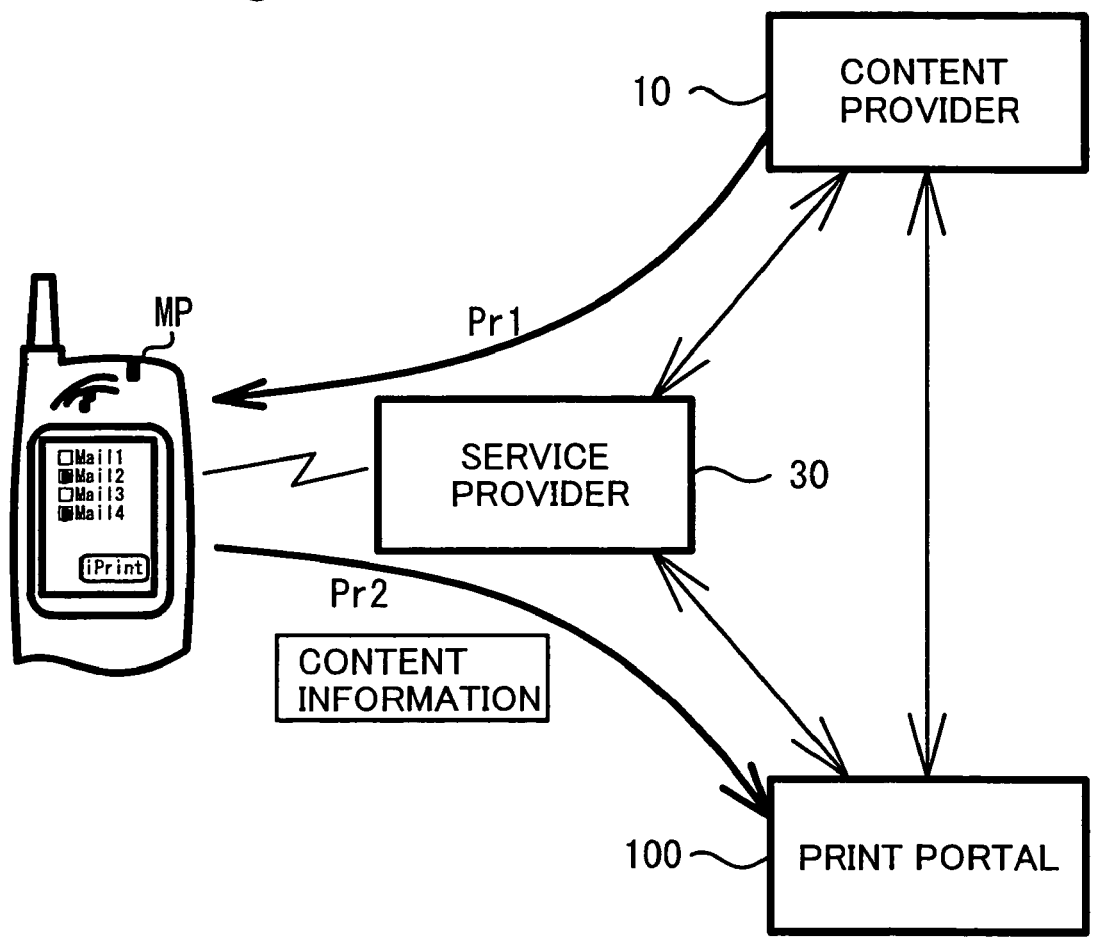
FIG. 15 shows a procedure of issuing a print request.

FIG. 15 shows a procedure of issuing a print request. In this example, on the window sent from the content provider 10 to the client MP (Pr1), the 'iPrint' button is linked with the URL of the print portal 100. A click of this button changes the destination of access by the client MP is changed to the print portal 100 (Pr2). At this moment, the content provider 10 transmits content information, which is required for execution of the printing operation, as a parameter to the print portal 100.

One exemplified procedure of transmitting the content information provides a CGI (Common Gateway Interface) called on a click of the 'iPrint' button and utilizes a method like GET/POST to send the content information to the print portal.

The transmitted content information includes, for example, the URL and the name of the content. By taking into account the possible restriction on the settings of printing with regard to each content set by the content provider 10, the content information may further include the paper size, the selection of color printing or monochromatic printing, the maximum copies permitted, the permission to contract, the requirement of a notice to inform the content provider 10 of completion of printing, and the price of the content.

Figure 16:
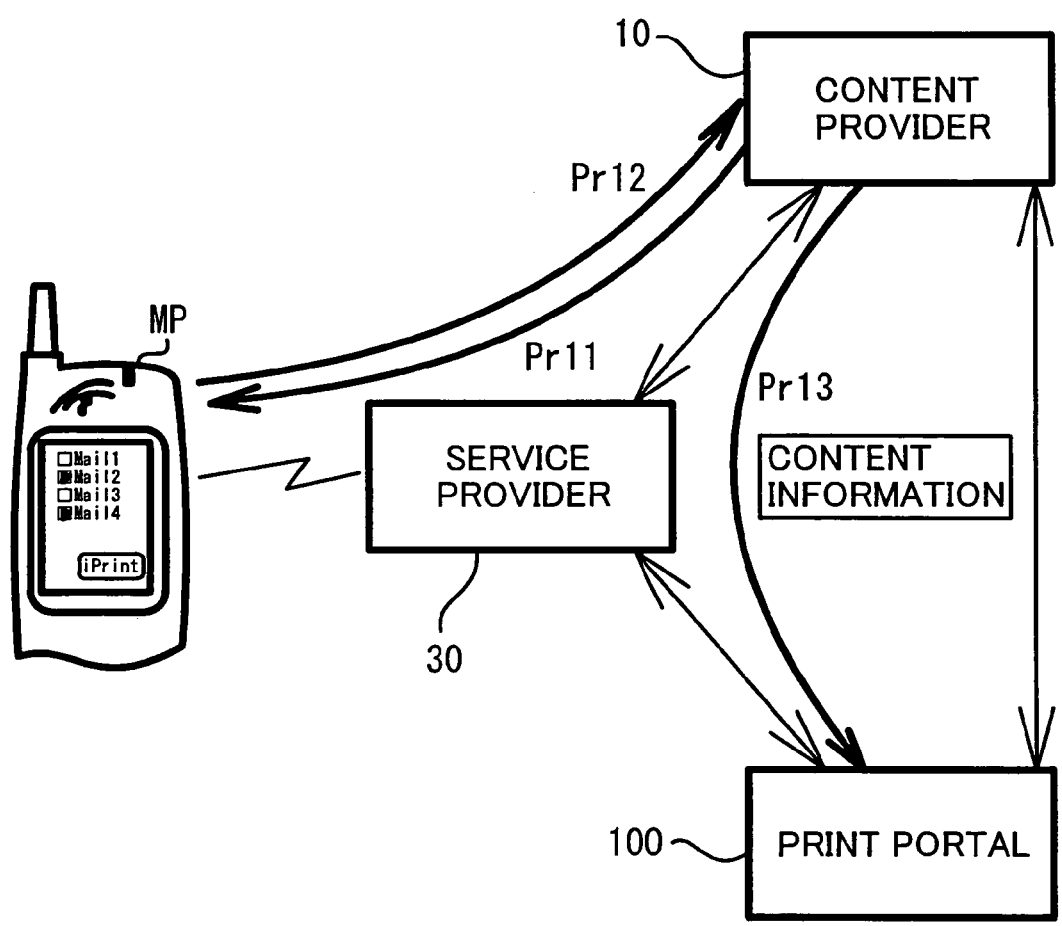
FIG. 16 shows another procedure of issuing the print request.

FIG. 16 shows another procedure of issuing the print request. In this example, on the window sent from the provider 10 to the client MP (Pr11), a printing request from the client MP is sent to the content provider 10 (Pr12) in response to a click of the 'iPrint' button, and the content provider 10 changes over the connection of the client MP to the print portal 100 (Pr13) by the function of redirecting. Simultaneously with the redirecting operation, the content provider 10 transmits the content information to the print portal 100.

Either of these procedures may be adopted to issue the print request.

There are a diversity of interface windows applicable to issue the print request.

Figure 17:
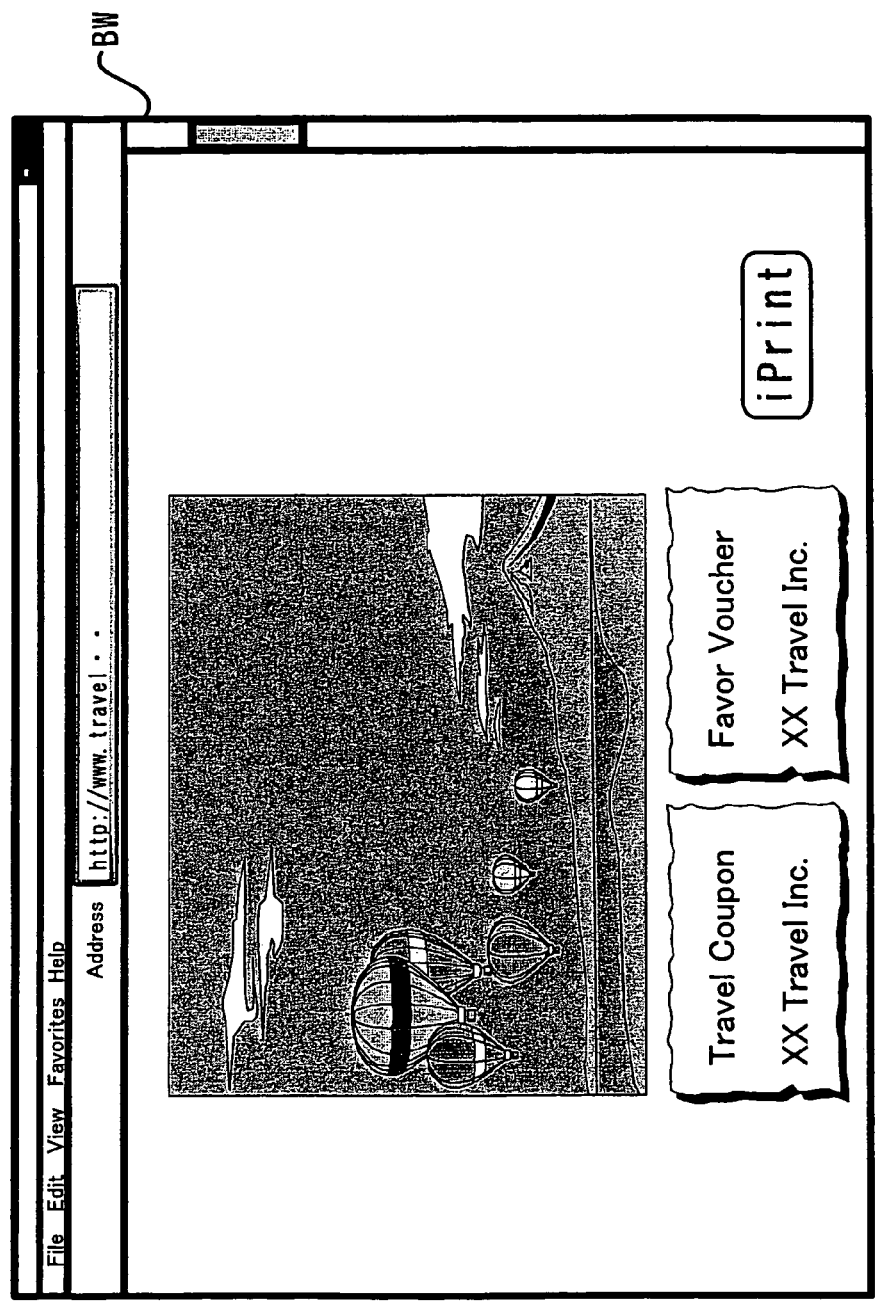
FIG. 17 shows an interface window applied to issue the print request.

FIG. 17 shows an interface window applied to issue the print request. This interface is used when the user gains access from the personal computer to a Web page. In this case, the provider of the Web page corresponds to the content provider. As in the example of FIG. 4, the 'iPrint' button for issuing the print request is set on the Web page provided by the content provider. Either of the procedures discussed above with FIGS. 15 and 16 may be applied for data transmission in response to a click of this button.

Figure 18:
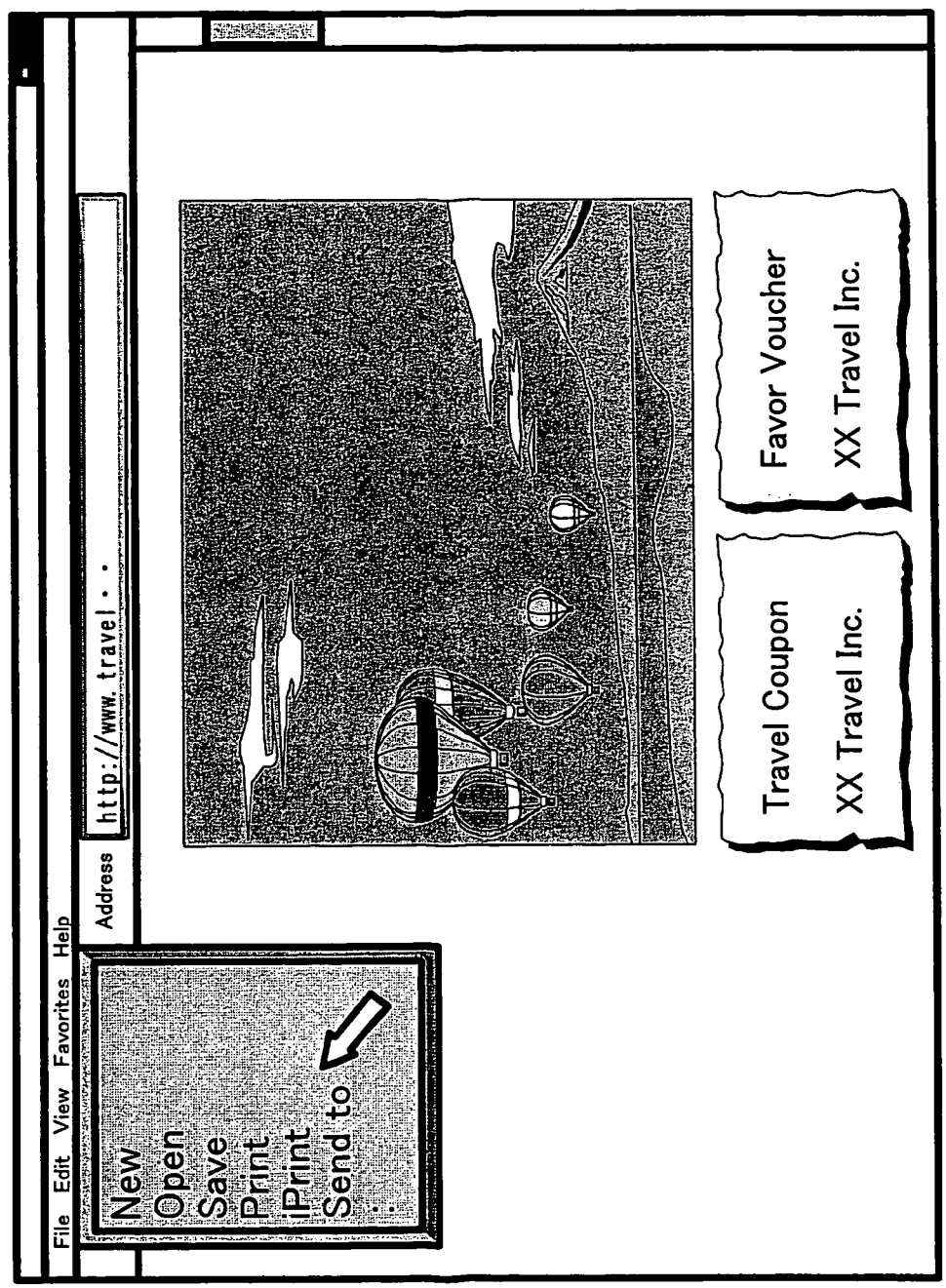
FIG. 18 shows another interface window applied to issue the print request.

FIG. 18 shows another interface window applied to issue the print request. In this example, the Web page is not required to include any extra button. The browser provides this window when the personal computer is the client. The window displays a Web page of a tourist agency including a travel coupon and a favor voucher. When there is any printer locally connected to the computer PC, the user clicks the 'Print' command in the pull-down menu 'File' for execution of the printing operation. In this example, the print request is issued on the similar interface.

When the user clicks the menu name 'File' on the menu bar, a pull-down menu including commands like 'New' and 'Open' appears. The pull-down menu includes the 'iPrint' command as the function of the browser. A user's click of the 'iPrint' command issues the print request. The function of notifying the browsed content provider of selection of the 'iPrint' command is provided in advance in the browser. This actualizes the data transmission shown in either FIG. 15 or FIG. 16. The print portal may provide the browser with an additional module to attain the function.

Figure 19:
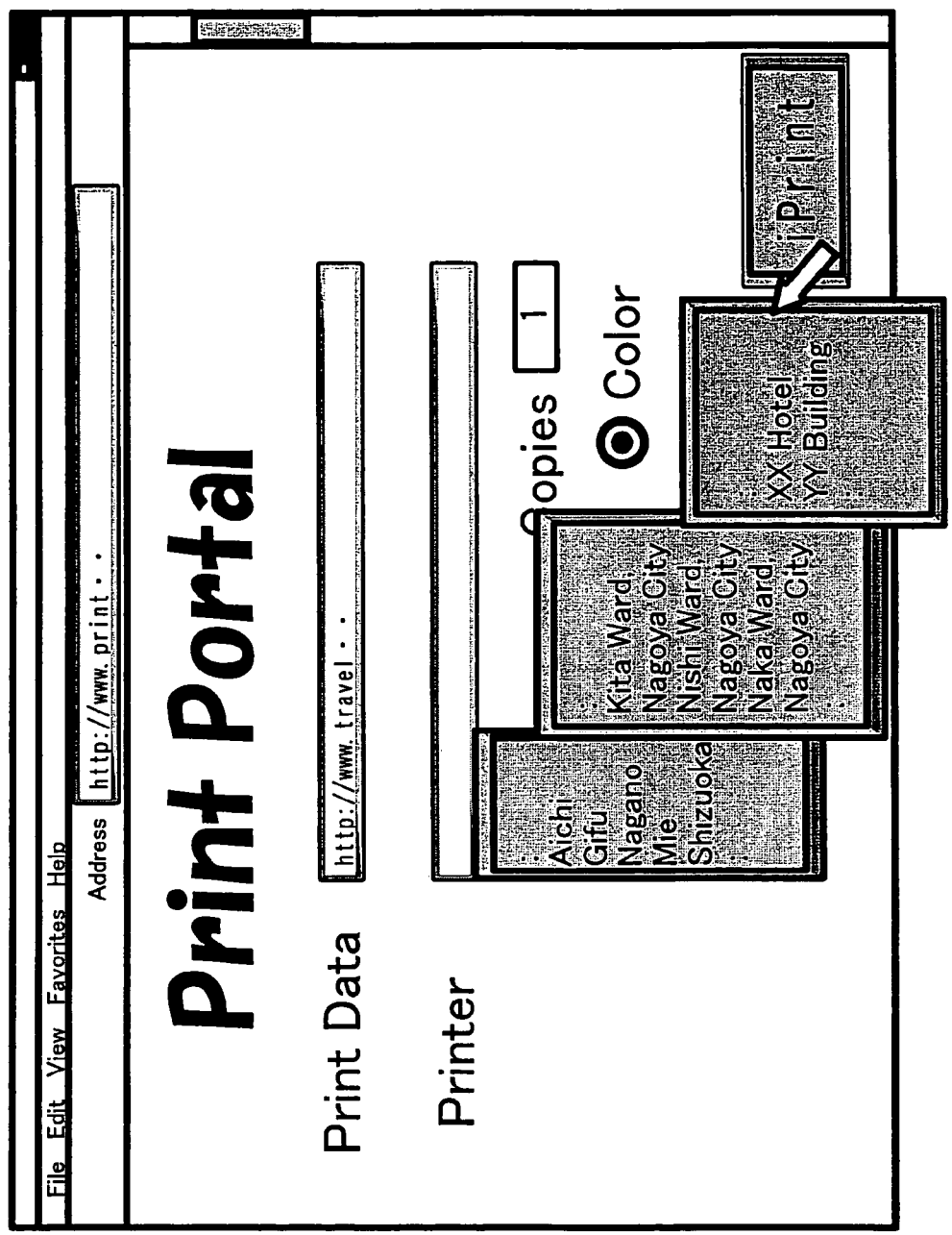
FIG. 19 shows still another interface window applied to issue the print request.

FIG. 19 shows still another interface window applied to issue the print request. In the above examples, the content provider, which provides a content to be printed, is linked with the print portal. In this example, on the other hand, the user gains access to a Web page provided by the print portal and identifies the address of a desired content. In the case where the Web page of the print portal is displayed by the link from an original Web page, which is the object of printing, the URL of the original Web page may be displayed as default information in a specific field of the print data.

The Web page of the print portal has an input box for specifying a printer as the output resource. A diversity of methods may be adopted to specify a printer as the output resource. The window of this example allows selection of a printer in a printer list.

When the user clicks a dialog box for specifying the printer, a first pull-down menu includes relatively wide districts, for example, Aichi Pref., Gifu Pref., and Nagano Pref. When the printer of the desired output resource is located in Aichi Prefecture, the user clicks 'Aichi Pref.'. A second pull-down menu then appears to include relatively narrow regions in Aichi Prefecture, for example, 'Kita Ward, Nagoya City' and 'Nishi Ward, Nagoya City'. When the user clicks 'Naka Ward, Nagoya City' where the printer of the desired output resource is located, the exact locations of all the available printers registered in the print portal service PS are displayed. The user selects the name of the hotel where the user stays, so as to specify the printer PRT of the desired output resource. This arrangement enables a desired printer to be readily selected among available printers by the hierarchical selection.

After specifying the printing conditions including the address of the print data and the desired output resource, the user clicks the 'iPrint' button to issue the print request.

A6. File Conversion

Figure 20:
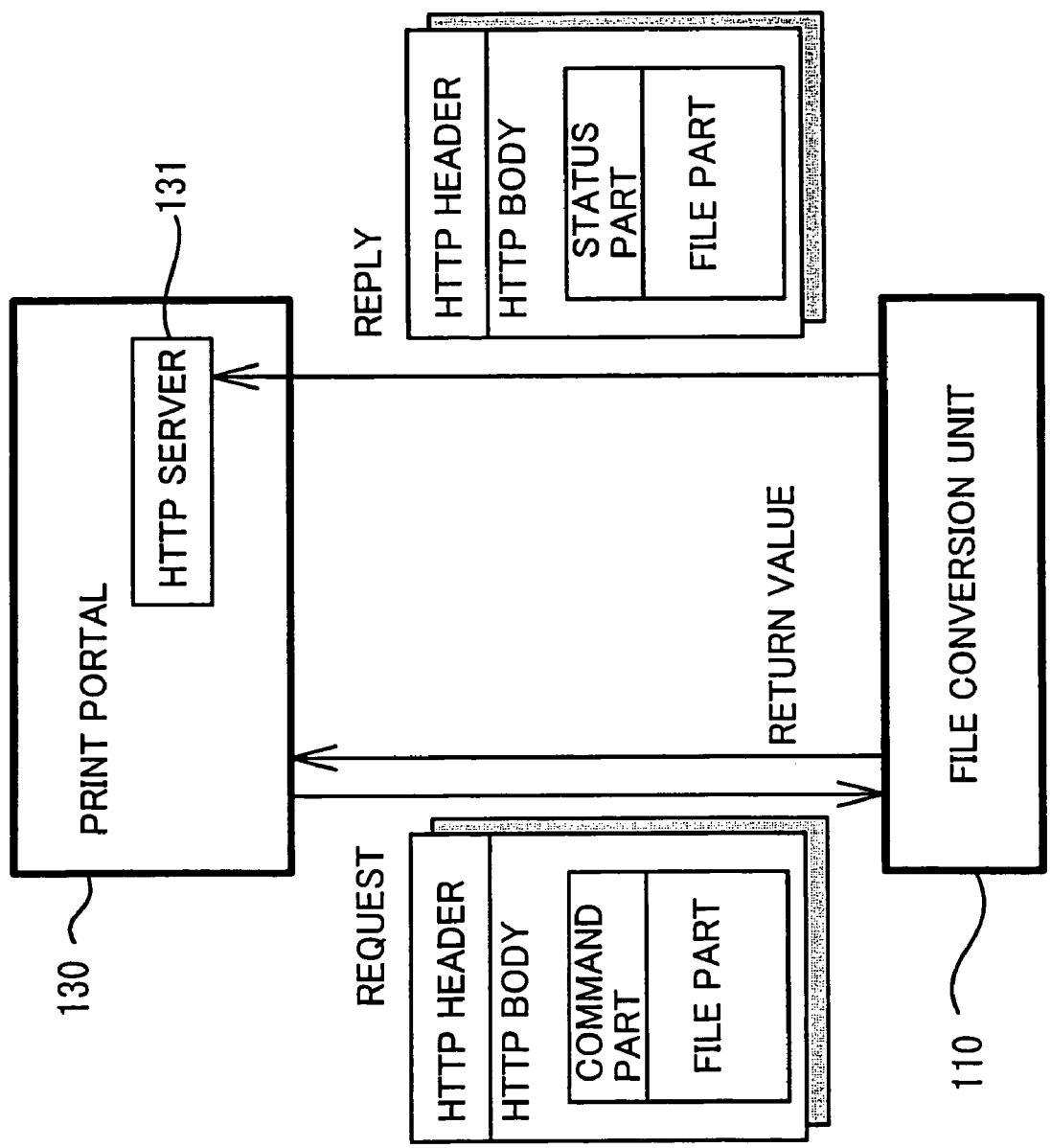
FIG. 20 shows data transmission between the core module 130 and the file conversion unit 110.

FIG. 20 shows data transmission between the core module 130 and the file conversion unit 110. The DF interface 136 is omitted from the illustration, with a view to avoiding the non-required complication.

As mentioned previously, the content to be printed is converted to the general purpose format by the file conversion unit 110. In this embodiment, PDF is applied for the general purpose format. The file conversion unit 110 works according to the messages registered in the queuing system 140. The configuration of this embodiment enables communication between the core module 130 and the file conversion unit 110 and file conversion to be executed at different timings. Such configuration ensures smooth processing even in the case of concentration of many file conversion requirements. Another applicable configuration maintains the communication until the file conversion executed by the file conversion unit 110 is completed.

As illustrated, when the file conversion process starts, a request of file conversion is sent from the core module 130 to the file conversion unit 110. In the configuration of this embodiment, the request is transmitted by the protocol HTTP. The request accordingly has an HTTP header and an HTTP body, which includes a command part and a file part. The command part includes a command for controlling the state of file conversion, and the file part includes a content as the object of file conversion.

The file conversion unit 110 temporarily holds the request and sends a return value, which represents acceptance of the request, to the core module 130. Then the communication between the core module 110 and the file conversion unit 110 is suspended. Meanwhile the file conversion unit 110 may receive another request.

The file conversion unit 110 executes file conversion at a predetermined timing in response to the request, and transfers the result of the file conversion as a reply to the core module 130. In the configuration of this embodiment, the transfer of the file conversion result utilizes a POST command based on the HTTP protocol. In order to enable the transfer utilizing the POST command, the core module 130 is constructed to function as an HTTP server 131. The file conversion unit 110 transmits the replay to the URL specifying the HTTP server 131. The replay has an HTTP header and an HTTP body, which includes a status part and a file part. The status part includes information representing the state of execution of the file conversion job, such as 'completion of conversion'. When the status part includes 'completion of conversion' information, the result of the file conversion is attached to the file part. In the case of any failure of conversion, the status part includes 'error' information. In the case of a replay to the inquiry about the status from the core module 130, the status part includes 'stand-by' information.

The file conversion unit 110 executes the acceptance of the request and the transfer of the file conversion result at different timings. This enhances the rate of file conversion. The file conversion unit 110 posts the file conversion result to the core module 130, so that the core module 130 is free from the process of actively fetching the file conversion result. This arrangement advantageously relieves the load of the core module 130.

A diversity of procedures other than that discussed above may be applied to transfer the file conversion result from the file conversion unit 110 to the core module 130.

In one modified example, the core module 130 provides an internal mail server, and the file conversion unit 110 sends the file conversion result in the form of a mail to this mail server.

In another modified example, the core module 130 carries out polling for the completion of the file conversion executed by the file conversion unit 110 according to the following procedure. The core module 130 gives an inquiry about the status of the file conversion job to the file conversion unit 110 at regular intervals. When the job is incomplete, the return value representing the incomplete state is sent to the core module 130. When the job is complete, on the other hand, the result of the file conversion is sent to the core module 130. This application requires the core module 130 to take the load of polling, but facilitates mounting of the file conversion unit 130.

The communication between the file conversion unit 110 and the core module 130 may be kept over the whole time period from the acceptance of the request to the completion of the file conversion. Another possible application estimates a time required for file conversion based on the file size, and changes the replay timing of the conversion result according to the estimation. When the estimation result requires a relatively long time, the timing of the replay is differentiated from the timing of the registration of the request. When the estimation result requires a relatively short time, on the other hand, the result may be transmitted as the return value to the registration of the request.

Figure 21:
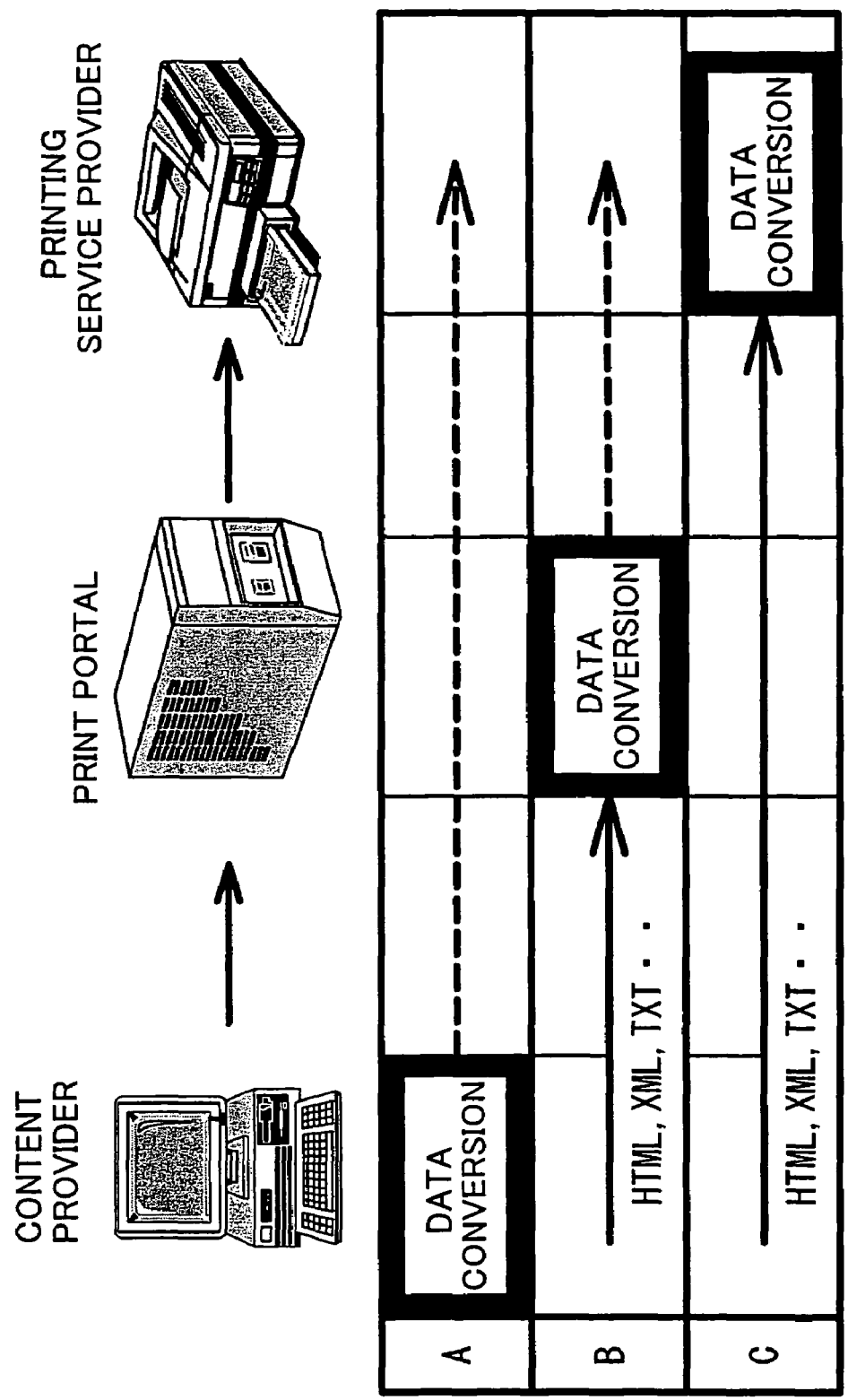
FIG. 21 shows variations on timing of file conversion.

In this embodiment, the file conversion unit 110 is organized inside the print portal 100. The file conversion unit 110 may execute the file conversion in a variety of phases of mediating the print data. FIG. 21 shows variations on timing of file conversion.

Four cases, Case A to Case D, are shown here. For convenience of explanation, original data before file conversion is called 'content', and converted data after file conversion is called 'PDF data'.

In Case A, the content provider carries out file conversion. When the user sends a self-made document from the client to the print portal, the client simultaneously corresponds to the content provider. In Case A, the content provider outputs data in the form of a PDF file. Neither the print portal nor the printing service provider is required to carry out the file conversion.

In Case B, the print portal carries out file conversion. This corresponds to this embodiment. The content transmitted to the print portal in Case B may follow any of diverse formats, for example, HTML, XML, text file, JPEG. The data output from the print portal to the printing service provider are unified to the PDF file.

In Case C, the printing service provider carries out file conversion. Data of various formats are supplied from the content provider to the printing service provider via the print portal, and are unified to the PDF file immediately before transmission to the printing station. As the printing service provider is individually organized by each business proprietor, the business proprietor may individually select the format after the file conversion.

B. Examples of Printing

A variety of examples utilizing the system of the embodiment are discussed below.

B1. Printing Mails

Figure 22:
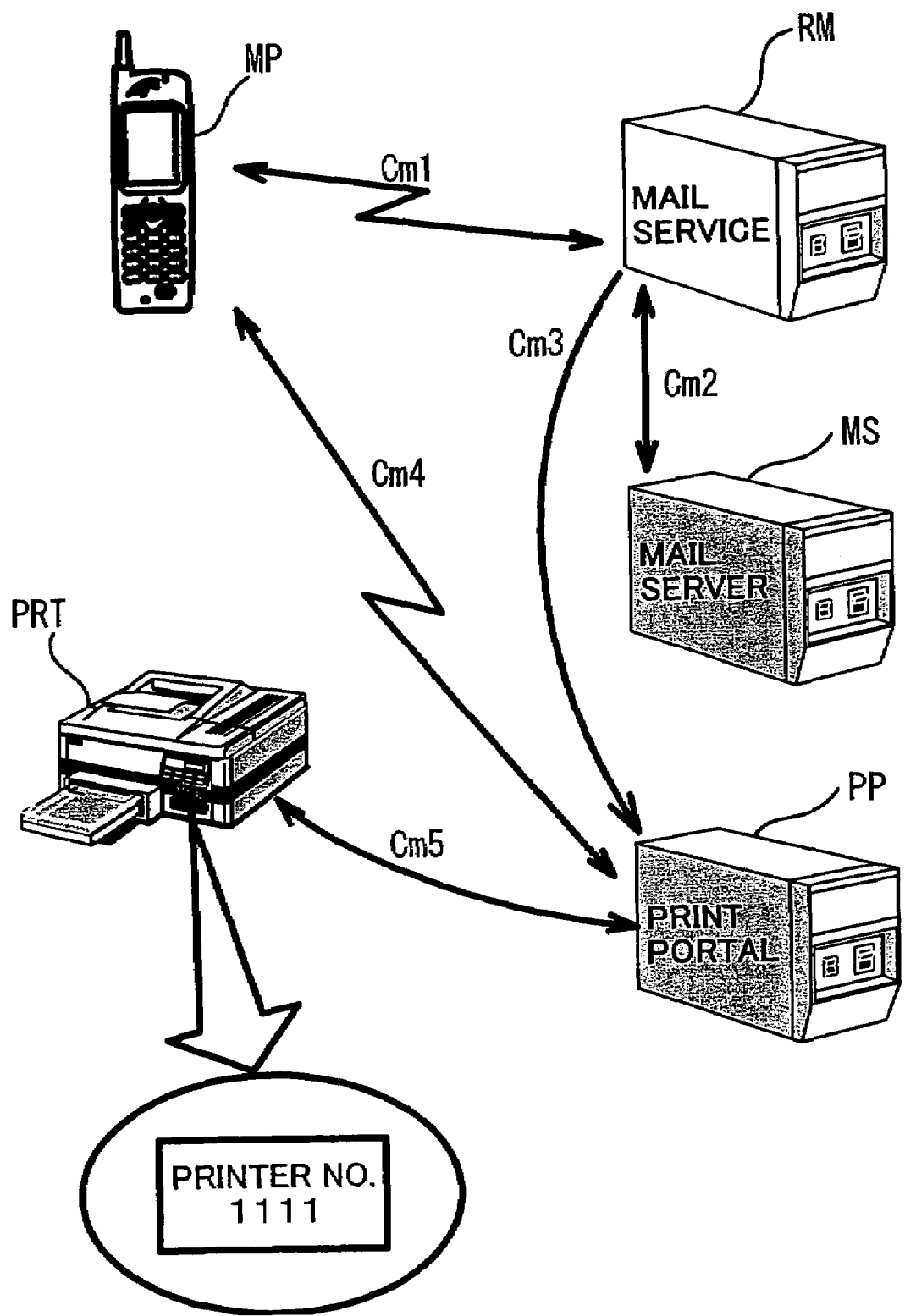
FIG. 22 shows connection in the case of printing E mails.

FIG. 22 shows connection in the case of printing E mails. In this example, the user operates a mobile phone MP having the function of access to E mails and causes selected E mails, which are addressed to the user, to be printed. A printer PRT is located in a public space, for example, in a store like a convenience store, a hotel, or a public hall. This system is especially effective for printing various data with a printer located in the public space. The system may alternatively utilize the printer that is under the user's control, for example, at home or in an office. The mobile phone MP corresponds to the client, a mail service RM and a mail server MS correspond to the content providers, and the printer PRT corresponds to the printing station. The printing service provider is omitted from the illustration.

The printer PRT functioning as the output resource is registered in advance in a print portal PP and is identified by an ID number allocated thereto. In this example, the printer PRT has the ID number '1111'. The ID number is a code set by the print portal PP, irrespective of the information for identifying the printer PRT on the network, for example, an IP address used in the TCP/IP protocol or a URI code used in the IPP protocol. As discussed later, in this example, the user specifies the printer PRT of the desired output resource with this ID number. The arrangement of setting no relation between the information for identifying the printer PRT on the network and the ID number open to the general users enables the address of the printer PRT on the network to be hidden from the public. This effectively prevents unauthorized and illegal accesses.

The print portal PP, the mail service RM, and the mail server MS may be provided by different business proprietors, as long as they are mutually connected. For example, the mail server MS is registered in the mail service RM, which is registered in the print portal PP. The mail service RM offers functions required for printing via the print portal PP as one of the services. These functions include, for example, providing an interface for issuing print requests to the print portal PP and transferring contents to the print portal PP.

Figure 23:
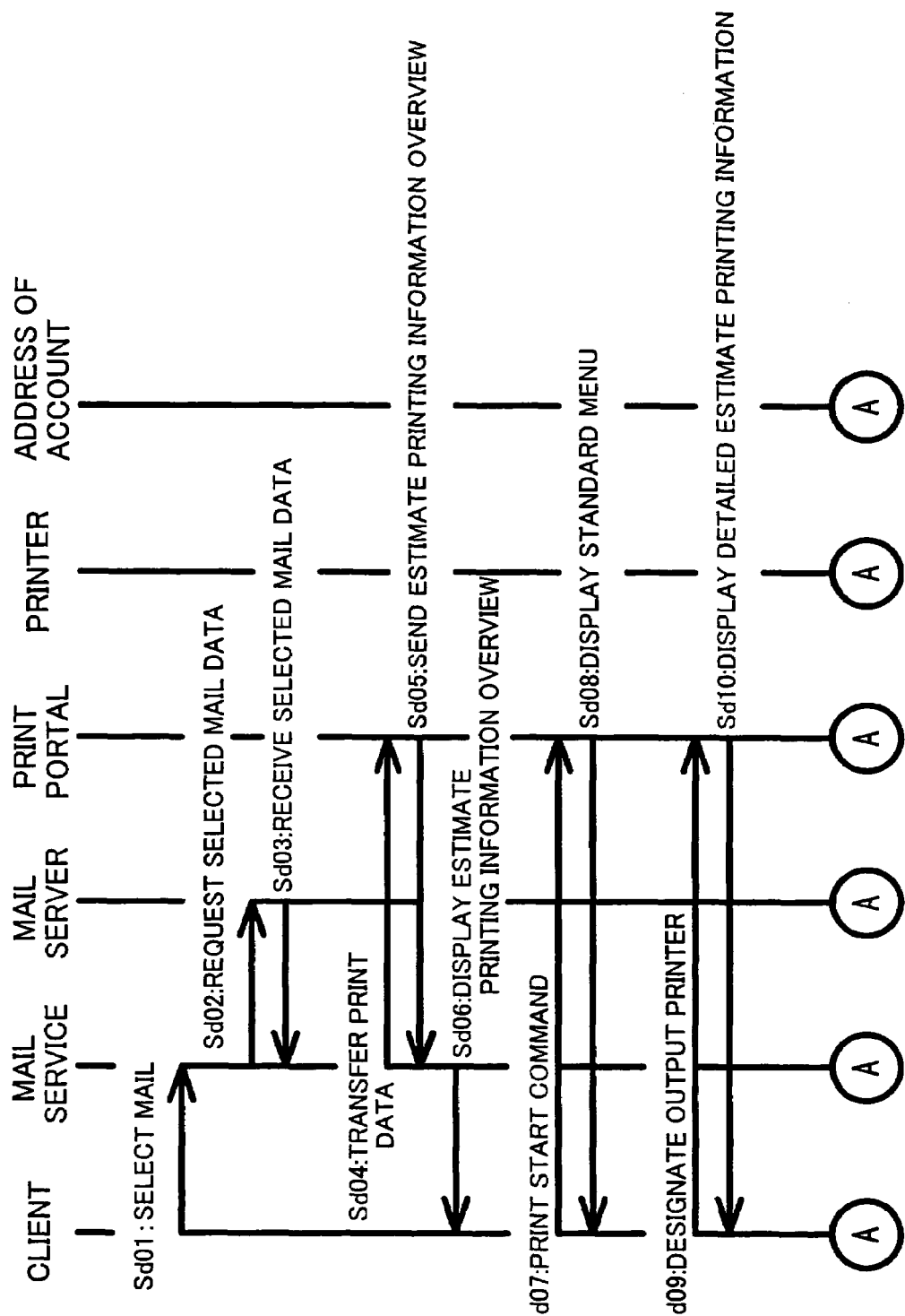
FIG. 23 shows a sequence of printing E mails.
Figure 24:
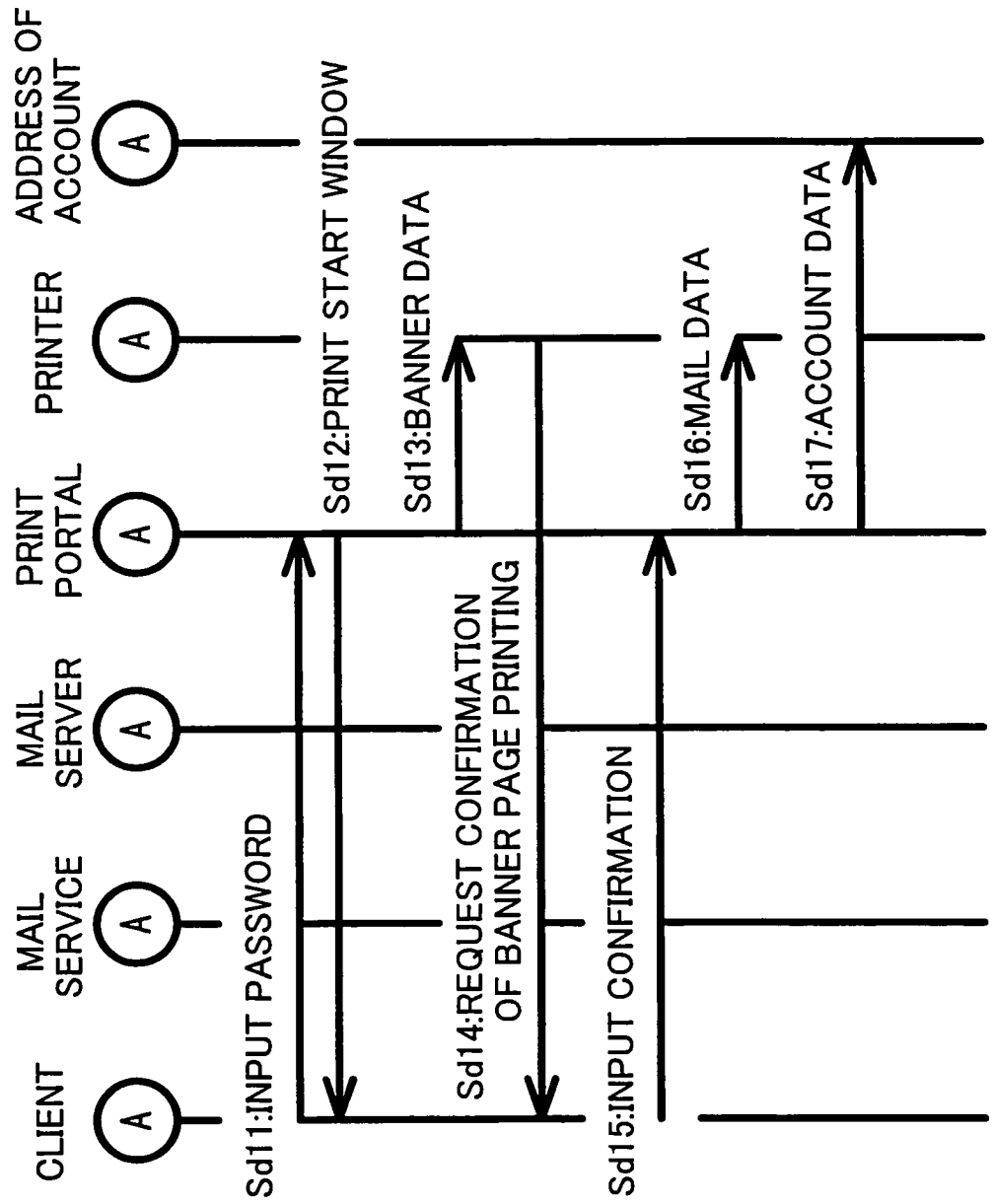
FIG. 24 shows the sequence of printing E mails.
Figure 25:
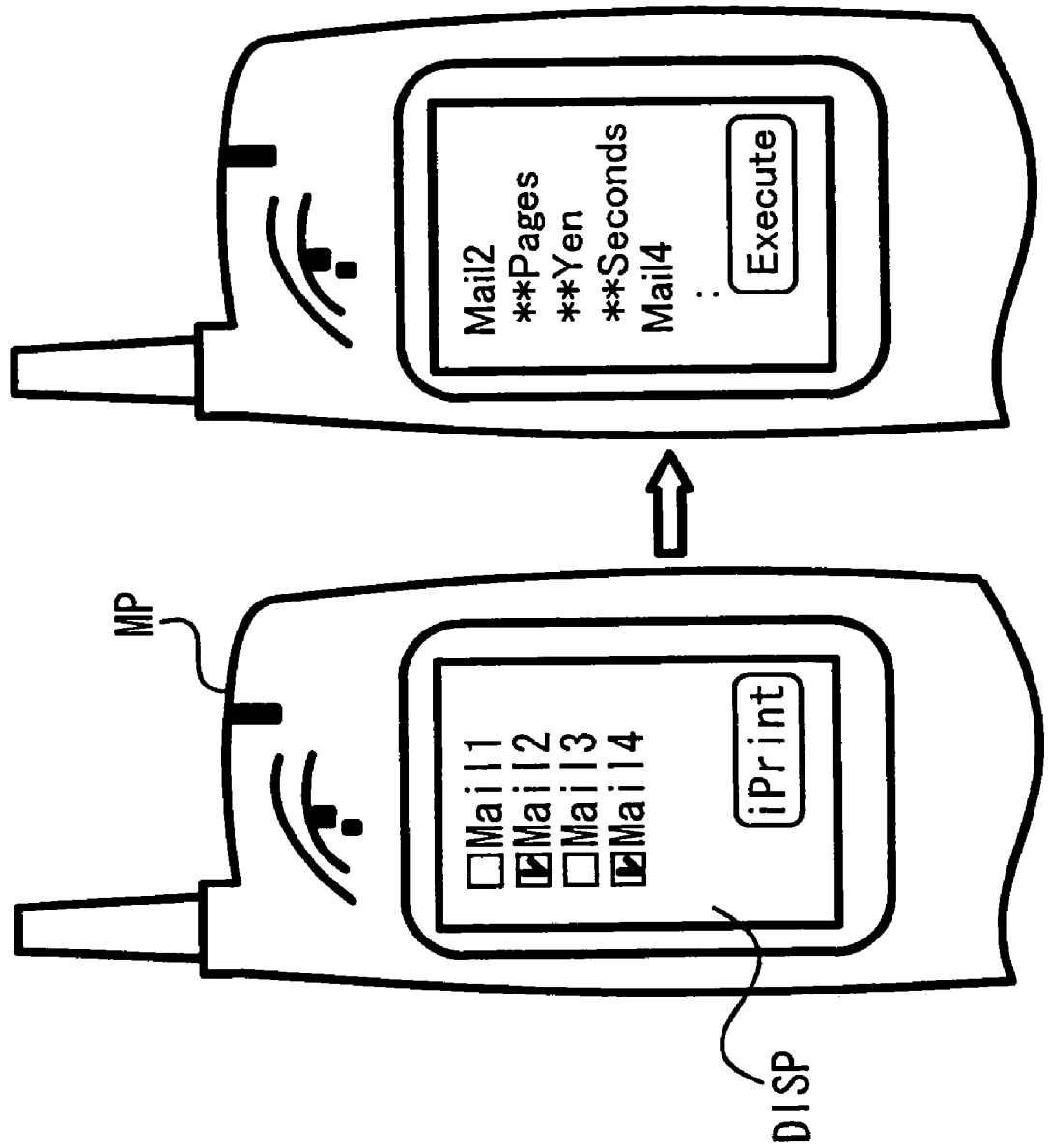
FIG. 25 shows an exemplified interface in the process of printing E mails.
Figure 26:
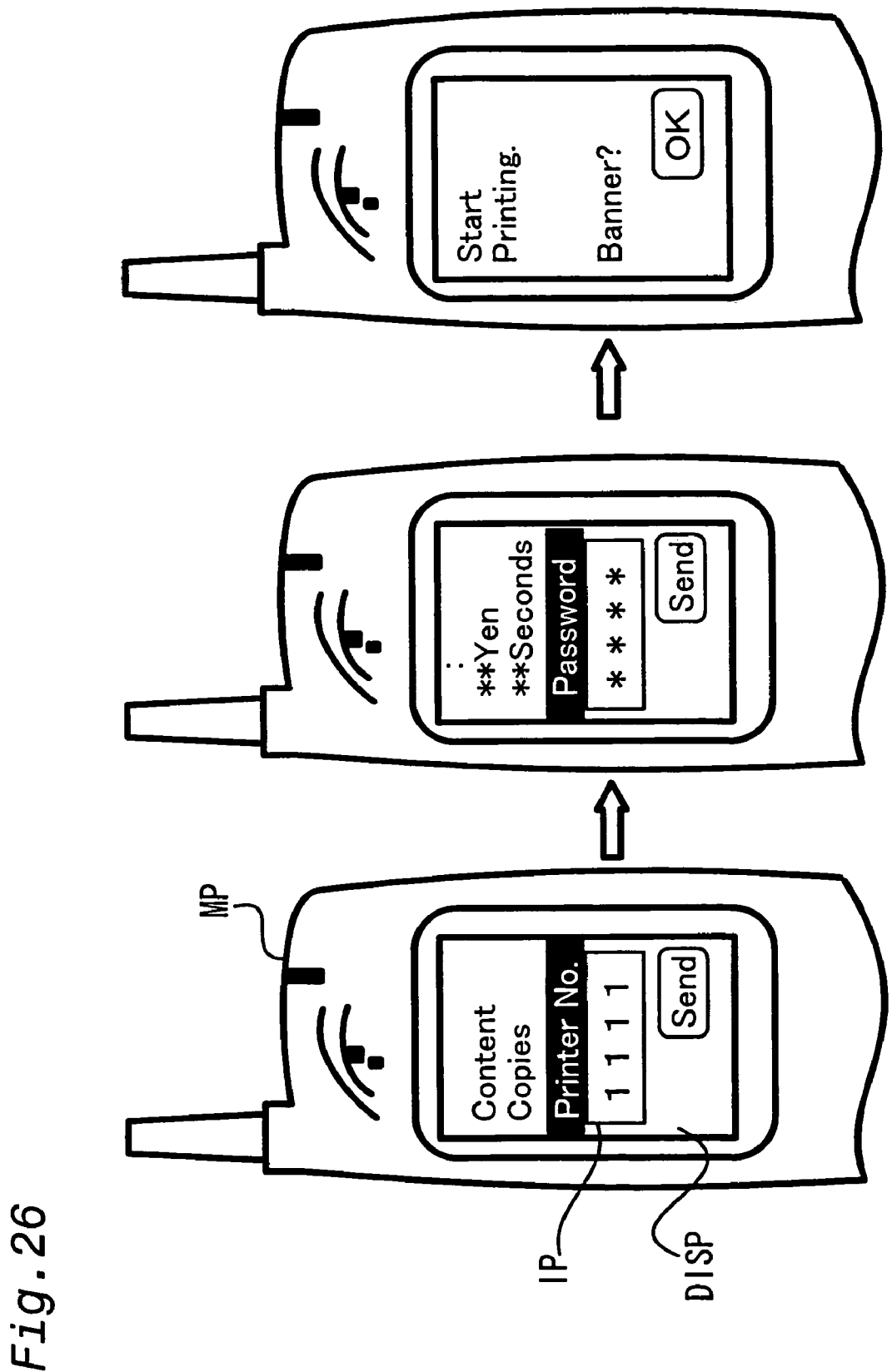
FIG. 26 shows the exemplified interface in the process of printing E mails.

One concrete procedure of printing E mails is discussed below with referring to FIGS. 23 to 26. FIGS. 23 and 24 show a sequence of printing E mails. FIGS. 25 and 26 show an exemplified interface in the process of printing E mails.

The user gains access from the mobile phone MP to the mail service RM (communication Cm1 in FIG. 22). The mail service RM then accesses the mail server MS to fetch data regarding E mails addressed to the user, and displays the data, such as 'where the mail is sent from' and 'subject', on the mobile phone MP (communications Cm2 and Cm1 in FIG. 22). The user selects desired E mails as the objects of printing out of the displayed list of E mails and transmits the selected E mails to the mail service RM (see step Sd01 in FIG. 23).

The left-side drawing of FIG. 25 shows an interface used for selection of desired E mails. A list of E mails addressed to the user is displayed with corresponding checkboxes on a display DISP of the user's mobile phone MP. In this embodiment, there are four mails Mail 1 to Mail 4 addressed to the user. The user operates a cursor key on the mobile phone MP to tick the checkbox corresponding to each E mail of interest as the object of printing. In this example, the user ticks two E mails, that is, Mail 2 and Mail 4. The 'iPrint' button is displayed together with the list of E mails. After ticking the checkboxes corresponding to the E mails to be printed, the user shifts the cursor to the 'iPrint' button and presses the 'iPrint' button to transmit the selected E mails as the results of the selection to the mail service RM. This interface is only illustrative. A diversity of other interfaces are applicable, as long as the interface exerts the function of selecting desired E mails as objects of printing among all the received E mails and the function of transmitting the results of the selection to the mail service RM.

When receiving the results of the selection, the mail service RM accesses the mail server MS and fetches data on the selected E mails (steps Sd02 and Sd03 in FIG. 23). The mail service RM also fetches data of a file attached to the E mail, if any.

The mail service RM then transfers the data on each E mail of interest as the object of printing to the print portal PP through communication Cm3 in FIG. 22 (step Sd04 in FIG. 23). The print portal PP estimates the number of pages to be printed, the charge, and the required time, based on the transmitted information, such as the quantity of print data, and sends back the results of the estimation as an estimate printing information overview to the mail service RM (step Sd05 in FIG. 23). At this moment, the detailed conditions like the output resource and the print mode have not yet been specified, so that the results of the estimation like the charge and the required time include some errors. The data transferred from the mail service RM at step Sd04 should be sufficient for specifying the estimate printing information overview. It is accordingly not required to transfer all the data of the E mail, but transmission of only the information, such as the quantity of data of the E mail and the discrimination code representing color or monochromatic, may be sufficient.

The mail service RM causes the estimate printing information overview received from the print portal PP to be displayed on the mobile phone MP (step Sd06 in FIG. 23). The right-side drawing of FIG. 25 illustrates a display example of the estimate printing information overview. The number of pages to be printed, the charge, and the required time are displayed for each designated E mail. Each field may show the total of all the designated E mails. Fields other than those illustrated in FIG. 25 may be included in the estimate printing information overview.

The user checks the displayed estimate printing information overview and determines execution or non-execution of the printing operation. When the printing operation is to be executed, the user gives a print start command (step Sd07 in FIG. 23). The user presses an 'Execute' button displayed on the display unit DISP with the estimate printing information overview to give the print start command. The print start command may alternatively be given by pressing any button originally set on the mobile phone MP.

The print start command given by the user is transmitted to the print portal PP via the mail service RM through communications Cm1 and Cm3 in FIG. 22 (step Sd07 in FIG. 23). The print data, that is, the text of each E mail and a file attached thereto, if any, is also sent from the mail service RM to the print portal PP. When all the print data has already been sent to the print portal PP at step Sd04, only the print start command is transmitted here. In response to this command, the mail service RM concludes the communication with the mobile phone MP. The subsequent communication is communication Cm4 of FIG. 22 established between the mobile phone MP and the print portal PP.

Receiving the print start command, the print portal PP causes a standard menu of printing to be displayed on the mobile phone MP (step Sd08 in FIG. 22). The left-side drawing of FIG. 26 illustrates a standard menu. The standard menu includes fields for specifying the printing-related conditions, such as the URL of a content of interest to be printed, the number of copies, and the printer of the desired output resource. Selection of a specific field out of this menu changes the display to an input box. The example of FIG. 26 shows the case of specifying the printer of the desired output resource. A box IP for inputting the ID number allocated to the printer of the desired output resource appears in response to selection of the field 'Printer No.' The user inputs the ID number '1111' allocated to the printer PRT of the desired output resource in this box IP. When the user specifies the printer of the desired output resource and presses a 'Send' button, the input ID number is sent to the print portal PP to specify the output printer (step Sd09 in FIG. 23). The other printing conditions, such as the number of copies, are sent simultaneously.

Address information for locating the printer PRT of the desired output resource on the network, for example, an IP address or a URI, has been registered in advance in the printing service provide or in the print portal PP. Information on the type of the printer like an inkjet printer or a laser printer, as well as other required pieces of information have been registered in the print portal PP. The print portal PP specifies detailed estimate printing information based on the registered information and causes the estimate printing information to be displayed on the mobile phone MP (step Sd10 in FIG. 23).

It is desirable to display the ID number of the printer as the desired output resource, together with the detailed estimate printing information. The display effectively prevents the printing operation from being carried out at any unintentional place, due to the user's input of a wrong ID number.

The user confirms the detailed estimate printing information and gives a print execution command (step Sd11 in FIG. 24). In this embodiment, the user inputs a password assigned to the user, to give the print execution command. The input of the password proves that the user agrees with the specified printing conditions.

The center drawing of FIG. 26 shows an interface window for inputting the password. After the display of the detailed estimate printing information including the charge and the required time, the display is changed to an input box for inputting the password. When the user inputs the password and presses the 'Send' button, the input password is sent to the print portal PP. Although the password is displayed as '****' in this embodiment, the input password may be displayed explicitly.

The user password has been registered in advance in the print portal PP. The print portal PP refers to the registered information and verifies the identity of the logging-on user as an authorized user having the right of access to the printer PRT. In the case of the authenticated user, the display on the mobile phone MP is changed to a print start window (step Sd12 in FIG. 24). Simultaneously, the print portal PP transmits preset banner data to the printer PRT through communication Cm5 in FIG. 22 and causes the printer PRT to print a banner ad (hereinafter referred to as the banner page) (step Sd13 in FIG. 24).

The banner data may be kept in advance in the print portal PP or may be sent from a specific content provider. With a view to saving the resource, it is desirable to transfer the content and the banner data to the file conversion unit 110 each time. The banner data is provided by diverse sponsors that desire the use of the print portal PP. The display on the mobile phone MP is then changed to a check window to request the user to confirm successful printing of the banner page (step Sd14 in FIG. 24). The right-side drawing of FIG. 26 shows an example of such display.

Printing the banner page has two major advantages discussed below. The first advantage is to gain advertising rates from dealers, sales agents, and traders that desire to advertise. This reduces the cost of the users that utilize the print portal PP. The second advantage is test printing. The banner page without any secrecy is printed first and the result of printing is checked. This desirably prevents the wrong designation of the desired output resource and the wrong settings of the printing conditions. This is especially effective for printing documents with high secrecy.

The user confirms successful printing of the banner page and presses an 'OK' button shown in FIG. 26 to notify the print portal PP of the confirmation (step Sd15). The print portal PP sends data of all the designated E mails to the printer PRT in response to the notification (step Sd16 in FIG. 24). On completion of printing all the designated E mails, the print portal PP outputs data regarding the total account of printing to the address of account (step Sd17 in FIG. 24). This concludes the series of processing.

A diversity of settings may be applied for the address of account. In the case of charged mail service RM, the mail service RM may carry out the accounting procedures. In this case, the account information is transmitted to the mail service RM. The accounting procedures may also be carried out by the carrier of the mobile phone MP, by the print portal, or at the store or any other place where the printer PRT is located.

Figure 27:
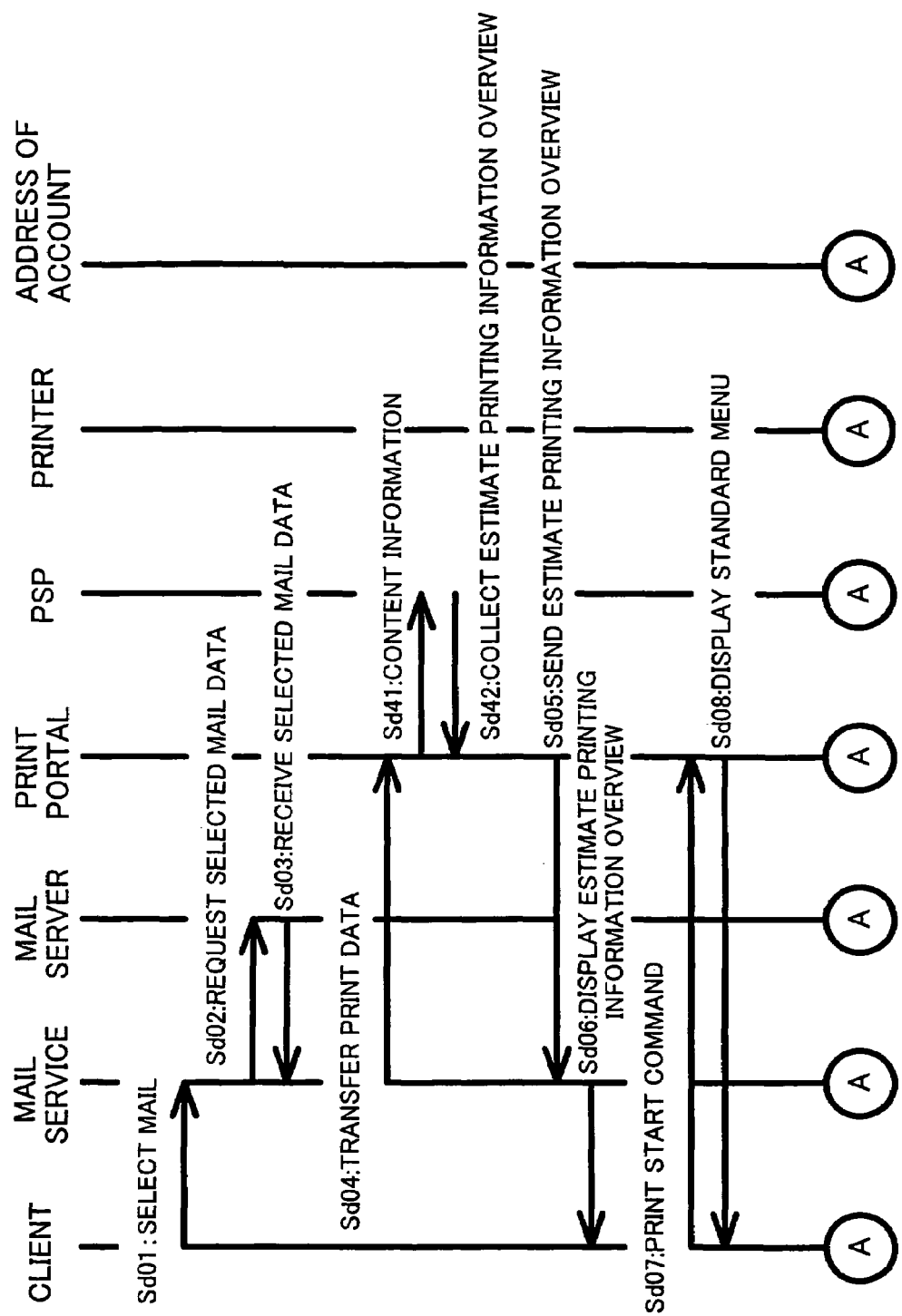
FIG. 27 shows a sequence of printing E mails by a modified procedure.
Figure 28:
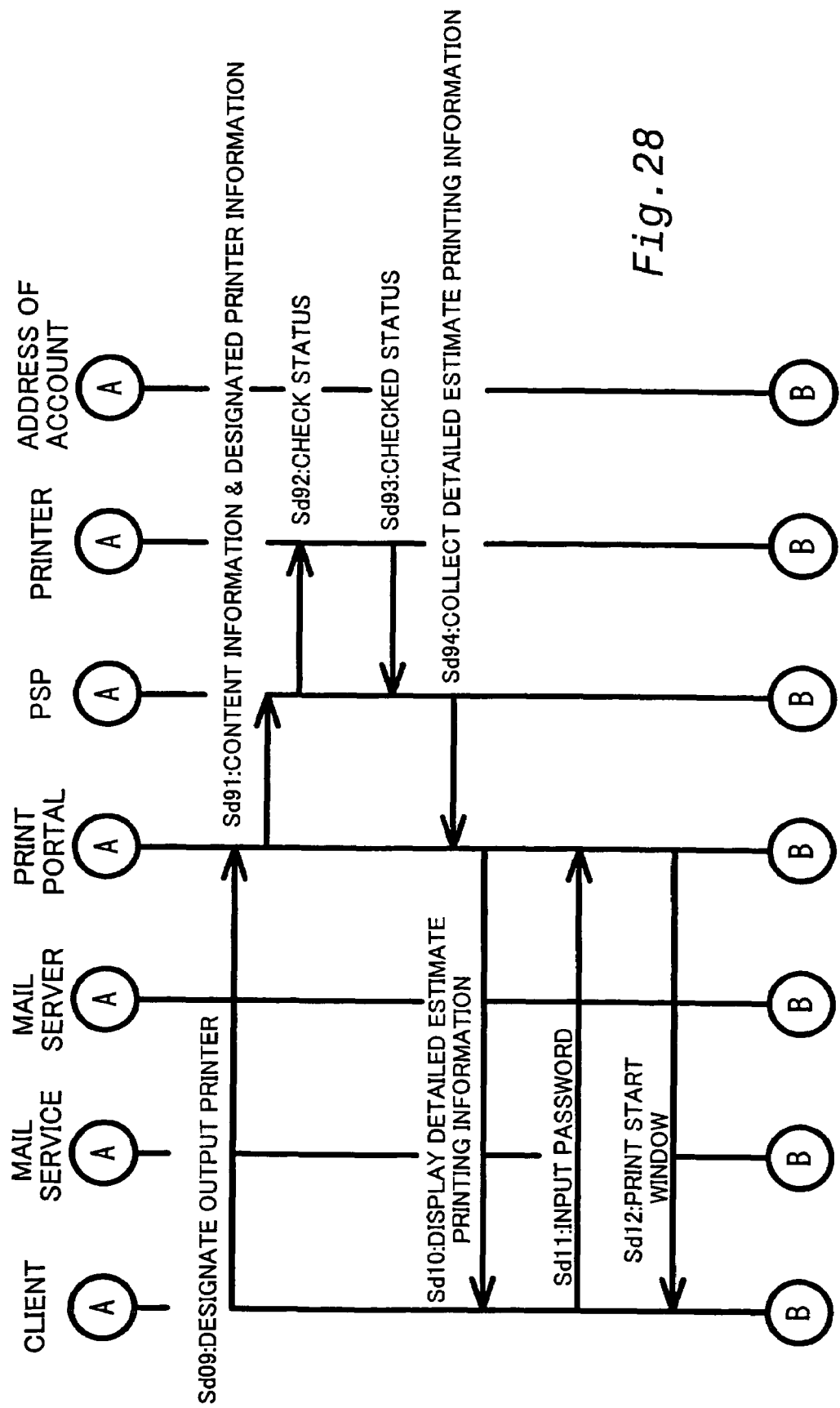
FIG. 28 shows the sequence of printing E mails by the modified procedure.
Figure 29:
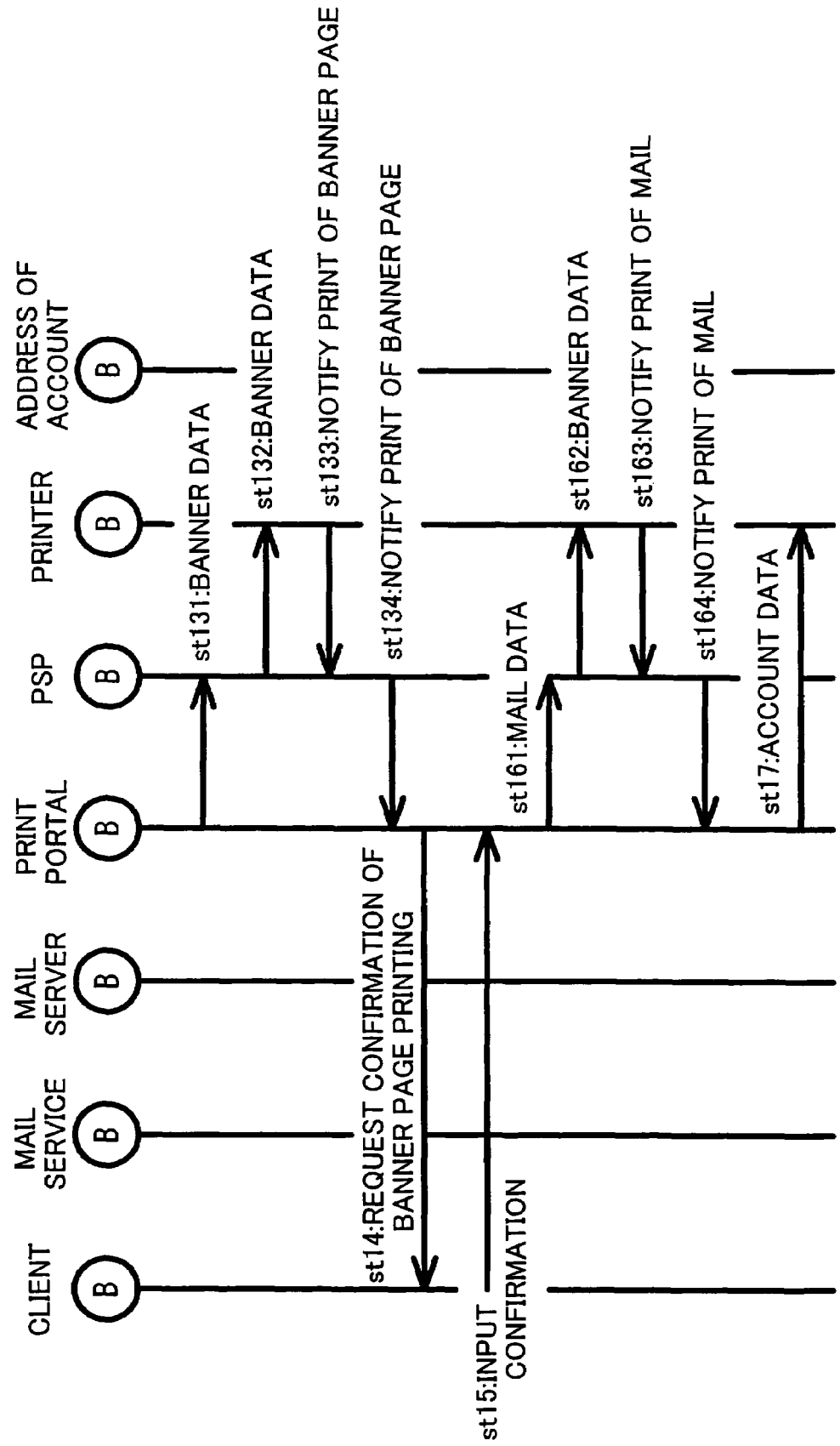
FIG. 29 shows the sequence of printing E mails by the modified procedure.

FIGS. 27 to 29 show a sequence of printing E mails by a modified procedure. This modified example shows the sequence including the printing service provider. The printing service provider (PSP) not only mediates data but carries out the processing related to the performances and the status of the printer under control.

In this modified example, the print data is transmitted from the mail service RM to the print portal at steps Sd01 to Sd04 discussed above. The print portal outputs content information to the printing service provider (step Sd41), in order to collect estimate printing information overview. The printing service provider specifies the estimate printing information overview based on the content information and sends back the estimate printing information overview to the print portal (step Sd42). The procedure subsequently carries out the series of processing in the same manner as the above example, such as the display of the estimate printing information overview on the mobile phone MP (steps st5 to st8). The print portal may alternatively specify the estimate printing information overview.

When the user designates the output printer (step Sd09), the print portal outputs the content information and information regarding the designation of the printer to the printing service provider (step Sd91), in order to collect detailed estimate printing information. The printing service provider checks the current status or working conditions of the printer based on the received information (steps Sd92 and Sad93), specifies detailed estimate printing information, and sends back the detailed estimate printing information to the print portal (step Sd94). The check of the working conditions determines whether the remains of expendables, such as printing paper and toner set in the printer, are sufficient for printing all the designated contents. When there is a fear of failure in printing, for example, in the case of insufficient remains of the expendables, a notice telling 'no printing due to insufficient expendables' is displayed on the mobile phone MP.

When there is no fear of failure in printing, on the other hand, the print portal displays the detailed estimate printing information, receives input of the password, and displays the print start window (steps Sd10, Sd11, and Sd12) and causes the printer to print the banner page. The banner data is transmitted from the print portal to the printer via the printing service provider (steps Sd131 and Sd132). The notification showing completion of the printing operation is sent back to the print portal via the inverse route (steps Sd133 and Sd134).

When the user confirms successful printing of the banner page in response to the request from the print portal (steps Sd14 and Sd15), the print portal starts printing the designated E mails according to the same procedures as those of printing the banner page (steps Sd161 to Sd164). On completion of printing, the print portal transmits the account data to the address of account (step Sd17).

The two sequences of printing E mails discussed above are only illustrative, and all the processing steps may not be essential. One possible modification may omit the display of the estimate printing information overview (steps Sd5 to Sd7 in FIG. 23) or printing of the banner page (steps Sd12 to Sd15 in FIG. 24). Another possible modification may allow the user to make a choice about printing the banner page.

B2. Printing Web Pages

Figure 30:
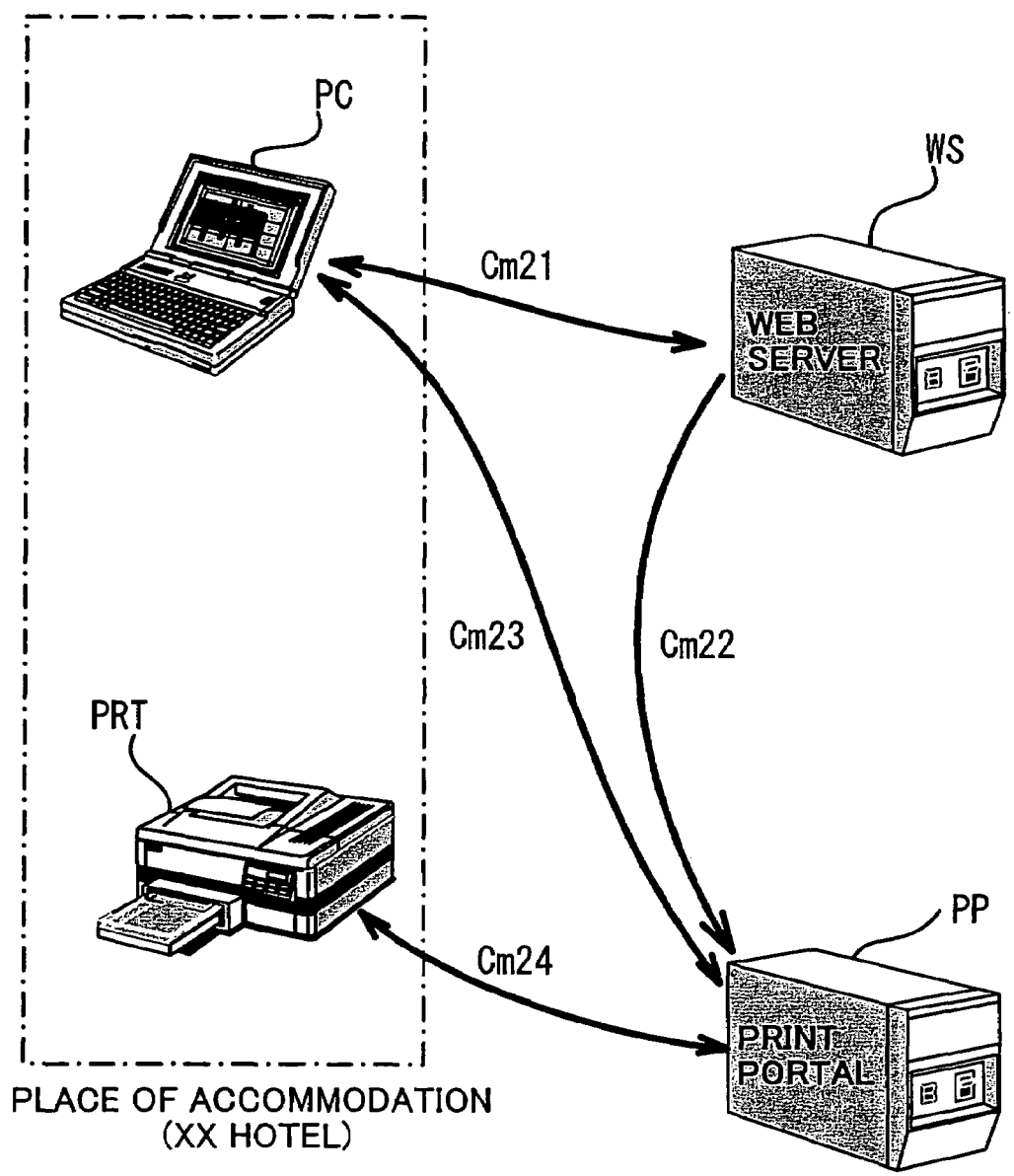
FIG. 30 shows connection in the case of printing Web pages.

FIG. 30 shows connection in the case of printing Web pages. In this example, the user requires printing Web pages browsed on a mobile computer PC, while there is no printer locally connected to the printer PC. A printer located in the place of accommodation where the user stays is utilized as the output resource. The same procedures may be adopted when the user designates a printer under its own management, for example, a printer located at home or in an office. The computer PC corresponds to the client in this example, although the client may be a mobile phone.

The computer PC as the client, the printer PRT as the desired output resource, the print portal PP, and a Web server WS providing data of browsed Web pages are involved in this printing process. These constituents are all connected to a network to allow mutual data transmission. The printer PRT of the desired output resource is registered in advance in the print portal PP.

The user downloads data from the Web server WS to the computer PC through communication Cm21 in FIG. 30 and browses Web pages. The user who requires printing the browsed Web pages gains access to the print portal PP and causes the printing operation to be executed with the designated printer PRT located in the place of accommodation.

The interface shown in FIG. 17, for example, may be utilized to issue the print request.

The sequence of processing after the issuance of the print request follows the sequence of printing E mails. The print portal PP causes the computer PC to display printing information, input the password, and confirm successful printing through communication Cm23. In response to a print execution command, the print portal PP transmits banner data to the printer PRT and causes the printer PRT to successively print the banner page and designated Web pages through communication Cm24.

B3. Printing Tickets

The above examples use plain paper for printing. The following describes the case of printing tickets as an example of restricting the printing paper to special paper. The user gains online or offline access to a ticket center and reserves a ticket, for example, for a concert. At this moment, the user receives a reservation number from the ticket center. The user accesses the ticket center again, identifies the reservation number, and prints the ticket via the print portal. Printing on plain paper is prohibited to guarantee the validity of the ticket. Namely printing is restricted on specific paper exclusively provided for printing tickets. The restriction is not changed by the user but is set by the ticket center TC.

Figure 31:
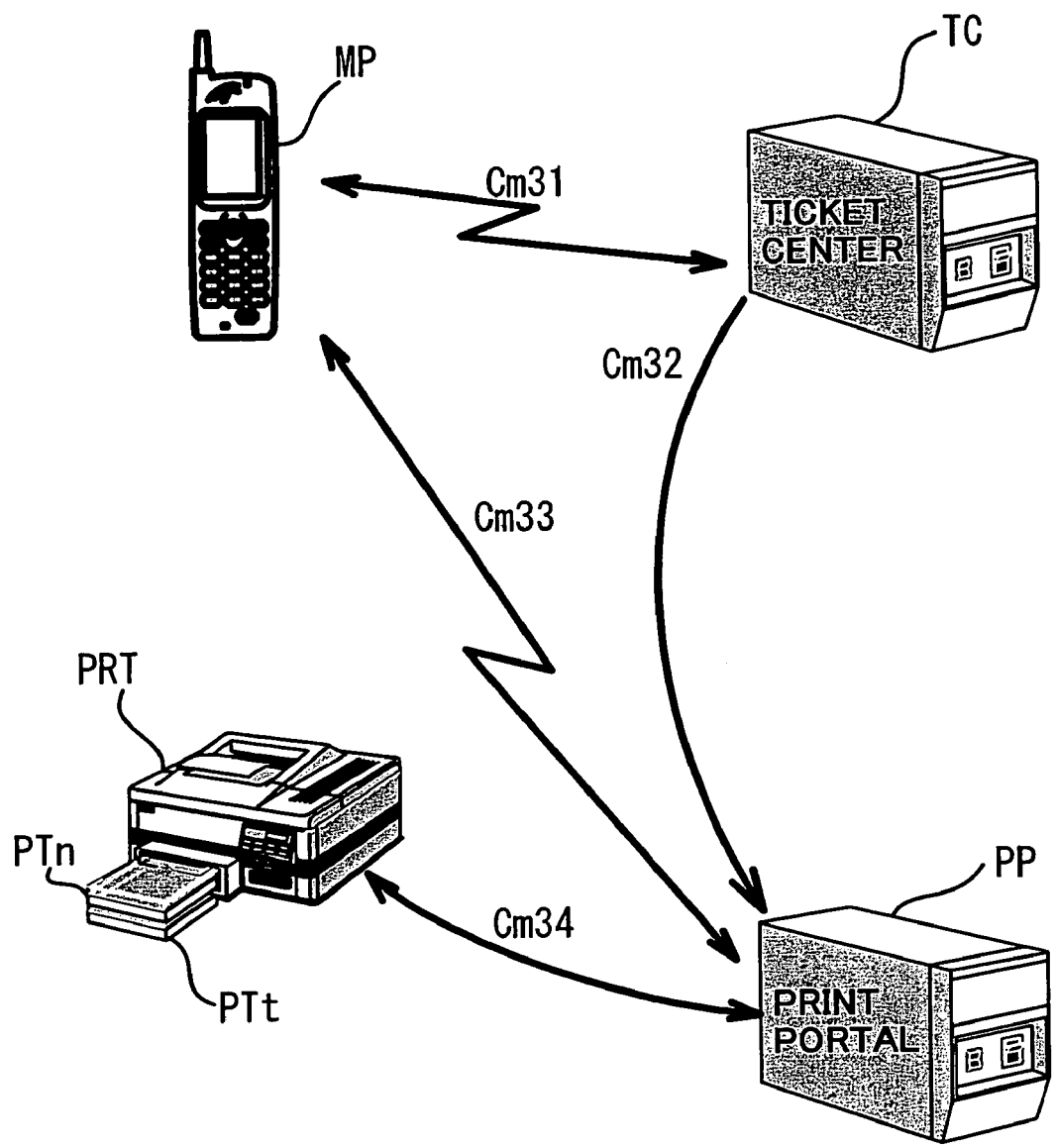
FIG. 31 shows connection in the case of printing tickets via the print portal.

FIG. 31 shows connection in the case of printing tickets via the print portal. In this example, tickets are printed with a printer that is located at a store and is available for printing tickets, in response to operations of the mobile phone MP.

In the case of printing tickets, the mobile phone MP corresponds to the client, the printer PRT corresponds to the printing station, and a ticket center TC corresponds to the content provider.

The user gains access from the mobile phone MP to a Web page provided by the ticket center TC through communication Cm31. The user identifies the reservation number and presses the 'iPrint' button on the Web page to issue a print request. In response to this print request, the ticket center TC transmits print data of the corresponding ticket to the print portal PP through communication Cm32. Subsequent communication is established between the mobile phone MP and the print portal PP.

Figure 32:
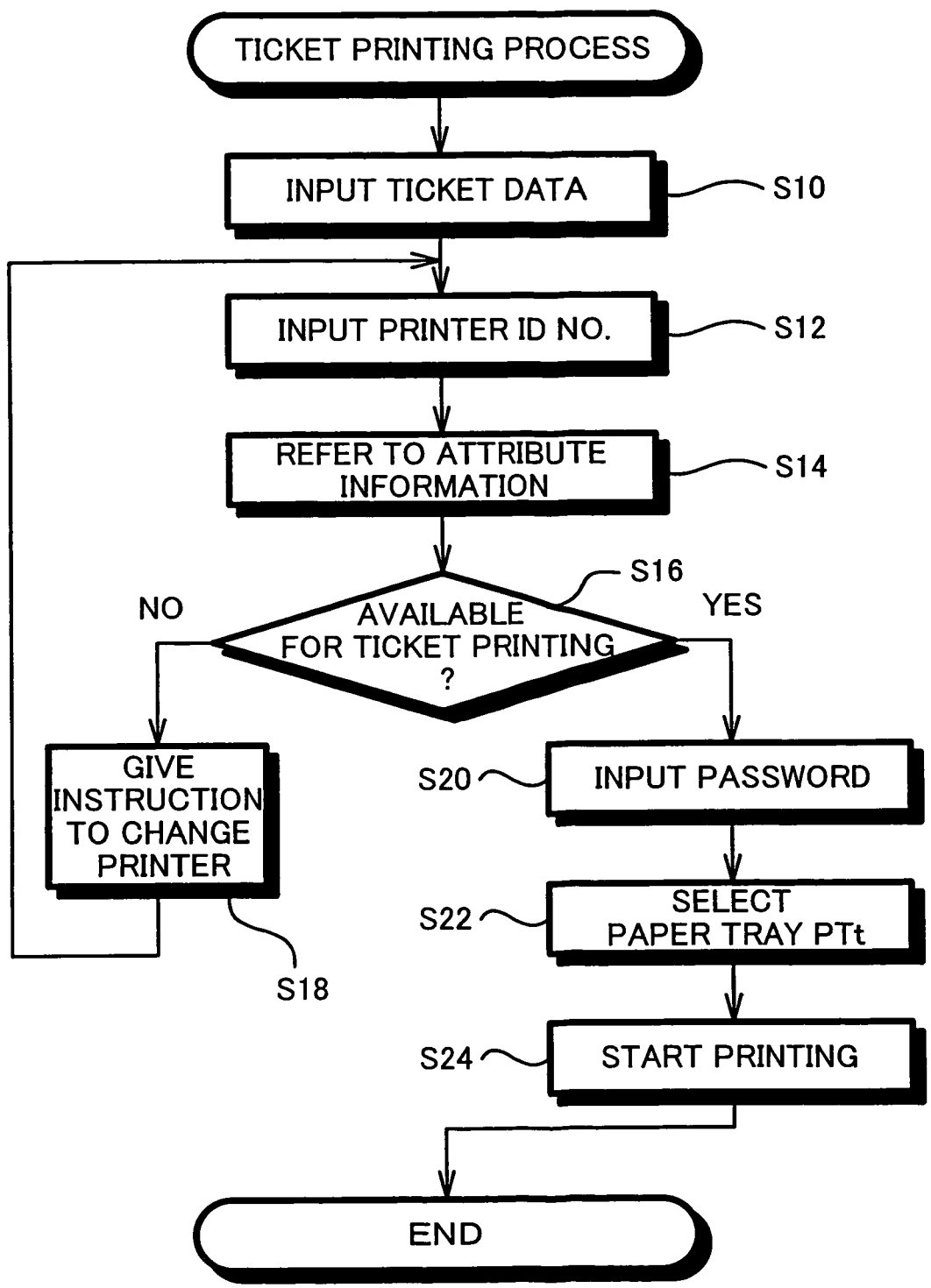
FIG. 32 is a flowchart showing a ticket printing process executed by the print portal.

FIG. 32 is a flowchart showing a ticket printing process executed by the print portal. The print portal PP first receives the print data of the ticket and a printer ID number allocated to the printer of the desired output resource (steps S10 and S12). The ID number is transmitted in advance by the interface shown in FIG. 26.

The print portal PP subsequently refers to attribute information mapped to the printer ID number (step S14) and determines whether or not the designated printer is available for printing tickets (step S16). The printer available for printing tickets means a printer provided with an exclusive ticket paper tray PTt in addition to a standard paper tray PTn.

When the user's designated printer is not available for printing tickets, the print portal PP displays an instruction to change the designation of the printer on the mobile phone MP (step S18) and waits for input of another printer ID number (step S12).

When the user's designated printer is available for printing tickets, on the other hand, the print portal PP authenticates the user as an authorized user based on the input password (step S20), outputs a signal for selecting the exclusive ticket paper tray PTt to the printer (step S22), and outputs the print data of the ticket to the printer (step S24).

The above explanation regards the simplified sequence, and the sequence may additionally include the display of estimate printing information and the confirmation of successful banner printing. In the case of printing tickets, there is a greater necessity of guaranteeing transfer of the print to the authenticated user, compared with the case of standard printing. The banner printing accordingly has high effectiveness as test printing. In order to enhance the certainty of transferring the print to the authenticated user, the procedure may print a randomly set password with the banner page and ask the user to input this password, in place of pressing the 'OK' button shown in FIG. 26. The procedure may also control selection of the paper tray to use the standard paper tray PTn for banner printing.

B4. Printing User's Own Documents

Figure 33:
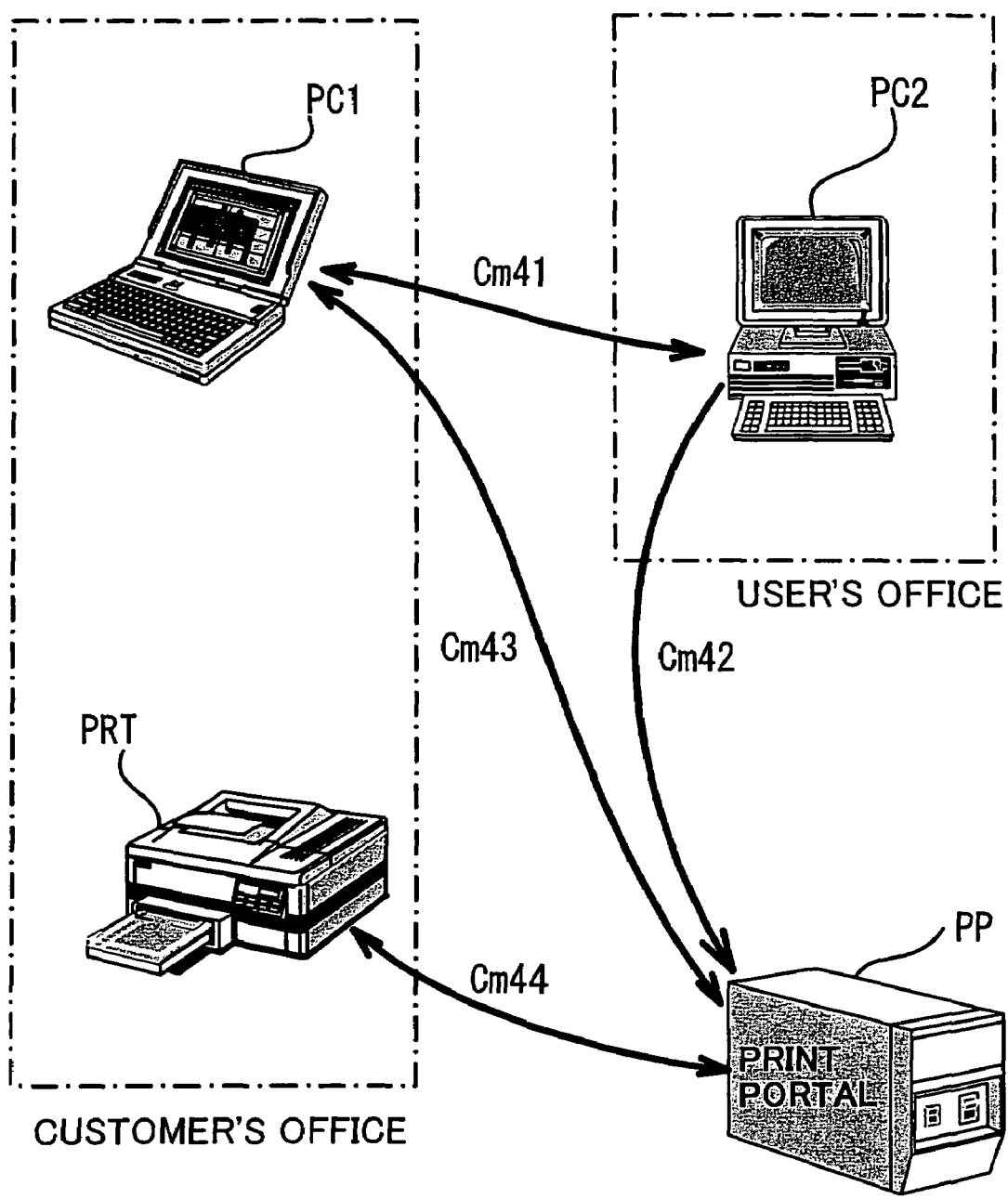
FIG. 33 shows connection in the case of printing user's own documents via the print portal.

FIG. 33 shows connection in the case of printing user's own documents via the print portal. In one case of this example, the user creates an estimate sheet with a mobile computer PC1 at a customer's office and prints the estimate sheet with a printer at the customer's office. In another case of this example, the user inputs data at the customer's office, transmits the input data to the user's office, causes an estimate sheet to be created with a computer PC2 at the user's office, and prints the estimate sheet with a printer at the customer's office. It is assumed that the printer used as the output resource does not have any ID number.

In this example, the computers PC1 and PC2 correspond to the client and the content provider, while the printer PRT corresponds to the printing station.

In the first case, the user creates an estimate sheet with the user's own computer PC1. The user gains access to a Web page provided by the print portal PP for printing through communication Cm43 shown in FIG. 33. As discussed previously with FIG. 19, this Web page allows settings for the diversity of printing-related conditions. A print request is issued when the user specifies printing-related conditions, such as the address of the print data and the desired output resource, and gives a 'Print Start' command.

Figure 34:
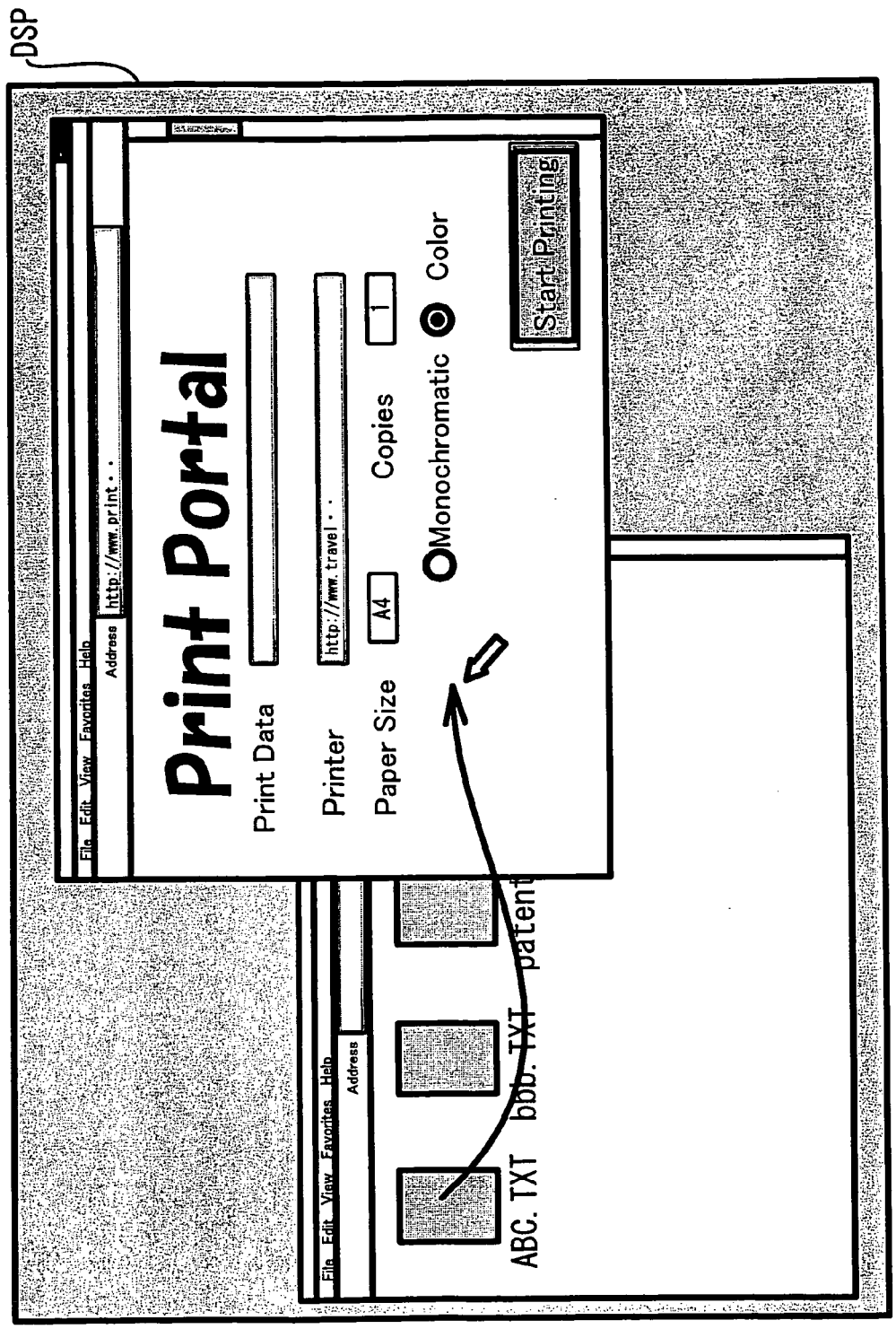
FIG. 34 illustrates an exemplified interface in the process of printing user's own documents.

FIG. 34 illustrates an exemplified interface in the process of printing user's documents.

The print data is present in the computer PC1, so that the user inputs a pass representing the address of the print data. In response to the print start command, the designated file is transferred to the print portal PP, for example, by FTP (File Transfer Protocol). The user may input the pass via the keyboard or by a drag and drop operation as shown in FIG. 34. In this example, a window of a 'Print Portal' Web page and a window showing files present in the computer PC1 in the form of icons are open on a display DSP of the computer PC1. The user drags a file of interest 'ABC.TXT' as the object of printing and drops the dragged file onto the 'Print Portal' Web page, so that the pass representing the address of the print data is written into an input box of the field 'Print data'.

In this example, the printer does not have the ID number, so that address information for locating the printer on the network is input into the input box of the field 'Printer'. The address information may be, for example, an IP address or a URI (Uniform Resource Indicator). In this example, an URI is input into the input box.

The sequence of the processing after the input of such conditions follows the sequence of the examples discussed previously. The print portal PP receives the print data and transmits the print data to the printer designated as the desired output resource.

The above description regards the case of transmitting the file of interest to be printed from the user's computer PC1 to the print portal PP. The information for specifying the file, that is, combination of the pass representing the address of the file in the user's computer PC1 with the address of the user's computer PC1 on the network, may alternatively be transmitted to the print portal PP. In this arrangement, the print portal PP fetches the file of interest as the object of printing from the computer PC1 based on the transmitted information, and causes the file to be printed.

In the second case, the user causes the estimate sheet to be created by the computer PC2 at the user's office and to be printed with the printer at the customer's office. The user inputs data for estimation into the user's own computer PC1 at the customer's office, and transmits the input data to the computer PC2 at the user's office through communication Cm41. The computer PC2 at the user's office creates an estimate sheet based on the transmitted information and stores the file of the estimate sheet at a predetermined address of the computer PC2. In this case, the user enables the estimate sheet to be printed according to the similar procedures to those in the case of printing the data file in the user's own computer PC1. The user gains access to the 'Print Portal' Web page and specifies the URL representing the address of the estimate sheet file in the computer PC2 at the user's office as the location of the print data.

B5. Delivery of Electronic Newspapers (1)

In the above examples, the printing operation is immediately carried out just once in response to a print request from the client. The following example describes the case of setting time and frequency conditions of printing.

Figure 35:
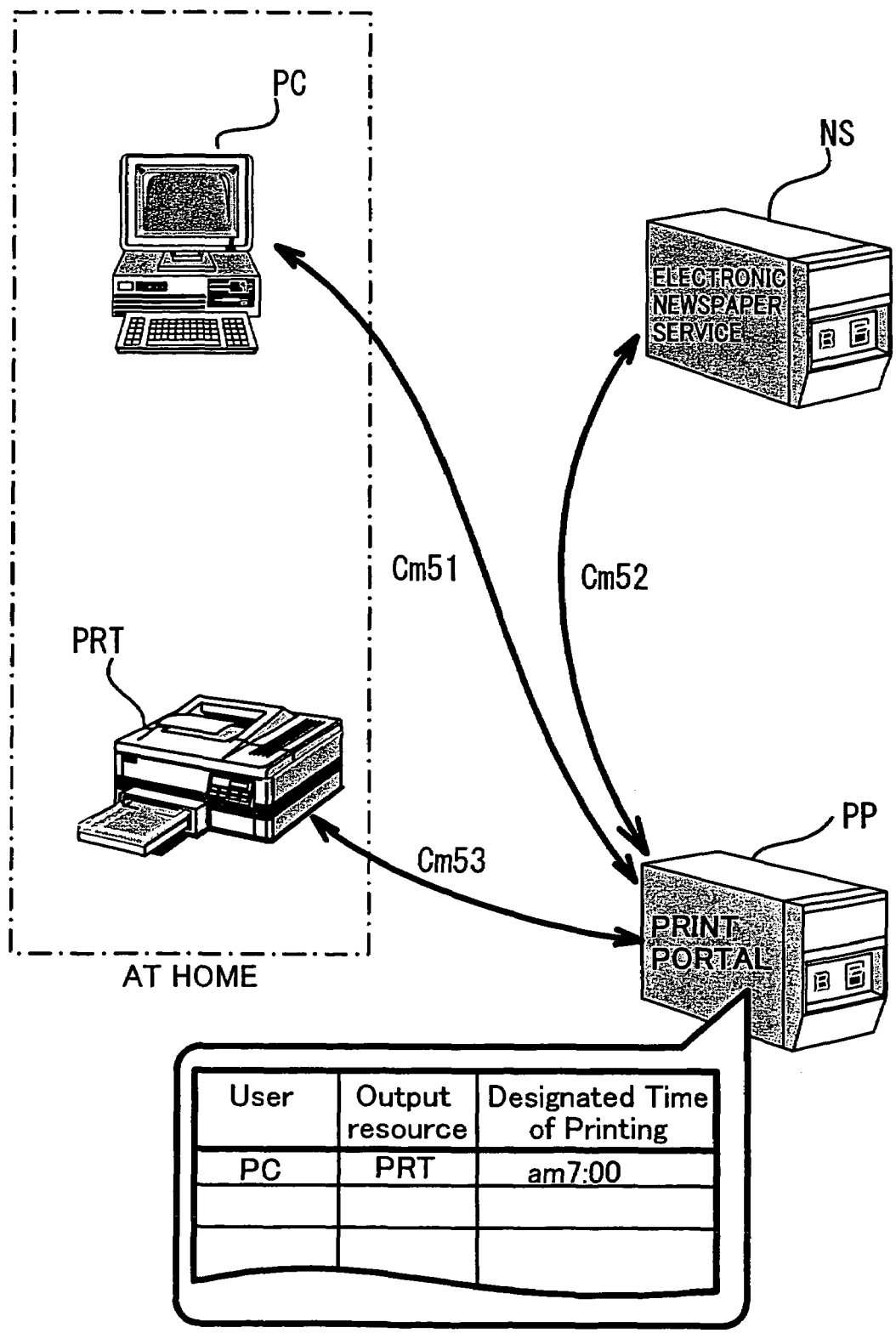
FIG. 35 shows connection in the case of printing electronic newspapers via the print portal.

FIG. 35 shows connection in the case of printing an electronic newspaper via the print portal. The user sends an order from a computer PC at home to deliver an electronic newspaper and causes the delivered electronic newspaper to be printed with a printer PRT at home. A URI or an IP address is used to identify the output resource.

In this example, the computer PC corresponds to the client, the printer PRT corresponds to the printing station, and an electronic newspaper service NS providing electronic newspapers corresponds to the content provider. The electronic newspaper service NS is provided as one of additional services of the print portal PP.

The user gains access from the computer PC to a Web page provided by the print portal PP and subscribes for an electronic newspaper through communication Cm51. At the time of subscription, the user registers various pieces of information including a selected electronic newspaper for delivery, a user password, a printer PRT designated as the output resource, and a desired time of delivery. When the output resource is the printer PRT at home, the registered information should include address information that enables unequivocal location of the printer PRT on the network, for example, a URI or an IP address. The term of subscription to the selected electronic newspaper may also be specified. The registered information is stored as user's attribute information in the print portal PP. Part of the attribute information is shown in the form of a table in FIG. 35. The print portal PP refers to the attribute information and manages when, where, and what electronic newspaper should be output.

No specific user's operations are required at the time of delivery of the electronic newspaper, as the print request has already been registered in the print portal. The only requirement to the user is to set the printer PRT at home in the active state. The print portal PP fetches the content from the electronic newspaper service NS, which provides the electronic newspaper designated by the user for delivery, through communication Cm52 at the user's designated time of delivery, at 7 am in the example of FIG. 35, and causes the electronic newspaper to be printed with the printer PRT through communication Cm53. Since the required information for authentication, such as the user password, has been registered in advance, no authentication is required at the time of printing. The electronic newspaper may be printed with the banner page, or the user may make a choice for printing the banner page. Information representing the choice for printing the banner page may be registered as part of the user's attribute information in a directory service block of the print portal PP. This facilitates management of the choice for printing the banner page and the accounting based on the choice.

After completion of the printing operation, the attribute information on the delivery of the electronic newspaper remains. This arrangement allows delivery of the electronic newspaper in a regular manner. The information provided by the electronic newspaper service NS is sequentially updated, unlike standard offline newspapers. The user may designate a plurality of times for delivery according to the requirements and gain the latest information at arbitrary frequencies.

One modified application may provide the service of printing only an updated part at the time of updating the server of the electronic newspaper service NS. Such service is readily attained by transmitting a notice of information updating and updated information including print data of the updated part from the electronic newspaper service NS to the print portal PP, each time the information is updated. In response to input of the updated information, the print portal PP refers to the registered attribute information, extracts the users who desire delivery on every occasion of information updating and their designated output resources, and causes the updated part to be printed with the designated printers. The designation of time and the periodical printing discussed above may be applied for a diversity of contents, other than the electronic newspapers.

B6. Delivery of Electronic Newspapers (2)

While the electronic newspaper is delivered in a regular manner, the user may require a temporary change of the output resource. For example, the user who is not at home but stays in another place requires temporarily changing the place of delivery of the electronic newspaper to the place of accommodation.

Figure 36:
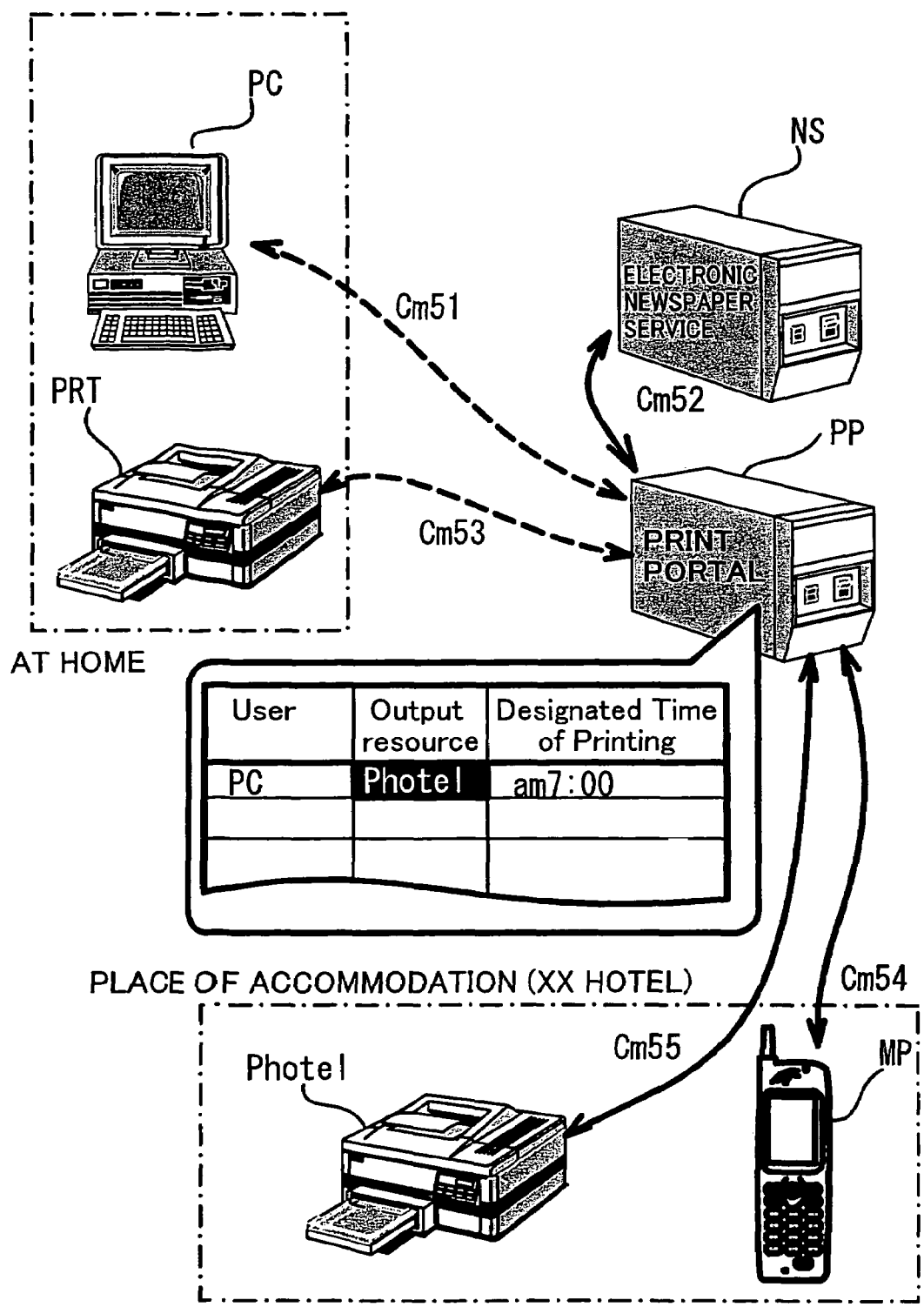
FIG. 36 shows connection in the case of printing electronic newspapers in a place of accommodation.

FIG. 36 shows connection in the case of printing electronic newspapers in a place of accommodation. In the ordinary state, the computer PC and the printer PRT that are located at home, the print portal PP, and the electronic newspaper service NS are involved in the delivery of the electronic newspaper.

In this example, in addition to the above constituents, the mobile phone MP corresponding to the client and a printer Photel located in the place of accommodation, which corresponds to a temporary output resource, are involved in the delivery of the electronic newspaper.

The user gains access from the mobile phone MP to a Web page provided by the print portal PP through communication Cm54 and changes the designated output resource. Information for changing the designation or modified designation information includes a user password, information for identifying a printer as the temporary output resource, a term of the change, and a desired time of delivery during the change. The printer of the changed output resource may be identified by the ID number, the URI, or the IP address. The print portal PP modifies the user's attribute information according to the change of the designation. In the example of FIG. 36, the output resource is changed to the printer Photel in the place of accommodation. One preferable procedure backs up the original registration and returns the modified attribute information to the original registration when the tem of the change specified by the user has elapsed.

A variety of other procedures may be applied to change the output resource of the electronic newspaper. One modified procedure allows registration of both the standard designation information and the modified designation information as the attribute information regarding the delivery of the electronic newspaper. The print portal PP gives preference to the modified designation information and delivers the electronic newspaper. The temporary change of the designation is readily attained by restricting the term of the change or deleting the modified designation information at the time when the term of the change has elapsed.

B7. Image Processing Service

The following describes an example of processing data transmitted by the user and printing the processed data.

Figure 37:
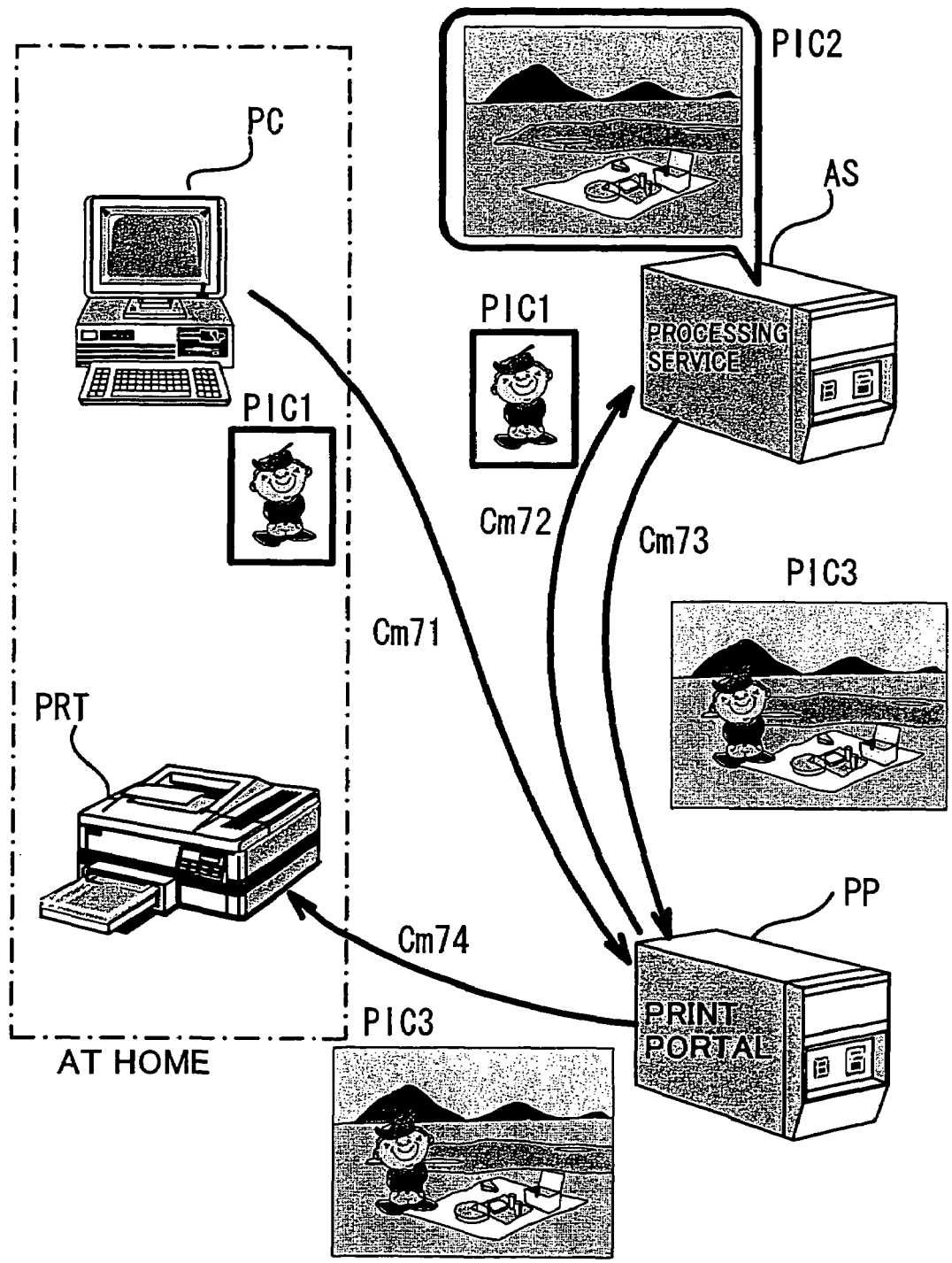
FIG. 37 shows connection in the case of printing processed data.

FIG. 37 shows connection in the case of printing processed data. The user superimposes picture data of interest, which is the object of printing, on a specified background image and prints the superimposed picture data with a printer PRT, which is located at home. The printer PRT of the desired output resource is identified by the URI or the IP address.

In this example, the computer PC corresponds to the client, the printer PRT corresponds to the printing station, and a processing service AS corresponds to the content provider. The processing service AS is provided as one of additional services of the print portal PP. The processing service AS may alternatively be organized as a separate service from the print portal PP.

The user gains access from the computer PC to a Web page provided by the print portal PP through communication Cm71 and transmits a picture image PIC1 as the object of printing. The interface shown in FIG. 34 may be used for transmission of the picture image. The user then specifies a background image. The background image may be provided by the user or may be selected out of a menu provided by the processing service AS.

The user subsequently specifies the printer PRT as the desired output resource and issues a print request. A superimposed picture is then printed according to the following procedure.

In response to input of a print execution command, the print portal PP outputs the picture data PIC1 and code information for specifying the background image, which have been sent from the user, to the processing service AS (communication Cm72). Background image data PIC2 corresponding to the input code information is stored in advance in the processing service AS. The processing service AS superimposes the input picture data PIC1 on the background image data PIC2 to create composite picture data PIC3 and sends the composite picture data PIC3 to the print portal PP (communication Cm73). The print portal PP may alternatively perform such image processing. The print portal PP outputs the input composite picture data PIC3 to the designated printer PRT and causes the composite picture data PIC3 to be printed with the designated printer PRT (communication Cm74).

The printing process is not restricted to the above procedure. In one possible modification, the user gains access to a Web page provided by the processing service AS and transmits the picture data PIC1 as the object of printing to the Web page to make the picture data PIC1 superimposed on the background image data PIC2. On completion of the processing, the user gives an instruction to print the superimposed picture data via the print portal PP. The sequence of printing in this arrangement is equivalent to the sequence of printing the Web page discussed previously.

The image processing is not restricted to superimposing. Another example retouches picture data transmitted from the user. Still another example adjusts the resolution and the tone according to the characteristics of the model of the printer PRT designated as the desired output resource. The object of processing is not restricted to picture data. Another example receives text data from the user and processes the input text data, prior to printing, according to a predetermined form, for example, in writing paper or formal documentation to public authorities. Still another example fills out a diversity of blank forms with information sent from the user in the form of text data.

C. Various Processes of Designating Output Resource

Figure 38:
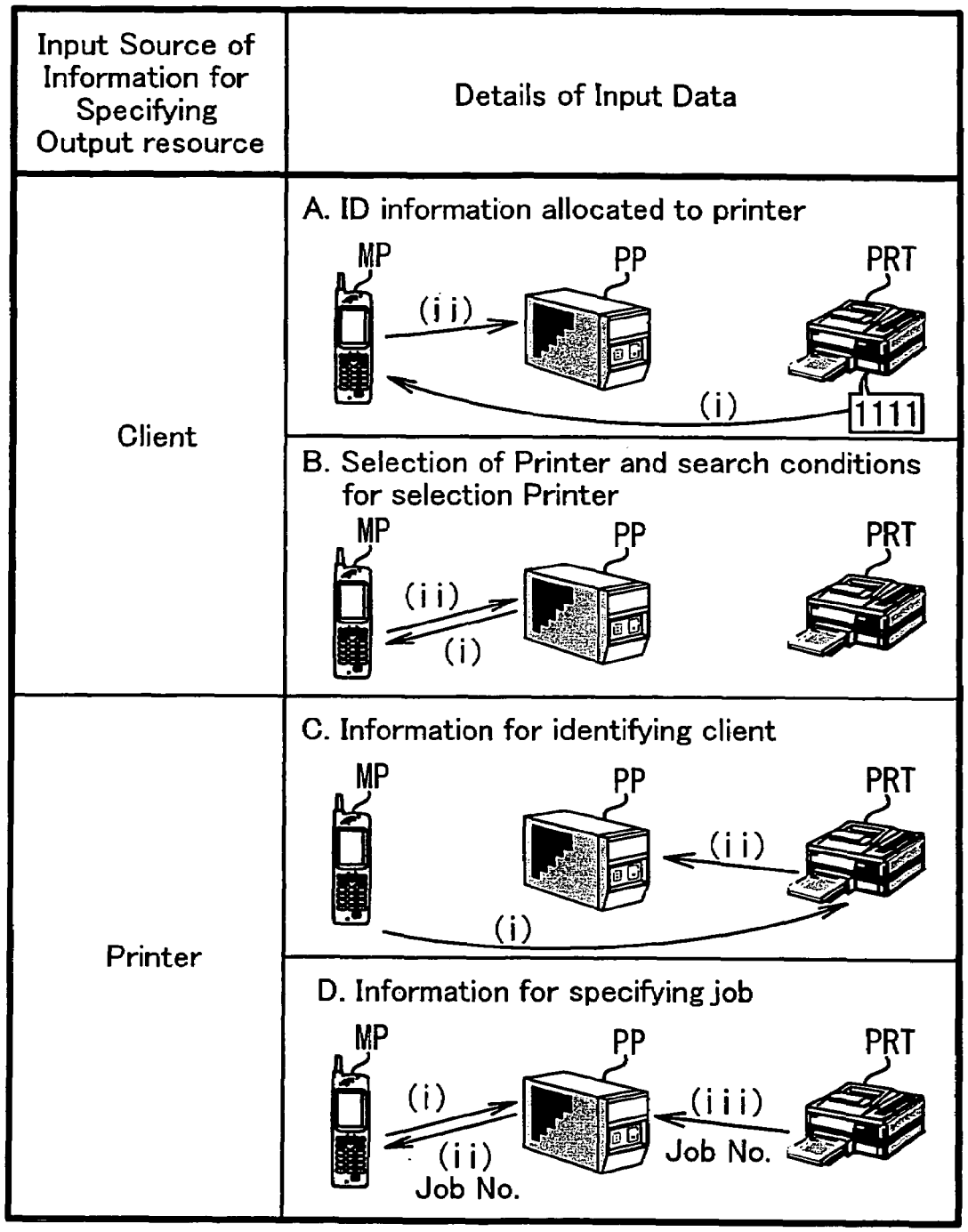
FIG. 38 enumerates various processes of designating a printer.

A diversity of settings may be applied to designate the printer as the desired output resource in the process of printing via the print portal. FIG. 38 enumerates various methods of designating the printer. There are four major processes of designation.

In Cases A and B, information for identifying the printer is input from the client.

In Case A, the user recognizes the ID number allocated to each printer (i), and transmits the ID number from the client MP to the print portal PP (ii). This corresponds to the arrangement shown in FIG. 22. The ID number may be replaced with any information for identifying the printer on the network, such as a URI or an IP address.

In Case B, the print portal PP provides a list of printers (i), and the user selects a desired output resource out of the printer list (ii). This corresponds to the arrangement shown in FIG. 19. The printer list is not restricted to the hierarchical structure. In one preferable application, the user sends specific search conditions for selection of the printer, prior to creation of the printer list. The print portal PP searches for printers satisfying the specific search conditions and sends the result of the search as a printer list to the user. The process of designating the printer based on the search will be discussed later with a concrete example.

In Cases C and D, the information for identifying the client or the user is input from the printer, so that specific printers are mapped to specific clients.

In Case C, information for identifying the client or the user is input on a panel attached to the printer (i). The information may be the IP address of the client MP, the user ID, or the user password. The input information is transmitted to the print portal PP (ii). The print portal PP searches for a print request meeting the input information and carries out mapping to specify the output resource. This arrangement will be discussed later with a concrete example.

In Case D, in response to a print request sent to the print portal PP (i), the user is notified of a job number (ii). The job number may be given by the print portal or by the printing service provider. The user inputs the job number into the printer PRT of the output resource. At this moment, the connection between the client MP and the print portal PP may be cut off. The printer PRT sends the job number to the print portal PP and receives print data corresponding to the job number for printing (iii). The printer PRT receives the print data transmitted by the push method in Cases A to C, while the printer PRT fetches the print data by the pull method in Case D.

In Cases C and D, information for identifying the user or the client is input from the printer of the output resource to specify the output resource. This requires the user to be present in a neighborhood of the printer of the output resource at the time of printing. This arrangement effectively prevents the designation of a wrong output resource and advantageously reduces illegal printing.

Figure 39:
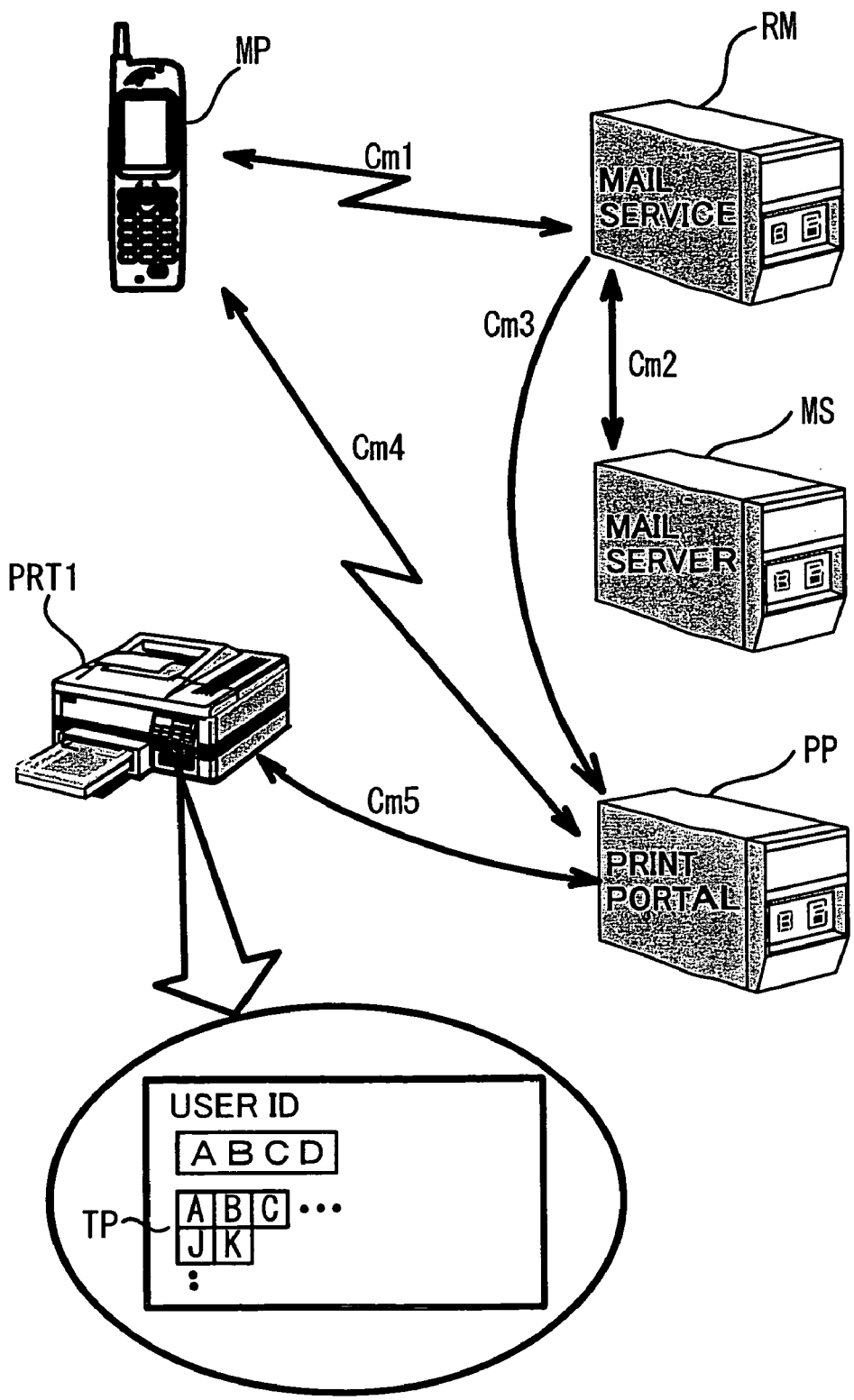
FIG. 39 shows a concrete example of Case C.
Figure 40:
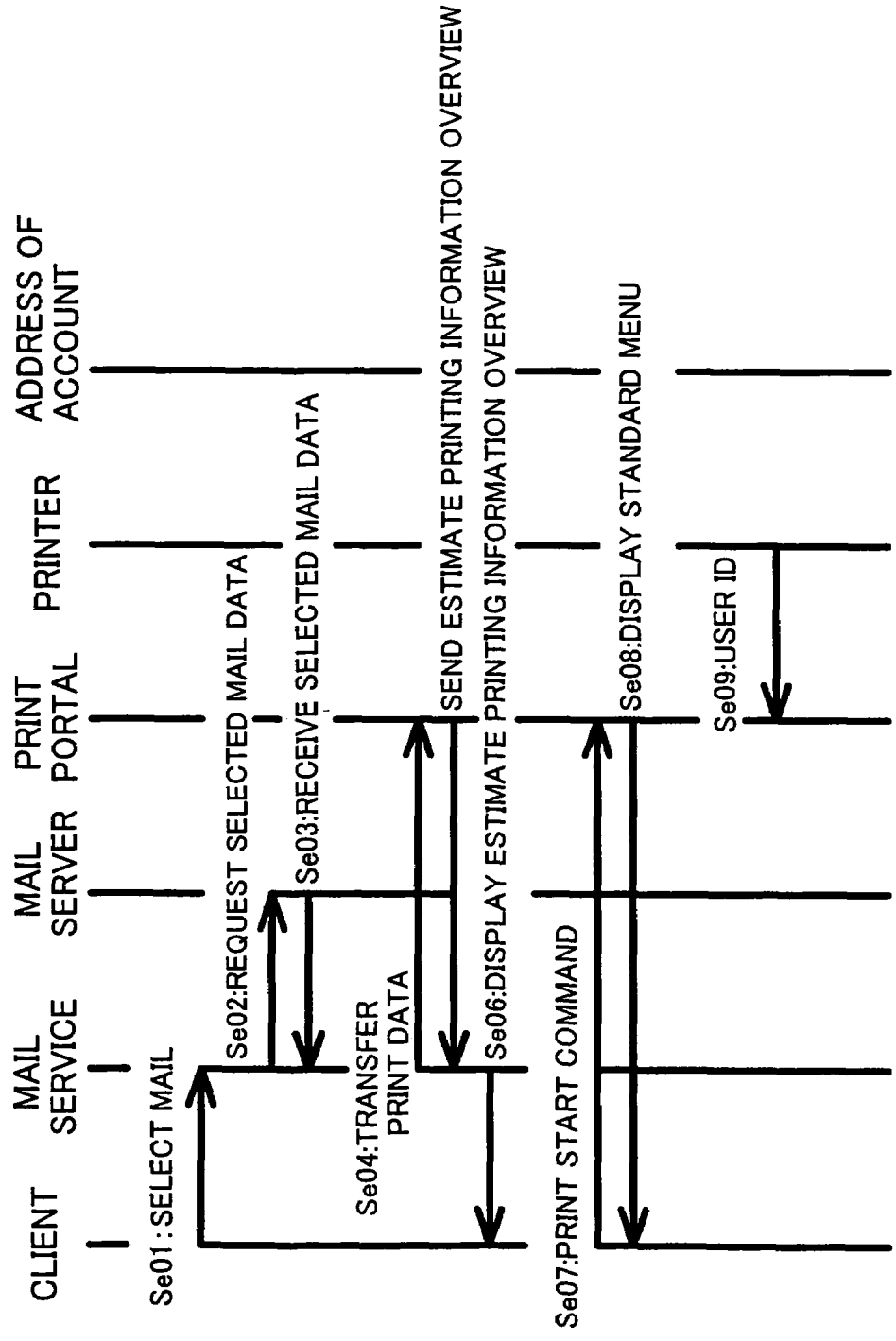
FIG. 40 shows a sequence of printing in Case C.

FIG. 39 shows a concrete example of Case C. FIG. 40 shows a sequence of printing in Case C. This example regards a process of printing electronic mails.

As shown in FIG. 39, a printer PRT1 has a touch panel TP for inputting the user ID. The series of processing from selection of E mails to display of the standard menu (steps Se01 to Se08) is identical with the processing shown in FIG. 22. In this example, the display of the standard menu asks the client MP to input the 'User ID', in place of the 'Printer No.'. The user selects this menu with the client MP and inputs the user ID. In this arrangement, however, the client MP is not used for the input of the user ID, but the user ID is input on the touch panel TP of the printer PRT1 designated as the desired output resource. The user ID 'ABCD' is input in the example of FIG. 39.

The input user ID is sent from the printer PRT1 to the print portal PP (step Se09 in FIG. 40). Since the client MP and its user have been identified in the process of steps Se01 to Se08, the print portal specifies the printer PRT as the desired output resource based on the user ID input from the printer PRT.

Information used for mapping the client MP to the printer PRT1 is not restricted to the user ID. Another example receives the user ID sent from the printer PRT1 and the user ID-relating password sent from the client MP. The requirement is that the information collected from the client MP should be mapped to the information collected from the printer PRT.

In the example of FIGS. 39 and 40, the printer PRT1 has the touch panel TP. One possible modification supplies the client MP with a remote control function and attains the above series of processing through communication between the client MP and the printer PRT1. Infrared communication or Bluetooth may be applied for the communication. In this modified arrangement, the client MP is used as the interface of inputting the user ID at step Se09 in FIG. 40. The user ID input into the client MP is transmitted to the printer PRT1. In still another example, the user ID not newly input but registered in advance in the client MP may automatically be sent to the printer PRT1.

The following describes the system of searching for the output resource based on specific search conditions given by the user, as one example of Case B.

Figure 41:
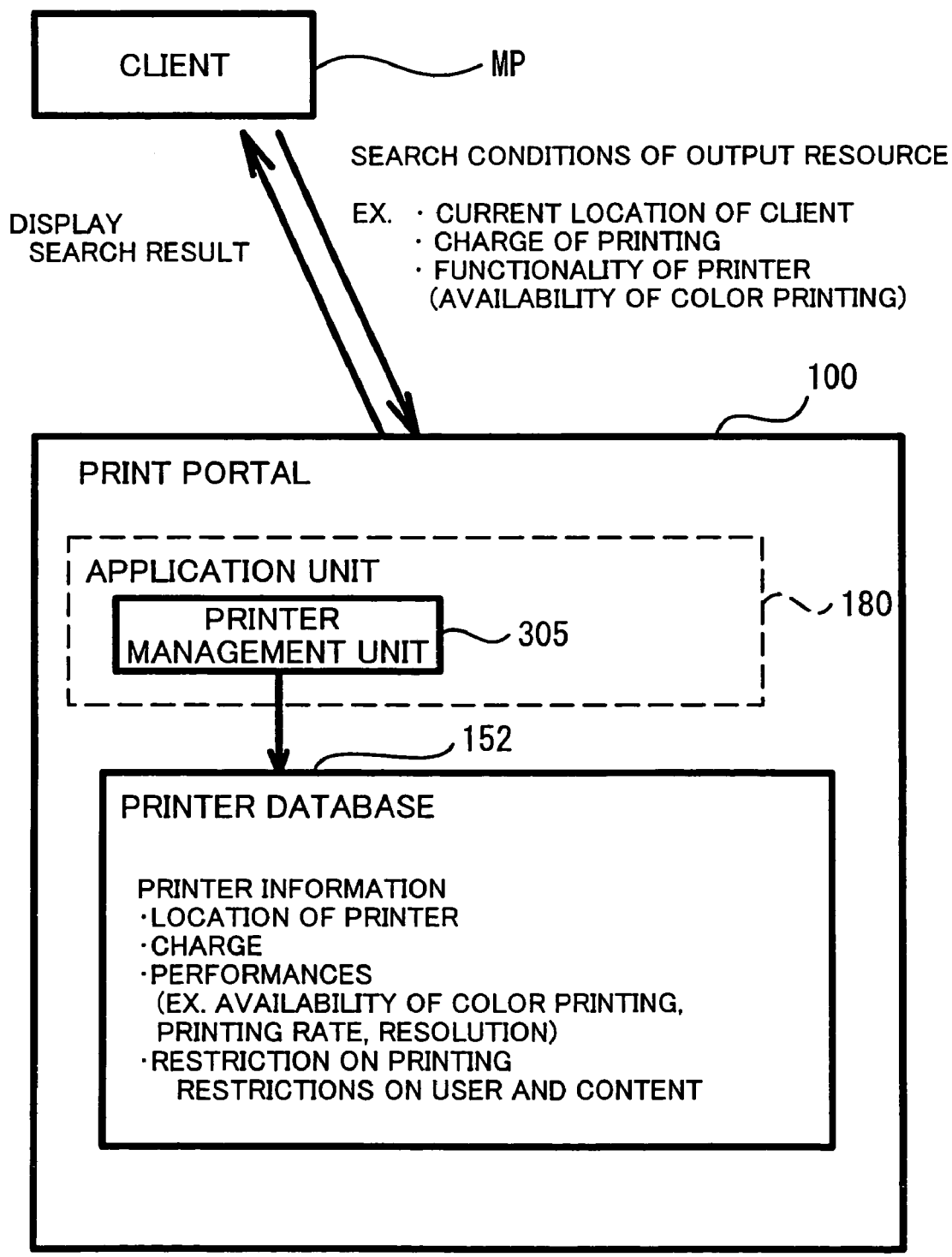
FIG. 41 shows functional blocks and data transmission relating to the search for the output resource.

FIG. 41 shows functional blocks and data transmission relating to the search for the output resource. Information registered in a printer database 152 is utilized for the search. The application unit 180 includes a printer management unit 305 as the functional block of searching.

The user specifies search conditions of the output resource with the client MP. One example of the search conditions is the output resource closest to the current location of the client MP. The current location of the client MP may be specified by a landmark like a near-by building or a near-by station. Another example attaches a GPS (Global Positioning System) to the client MP and monitors the output of the GPS. The search conditions may also include the charge of printing and the functions of the printer, for example, the availability of color printing. The search conditions may be specified according to the user's requirements.

The printer management unit 305 refers to the printer database 152, searches for the printers meeting the specified search conditions, and displays the result of the search as a printer list on the client MP. The user selects a desired printer out of the printer list. In the case of a relatively small display area like the mobile phone, the printer list is scrolled up and down. The upper limit may be set to the number of items displayed simultaneously on the display unit.

In order to actualize the search, various pieces of information regarding each printer, for example, the location of the printer, the charge of printing, the performances of the printer, and the restriction on printing, are registered in the printer database 152. In the system of the embodiment, the print portal PP manages the information of all the printing stations PS11. The print portal can thus readily find the printer satisfying the user's requirements without any specific inquiry about the performances and properties of each printer.

D. Additional Functionality of Printing

The print portal system may cause the print data to be subjected to diverse additional processing in the printing process. Some examples of additional processing are discussed below.

D1. Addition of Input Source ID Information

Figure 42:
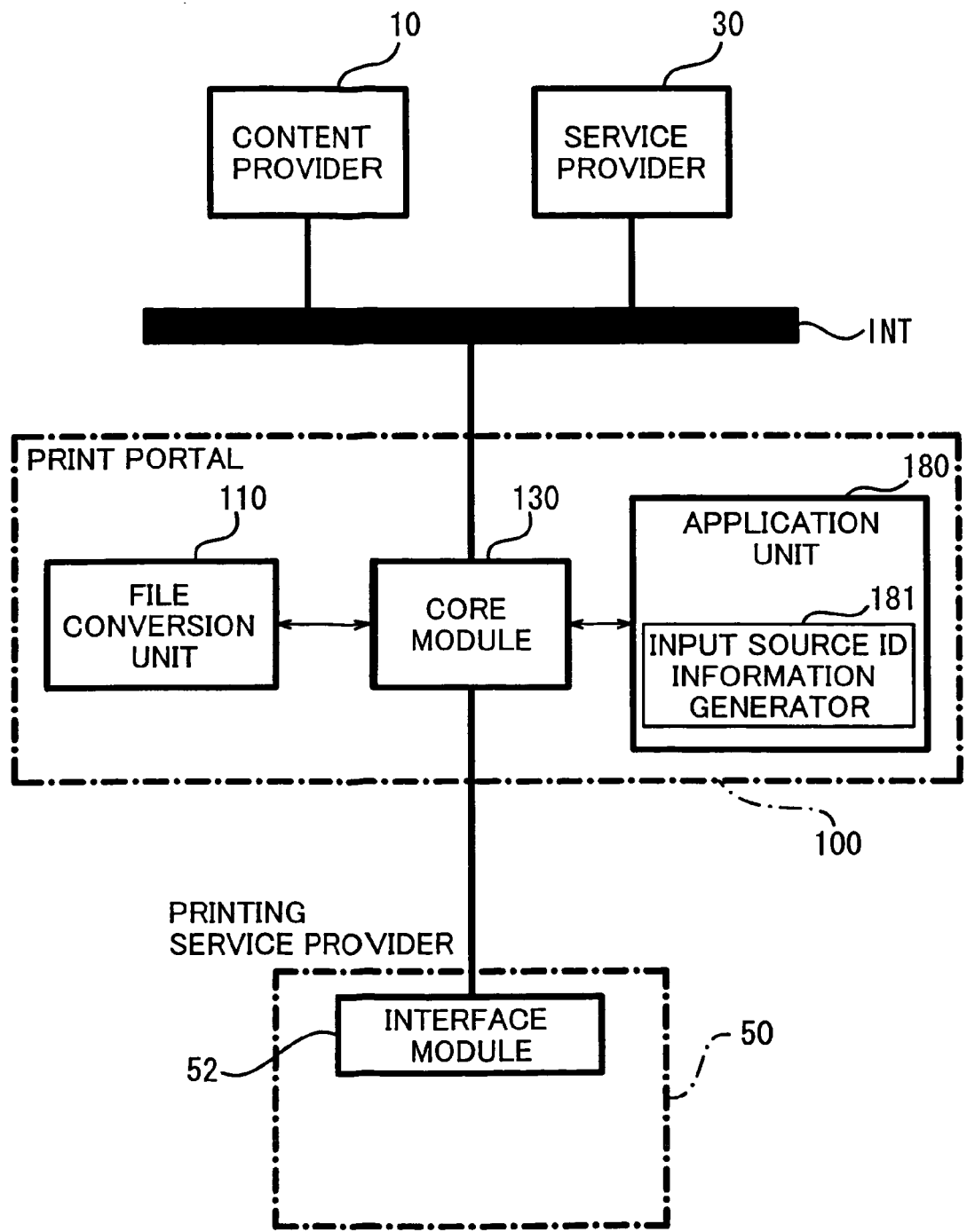
FIG. 42 shows functional blocks involved in the process of addition of input source ID information.

FIG. 42 shows functional blocks involved in the process of addition of input source ID information. The input source ID information includes, for example, information regarding the user who requires printing and information regarding the source of a content to be printed. The application unit 180 includes an input source ID information generator 181 as the functional block of adding such information.

Figure 43:
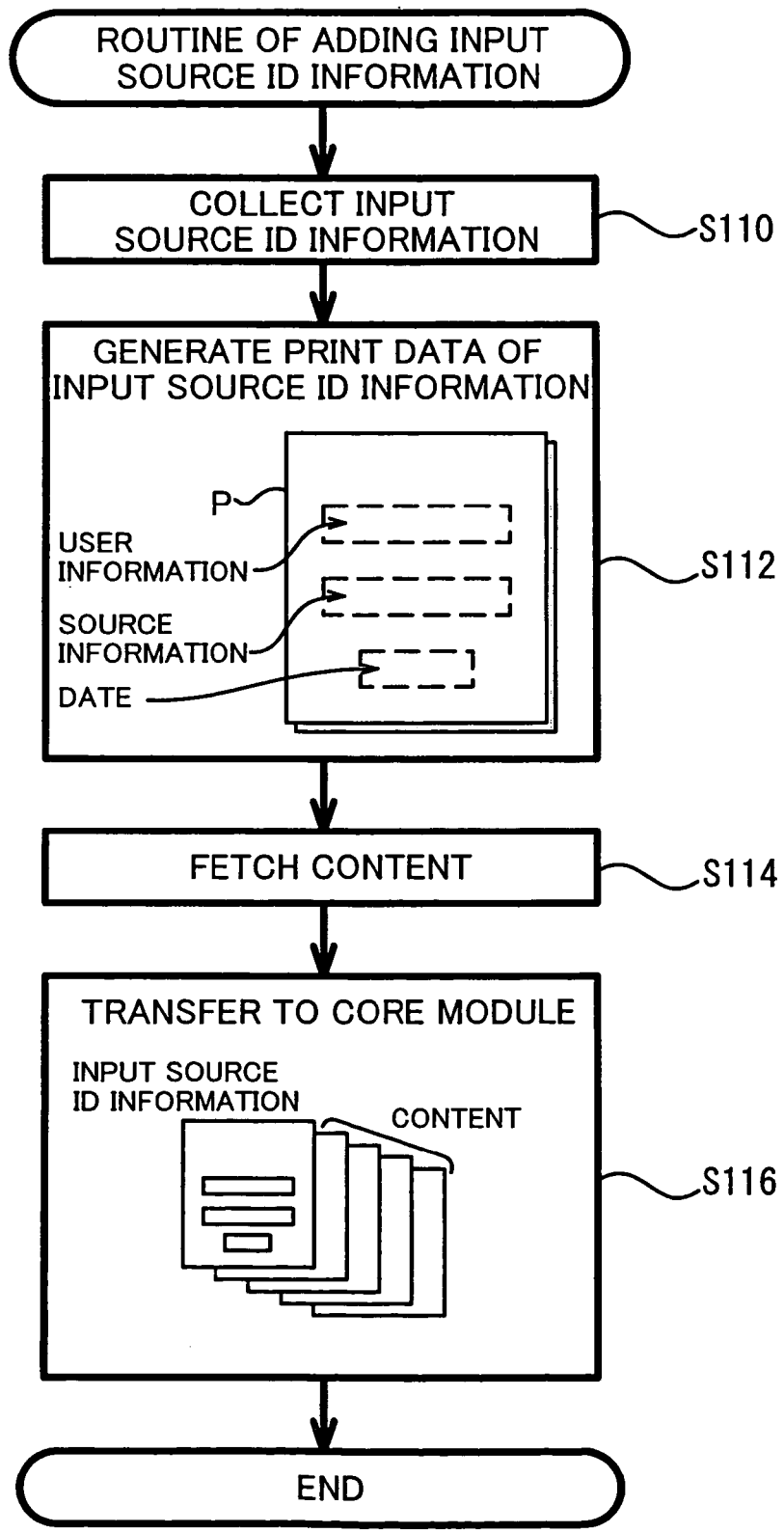
FIG. 43 is a flowchart showing a routine of adding input source ID information.

FIG. 43 is a flowchart showing a routine of adding input source ID information. The input source ID information generator 181 adds a new page to the content designated by the user and prints the input source ID information in the new page.

When the program enters the routine, the input source ID information generator 181 first collects input source ID information from the client (step S110). The input source ID information includes user information for identifying the user who gives a print request and source information for identifying the source of a content to be printed. The name of the user or the user ID may be used as the user information, and the URL or the name of the document may be used as the source information.

The input source ID information generator 181 generates print data of the input source ID information (step S112). A concrete procedure fills out a predetermined format with these pieces of information. The image of the processing is illustrated in the flowchart. Data of the respective fields, that is, the user information, the source information and the date, are inserted in preset positions (input boxes shown by the broken lines) in a space of one page P. The data format may be any of various formats that are convertible to the PDF format by the core module 130.

The input source ID information generator 181 then fetches the content designated by the user (step S114) and transfers the print data of the input source ID information and the content to the core module 130 (step S116). The print data of the input source ID information and the content may be transferred as combined print data or as mutually related individual data. The functional block other than the input source ID information generator 181 may be used to fetch the content.

In the above example, the page for printing the input source ID information is separate from the content. One possible modification prints the input source ID information in each page of the content.

Figure 44:
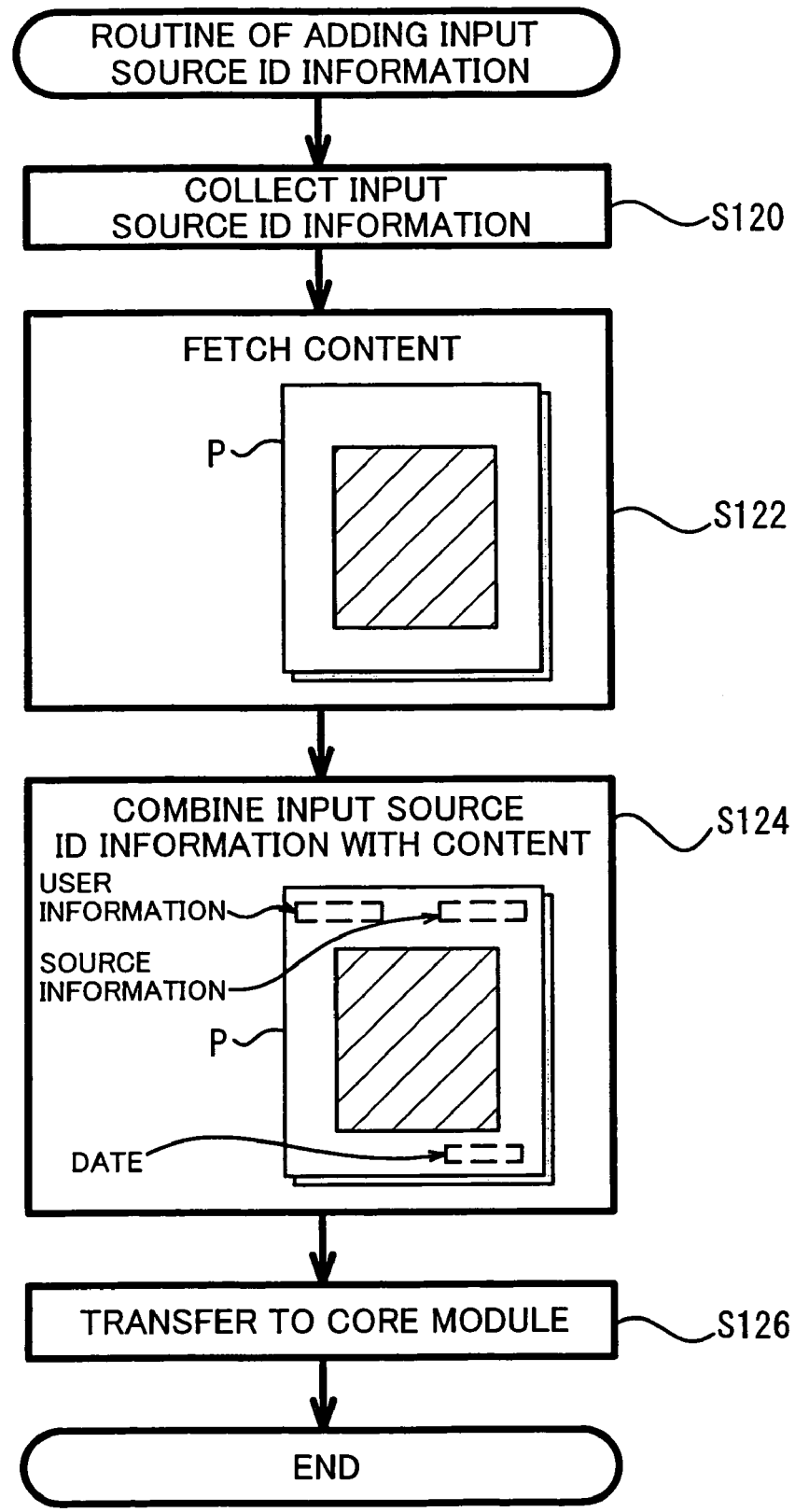
FIG. 44 is a flowchart showing a modified routine of adding input source ID information.

This arrangement is shown as a modified example. FIG. 44 is a flowchart showing a modified routine of adding input source ID information. In this processing routine, the input source ID information generator 181 successively collects the input source ID information and fetches the content (steps S120 and S122). The content is printed in a preset area of the page P (the hatched area in the drawing).

The input source ID information generator 181 inserts the input source ID information in the blank of the printed content (step S124). The user information, the source information, and the date are written in preset places of the blank (defined by the broken lines in the drawing). The input source ID information generator 181 transfers the resulting data to the core module (step S126).

Addition of the input source ID information may be carried out after the conversion to the PDF format or in the course of conversion to the PDF format. The input source ID information may include either one of the user information and the source information, or may include additional pieces of information.

The addition of the input source ID information advantageously prevents confusion of prints between plural users, in the case where print requests from the plural users are concentrated on one specific printer. This application ensures the accurate delivery of the resulting print to the right user, especially when a document with high secrecy, for example, an E mail or a user's own document, is printed.

The source information facilitates comparison between the resulting print and the print request. Namely the source information functions to readily identify the wrong designation of the content, in the case where the actual print is different from the user's requirement.

D2. Layout Printing

The function of layout printing lays out a plurality of contents or a content including plural pages in one page sheet according to the user's specification.

Figure 45:
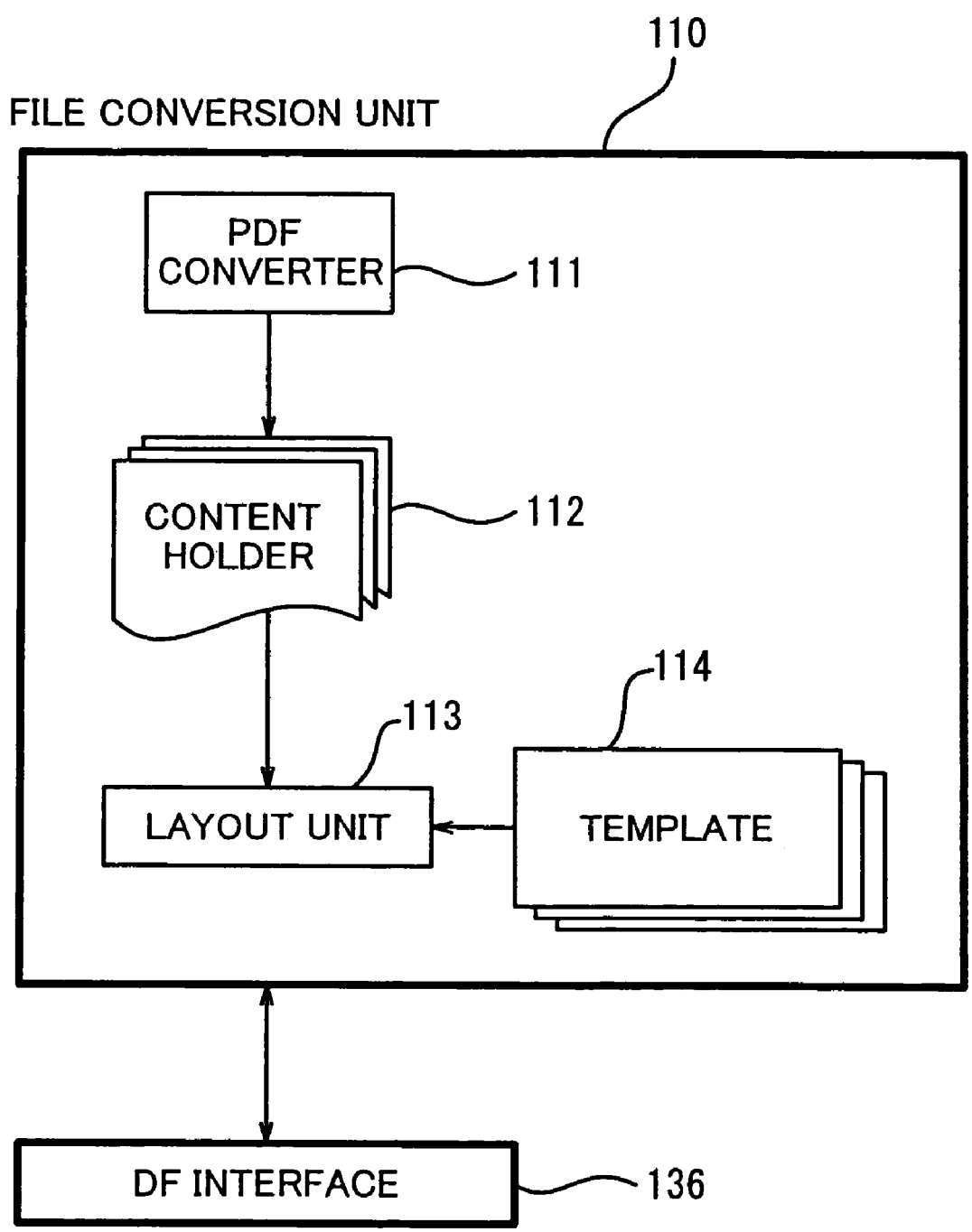
FIG. 45 shows functional blocks involved in the layout printing.

FIG. 45 shows functional blocks involved in the layout printing. In this embodiment, the file conversion unit 110 combines a plurality of contents.

The file conversion unit 110 includes several functional blocks. A PDF converter 111 carries out file conversion to the PDF format. A content holder 112 keeps the converted PDF files. A layout unit 113 lays out the contents kept in the content holder 112 in one page sheet. The specification of the layout is registered in advance as a template 114.

Figure 46:
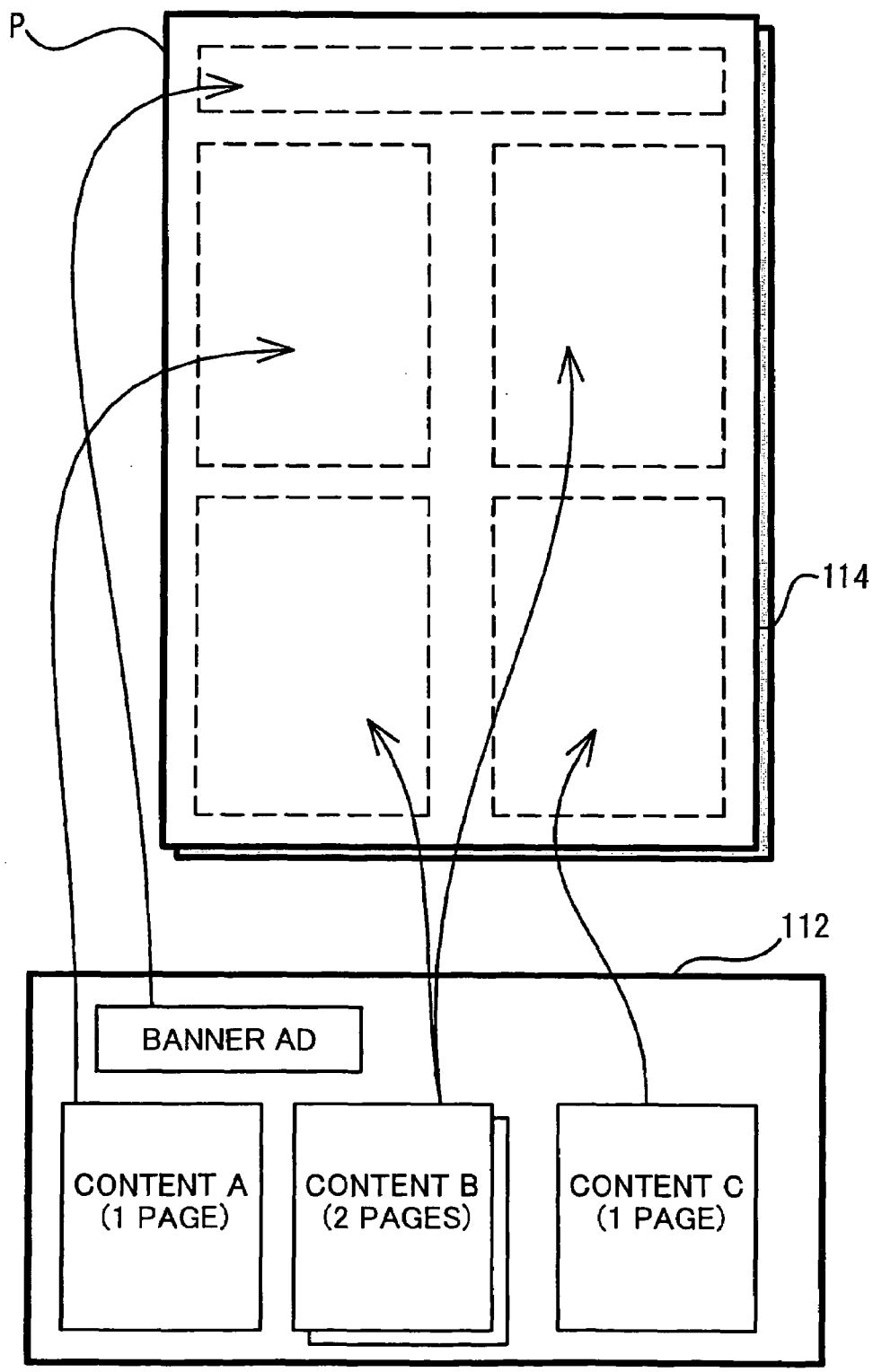
FIG. 46 shows an overview of the layout functionality.

FIG. 46 shows an overview of the layout function. The example of FIG. 46 divides the sheet of a page P and lays out a banner ad and contents of four pages in the page sheet P. One possible application provides a plurality of templates and enables the user to select a desired template among the options. The banner ad may be omitted from the template of FIG. 46. The banner ad may be replaced by the input source ID information. Although an identical space is assigned to the respective pages of the contents in the example of FIG. 46, the respective pages of the contents may have different spaces.

In the example of FIG. 46, three different contents A, B, and C are laid out in the locations defined by the arrows. Each page of the contents is contracted or magnified corresponding to the preset space, if necessary. In this embodiment, the length-to-width ratio of each page of the contents is kept after contraction or magnification.

Although the procedure of this embodiment lays out the contents after the file conversion to the PDF format, the contents may be laid out before or in the course of file conversion.

The layout function enhances the utility of this print portal system.

D3. Addition of Ad

One application of the layout function is addition of ad. The income of ad advantageously reduces the total charge of printing paid by the user.

Figure 47:
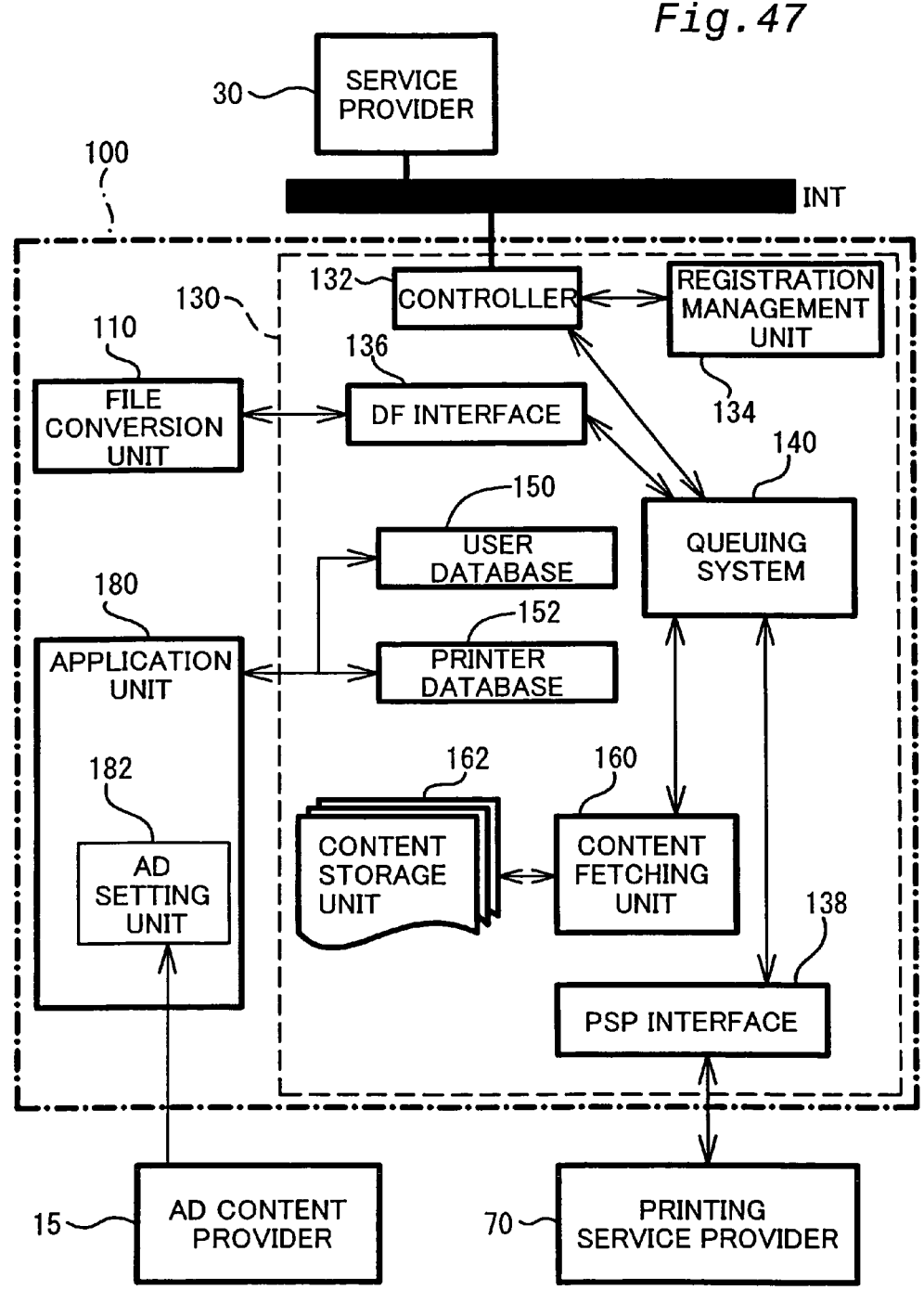
FIG. 47 shows functional blocks involved in the process of addition of ad.

FIG. 47 shows functional blocks involved in addition of ad. The application unit 180 includes an ad setting unit 182 as the functional block for attaining the addition of ad.

Figure 48:
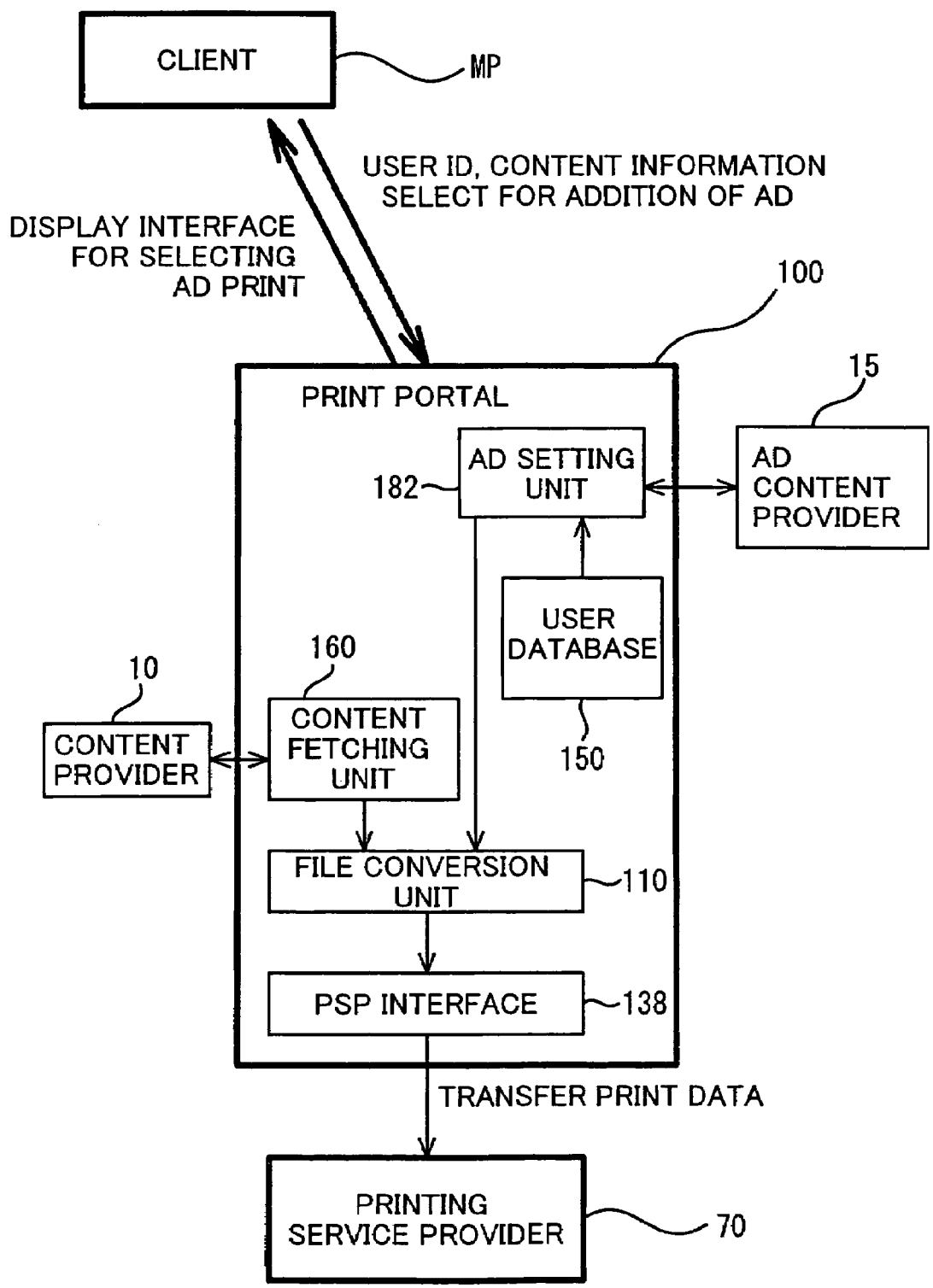
FIG. 48 shows the functions of the respective functional blocks in the process of addition of ad.
Figure 49:
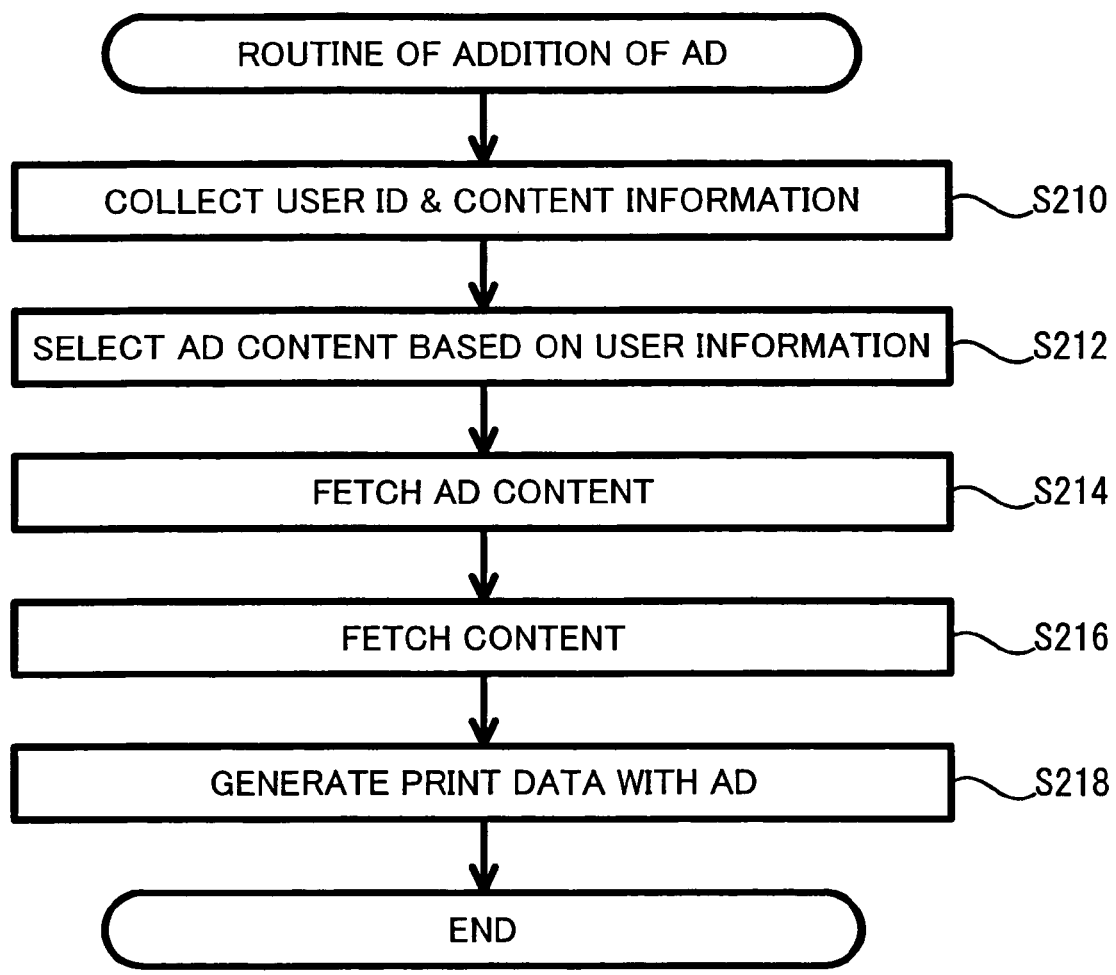
FIG. 49 is a flowchart showing a routine of addition of ad.

FIG. 48 shows the functions of the respective functional blocks in the process of addition of ad. FIG. 49 is a flowchart showing a routine of addition of ad. The following describes the process of adding ad with referring to these drawings.

In response to a print request, the print portal 100 collects the user ID and content information (step S210). The content information includes, for example, the URL of a Web page designated as the object of printing.

At the time of executing the printing operation in response to the print request, the print portal PP asks, the user to select acceptance or rejection of addition of ad. In a desirable arrangement, the content provider can restrict the addition of ad. When the user accepts the addition of ad, the addition of ad is implemented by the procedure discussed below.

The ad setting unit 182 refers to the user database 150 based on the user information and selects an ad to be supplied (step S212). For example, when the user's interest registered in the user database 150 is 'music', a music-relating ad is selected. The age and the sex of the user are also taken into account.

In parallel to the above processing, the content fetching unit 160 fetches the content designated by the user (step S216). The fetched content and ad content are transferred to the file conversion unit 110, which generates resulting print data with the ad according to a preset layout (step S218). The procedure of layout printing discussed previously may be applied for the addition of ad.

Figure 50:
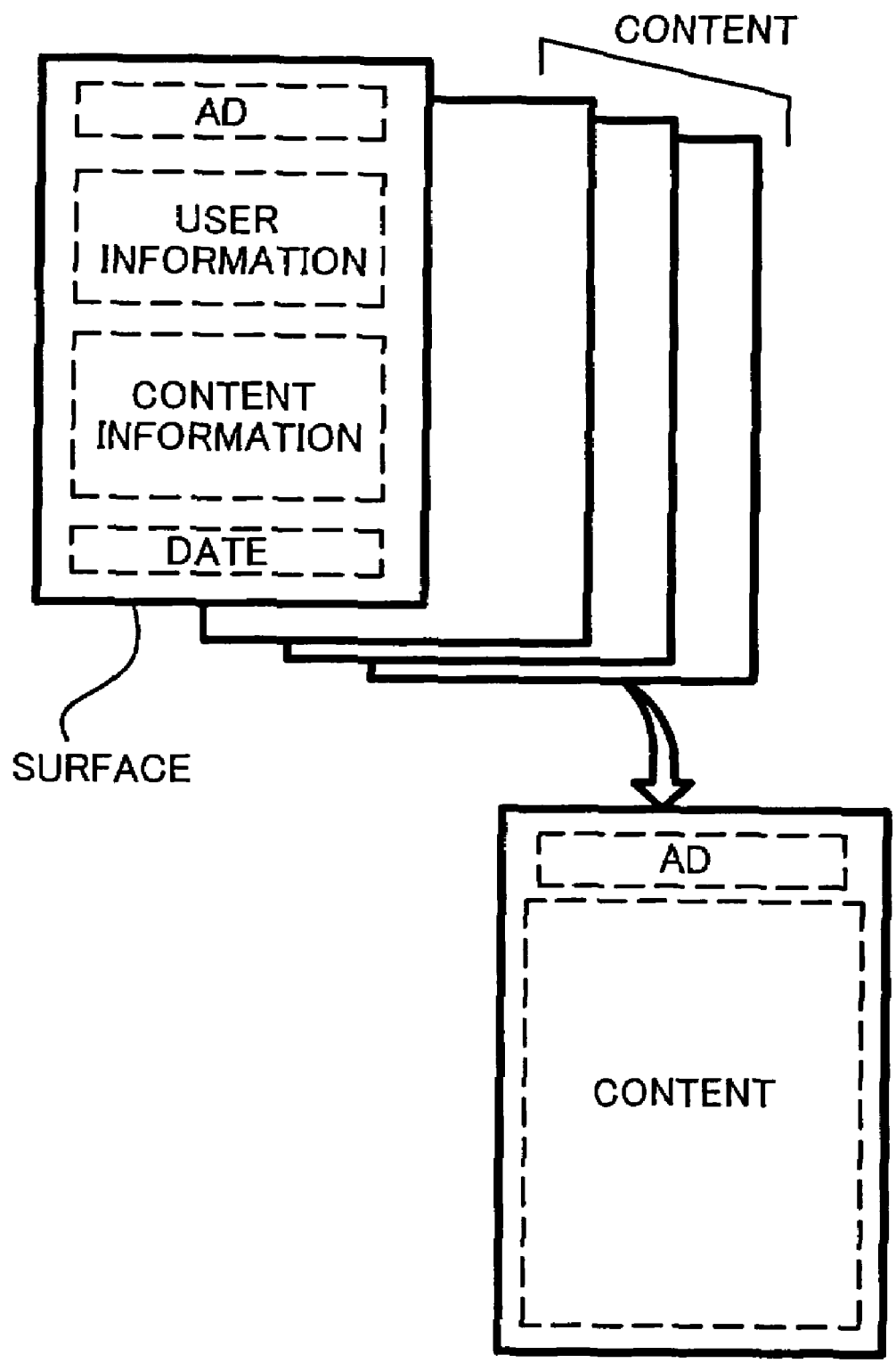
FIG. 50 shows examples of addition of ad.

FIG. 50 shows two examples of the addition of ad. The first example adds a surface sheet with an ad printed thereon to the content. The surface sheet also has a space for printing information like the user information, the content information, and the date of printing.

The second example has an ad in the blank of each page of the content. Different ads may be attached to different pages. The ad may be supplied in at least one of these two applications.

A diversity of methods may be applied to select the ad in this embodiment.

One applicable method selects the ad, based on the content designated as the object of printing. When the user designates a music-relating Web page as the content to be printed, a music-relating ad may be attached. Another applicable method selects the ad, based on a record of contents designated by the user as the object of printing. When the record proves that Web pages in the field of music are frequently printed, a music-relating ad may be attached. When the record proves that the tendency of frequently printed Web pages shifts from the field of music to the field of computer technology, a computer-relating ad may be attached.

Still another applicable method selects the ad, based on information on the client. For example, the selected ad may be related to the carrier of the client or may be concerned with the business proprietor that provides the printer designated as the output resource. Another applicable method attaches a preset ad, regardless of the user information and the content to be printed. The ad to be attached may otherwise be selected at random.

The ad setting unit 221 gains access to the ad content provider 15 and fetches the selected ad content (step S214). Ad contents may be kept in advance in the print portal 100.

E. Customization Functionality

The print portal system of the embodiment preferably has a diversity of customization functionality for the enhanced utility. The customization functionality is briefly classified into the three groups: the functionality for users, the functionality for content providers, and the functionality for printing service providers and printing stations.

E1. Customization Functionality for Users

Figure 51:
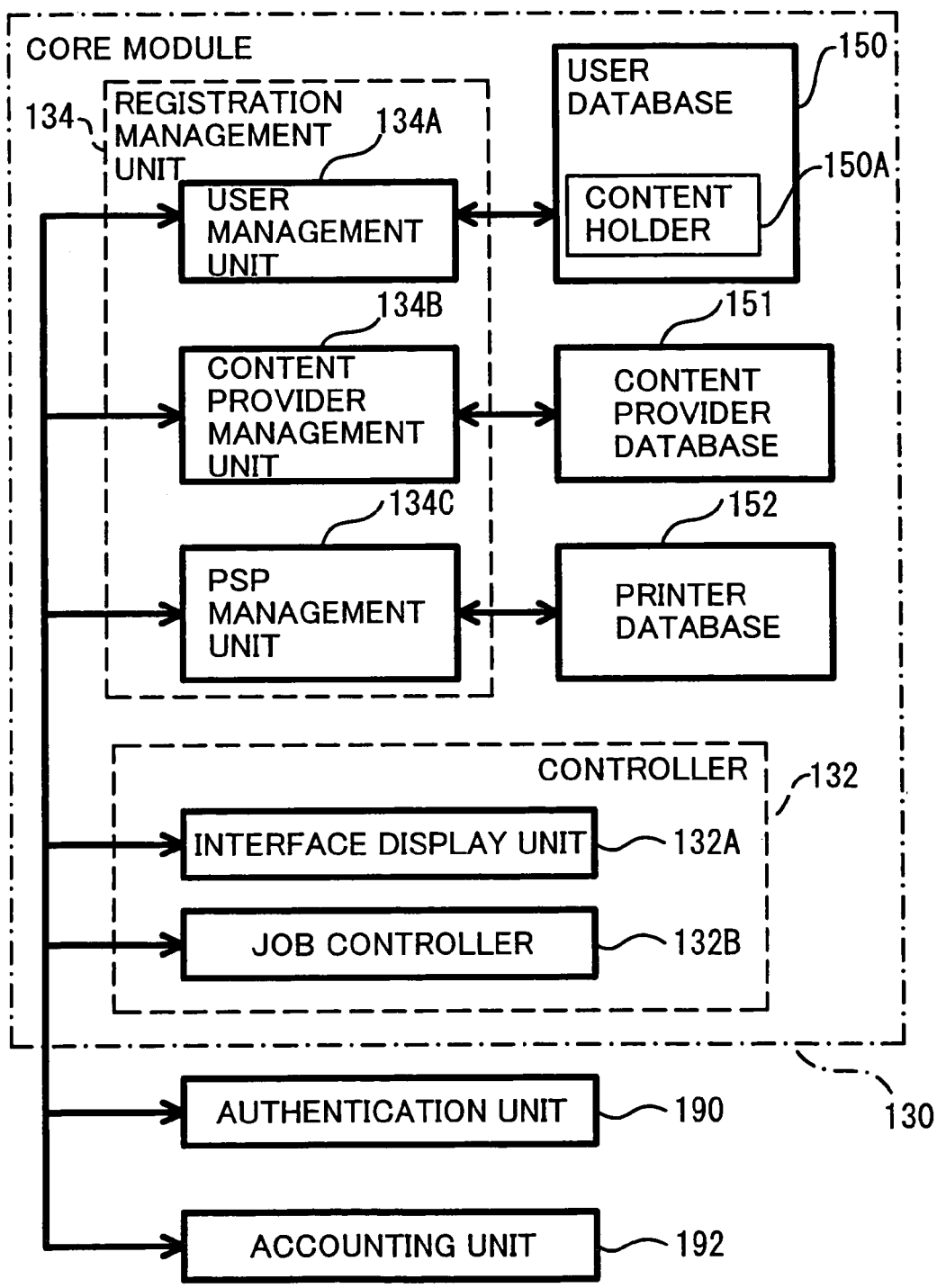
FIG. 51 shows functional blocks to attain customization.

FIG. 51 shows functional blocks to attain customization. In this embodiment, the registration management unit 134 includes a user management unit 134A, a content provider management unit 134B, and a PSP management unit 134C as the functional blocks of customization.

The user management unit 134A registers and manages customized information of each user in the user database 150. The customization-relating information, such as interfaces discussed later, is stored in the user database 150. A content holder 150A keeps frequently used contents by each user.

The content provider management unit 134B registers and manages customized information of each content provider in the content provider database 151. The PSP management unit 134C registers and manages customized information of each printing service provider or printing station in the printer database 152.

In the arrangement of this embodiment, with a view to smooth customization functionality, the controller 132 is divided into an interface display unit 132A and a job controller 132B.

The interface display unit 132A provides an interface for customization, as well as an interface for execution of printing.

The job controller 132B executes diverse controls required for printing, for example, transfer of jobs to the printing service provider.

Figure 52:
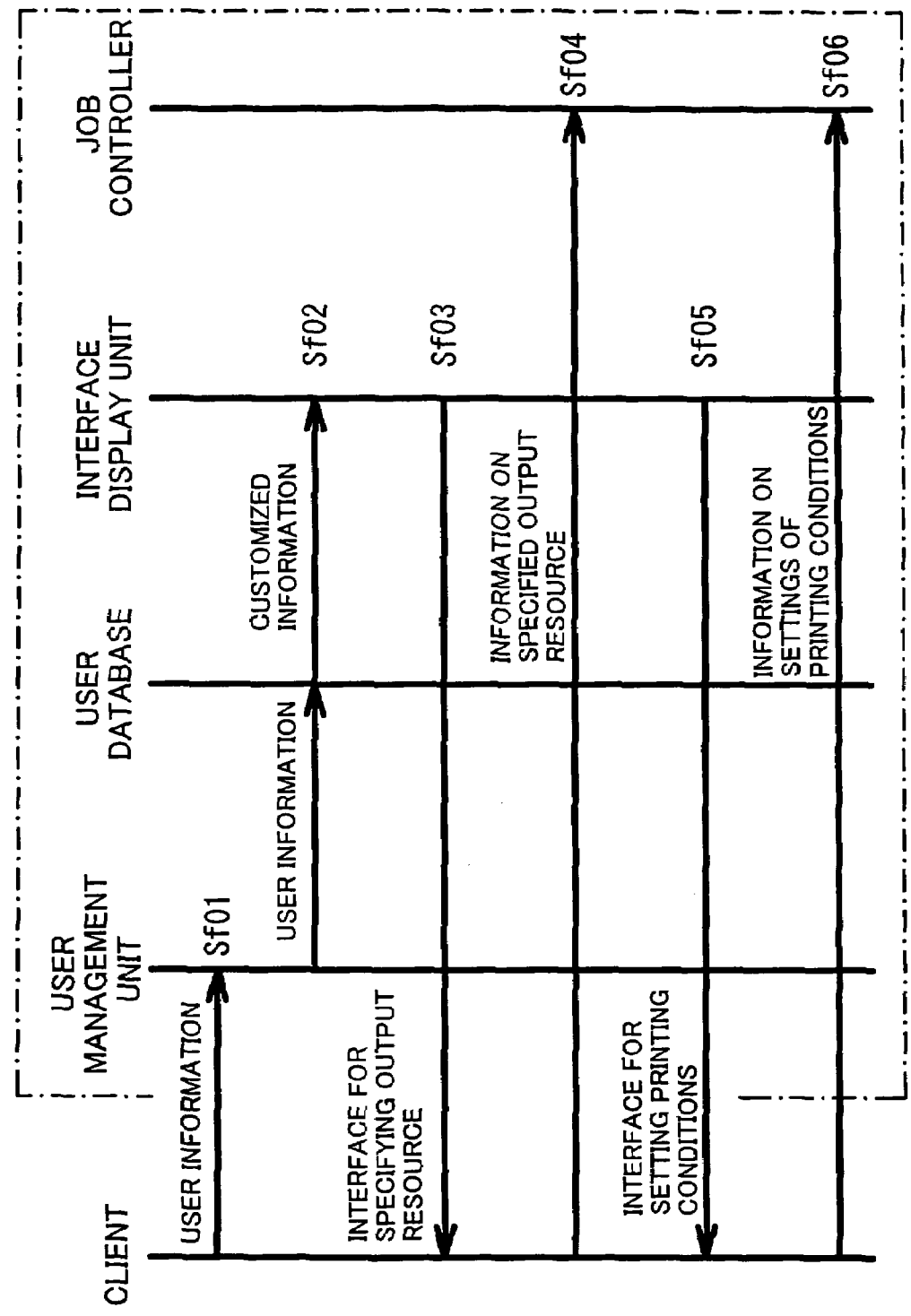
FIG. 52 is a time chart in the process of printing mails in a customized environment.

FIG. 52 is a time chart of printing mails in a customized environment.

When the user issues a print request, the user management unit 134A collects the user information like the user ID (step Sf01).

The user management unit 134A refers to the user database 150 based on the collected user information, and transfers customized information to the interface display unit 132A (step Sf02). The customized information on the output resource and the printing conditions with regard to each user is stored in the user database 150. The interface display unit 132A outputs an interface for specifying the output resource corresponding to each user, based on the customized information (step Sf03).

Figure 53:
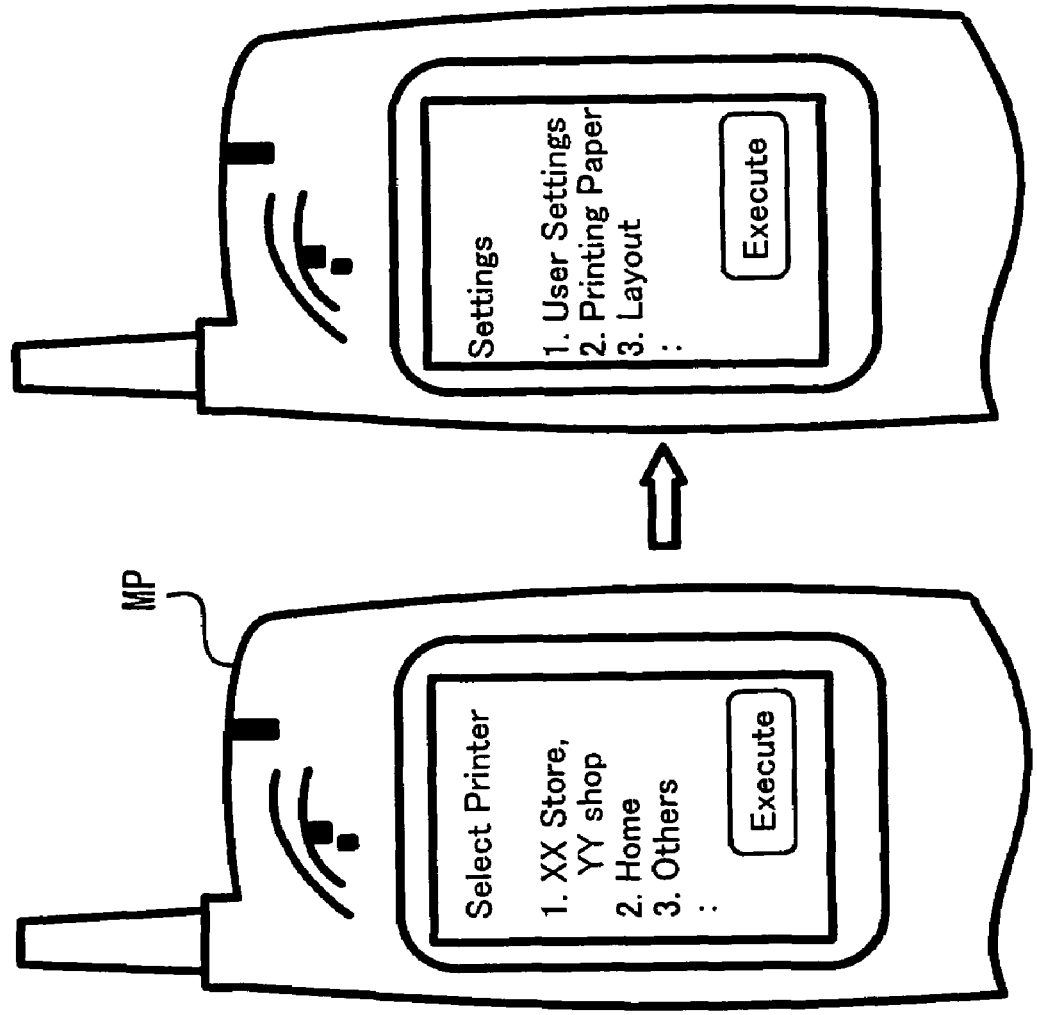
FIG. 53 shows an example of customized interface.

FIG. 53 shows an example of customized interface. The left-side drawing shows a customized interface for specifying the output resource. The display format of available output resources follows the standard interface. In the customized environment, however, the output resource usually selected by the user is displayed preferentially. In the case of a chain store, it is desirable to display not only the store chain name but the lower hierarchical level to identify an individual printing station, for example, YY shop.

When the user specifies the printer of the desired output resource on this interface, the information representing the specification is transmitted to the job controller 132B (step Sf04). The job controller 132B selects the printing service provider, based on the received information.

The interface display unit 132A then displays an interface for setting the printing conditions, based on the customized information (step Sf05). The right-side drawing of FIG. 53 shows a customized interface for setting the printing conditions. There is an option 'User Settings' for selecting the customized settings. Customized data of the printing paper, the layout, and other printing conditions set by each user is registered in the user database 150. When the user selects the option 'User Settings', the printing operation is carried out under the registered conditions, without any specific settings.

When the user sets the printing conditions via this interface, the information on the settings is transmitted to the job controller 132B (step Sf06). The job controller 132B sends the print data and the information on the settings of printing conditions to the printing service provider selected corresponding to the designated output resource.

Figure 54:
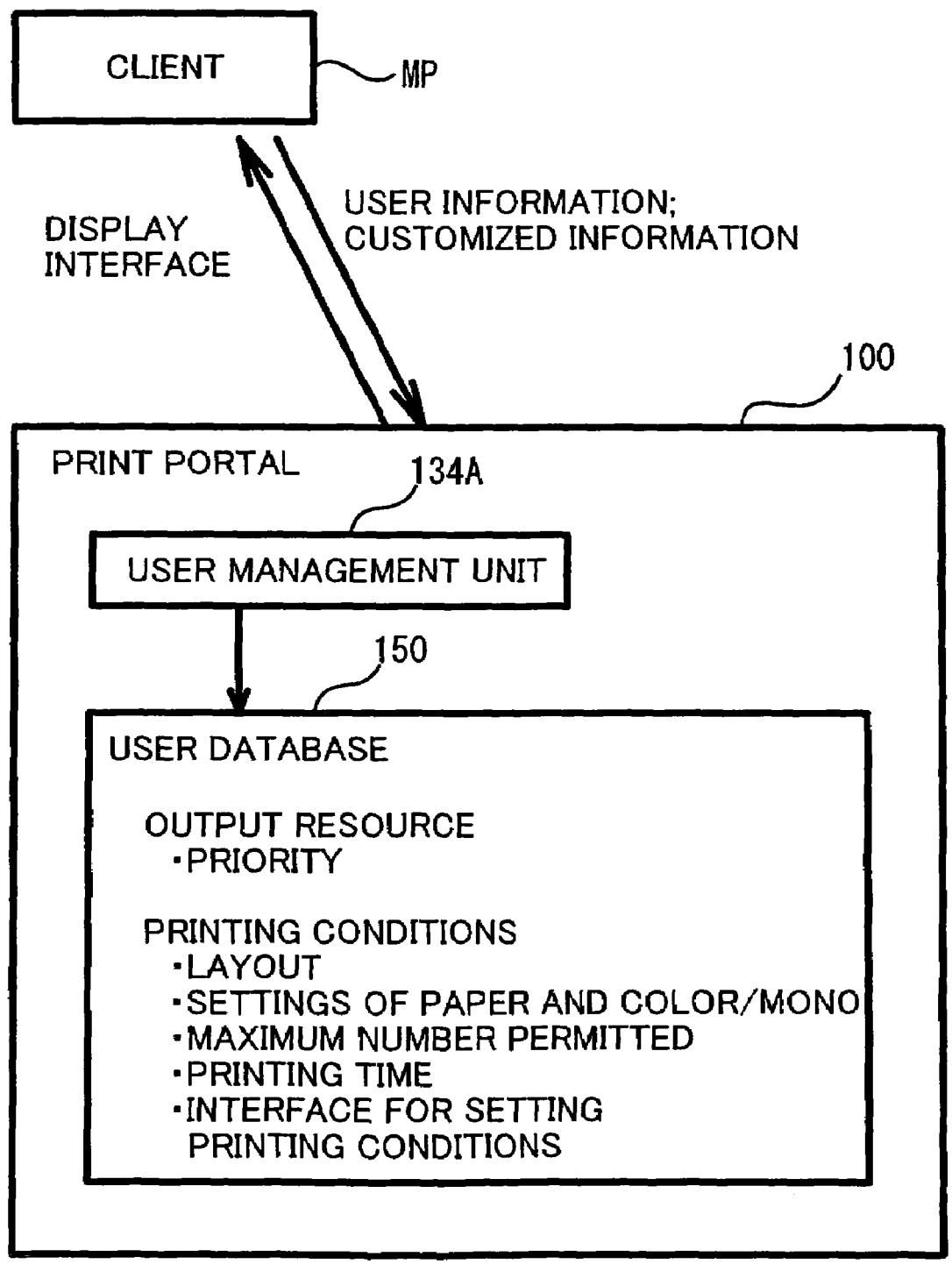
FIG. 54 shows data transmission in the process of registering the customized information.

FIG. 54 shows data transmission in the process of registering the customized information. The print portal 100 causes an interface for customization to be displayed on the client MP. The user registers the user information and the customized information in the print portal PP via this interface. The customized information is mapped to the user information and stored in the user database 150 by the user management unit 134A. In order to prevent illegal registration, one preferable application requires the user to input a password for customization.

The customized information includes information on the output resource and information on the settings of printing conditions. A typical example of the information on the output resource is the priority of available output resources to the user. Registration of the available output resources may be set adequately by taking into account the storage capacity permitted for each user.

The information on the settings of printing conditions includes the layout, the paper size, the selection of color printing or monochromatic printing, the maximum number permitted, the printing time, and the information on the interface for setting the printing conditions. The layout represents a print form, such as 1 page/sheet or 2 pages/sheet. The paper size represents the size of generally used printing paper, such as A4 or B5. The selection of color printing or monochromatic printing is effectively used, for example, when the user desires to print color print data in monochrome. The maximum number permitted represents the maximum number of printing sheets permitted for each print job. This limits the needless cost when the user unintentionally sends a print job of an extremely large volume. The printing time represents the time zone specified for printing. This is effectively used, for example, for printing news provided on a Web page in a regular manner. The information on the interface for setting the printing conditions represents selected display of the settings of printing conditions, for example, a beginner mode or an expert mode. A diversity of other conditions, for example, the printing quality or the presence of a stamp mark, may also be included in the settings of printing conditions.

As one of the customization functionality, frequently used documents may be stored, as well as the output resource and the settings of printing conditions.

Figure 55:
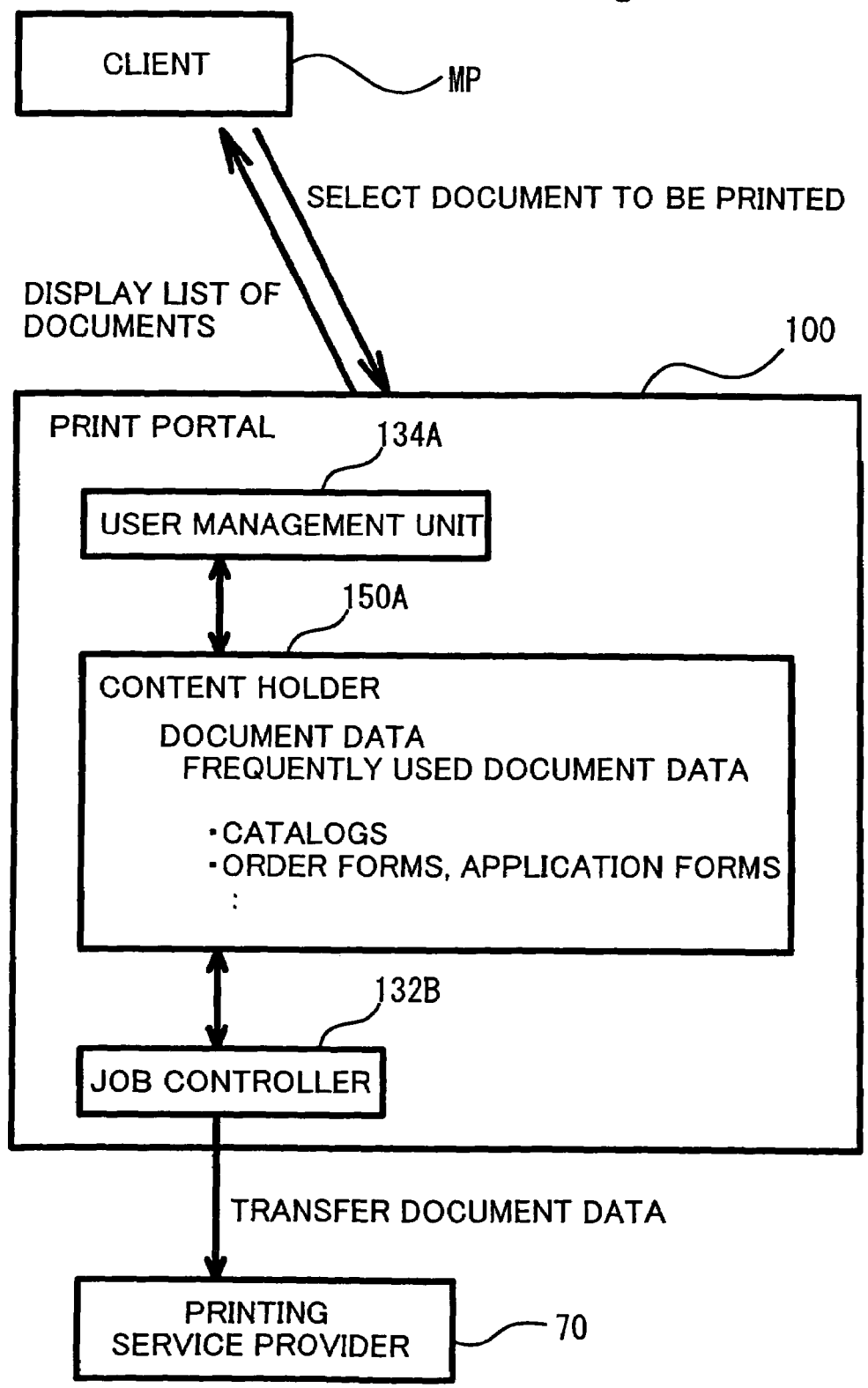
FIG. 55 shows functional blocks involved in the document storage functionality.

FIG. 55 shows functional blocks involved in the document storage functionality. As discussed previously, the content holder 150A stores each content with mapping to the user information for identifying the user, such as the user ID. The content may be a document file created by the user, data downloaded from the content provider, or information representing the address of the content on the Internet, such as the URL (Uniform Resource Locator). Typical examples of the documents registered include catalogs, order forms, and application forms.

Figure 56:
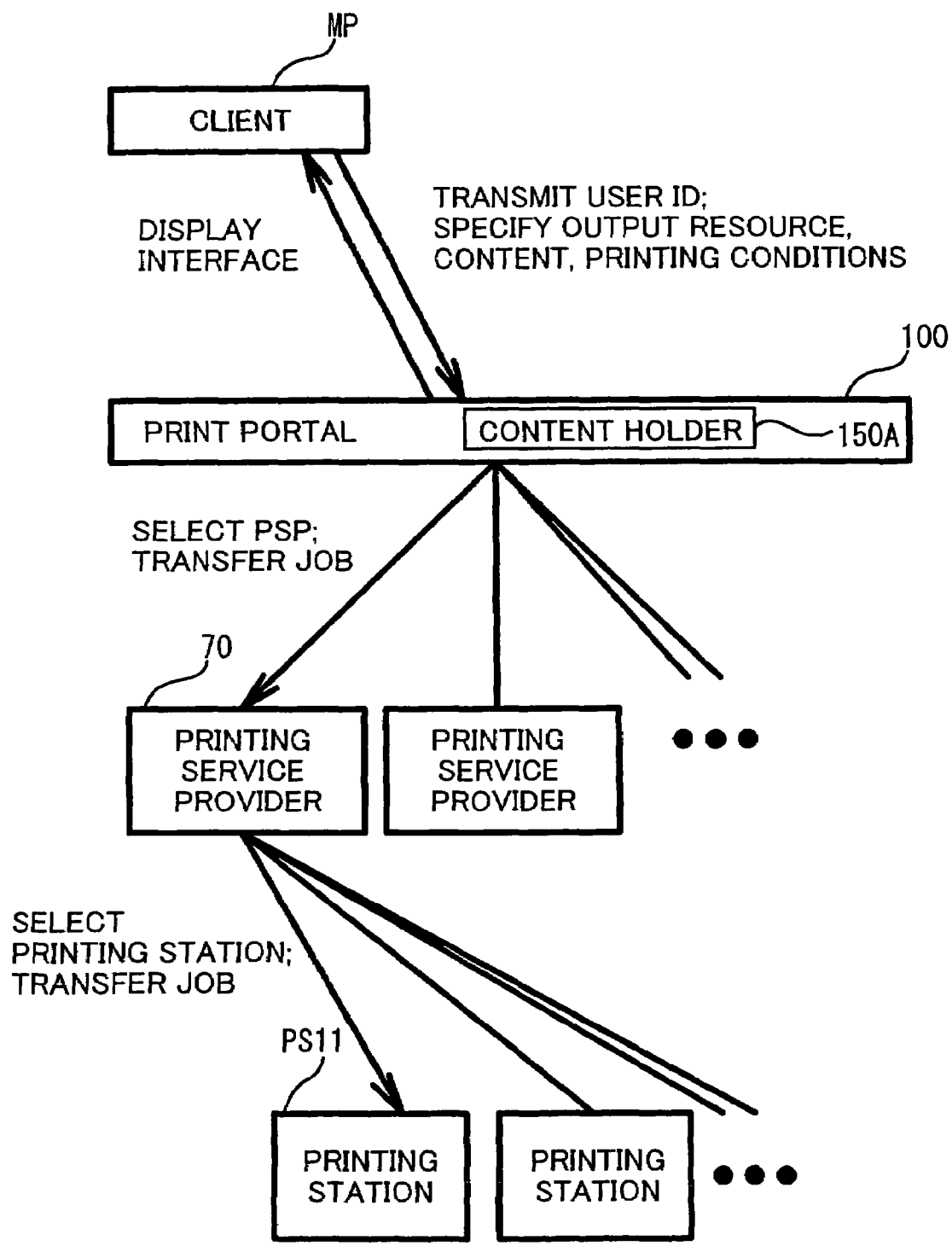
FIG. 56 shows data transmission in the process of printing a registered content.
Figure 57:
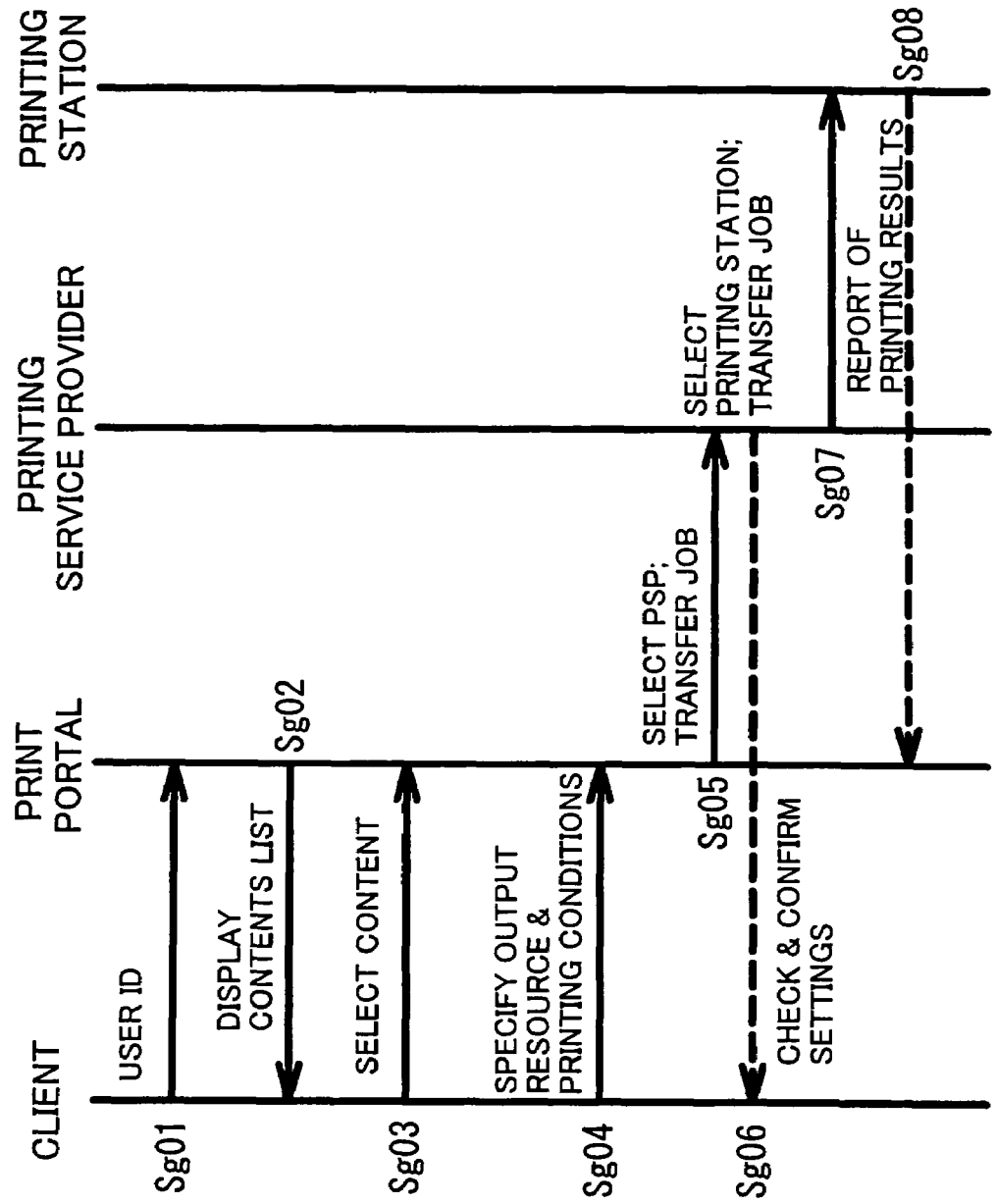
FIG. 57 is a timing chart in the process of printing the registered content.
Figure 58:
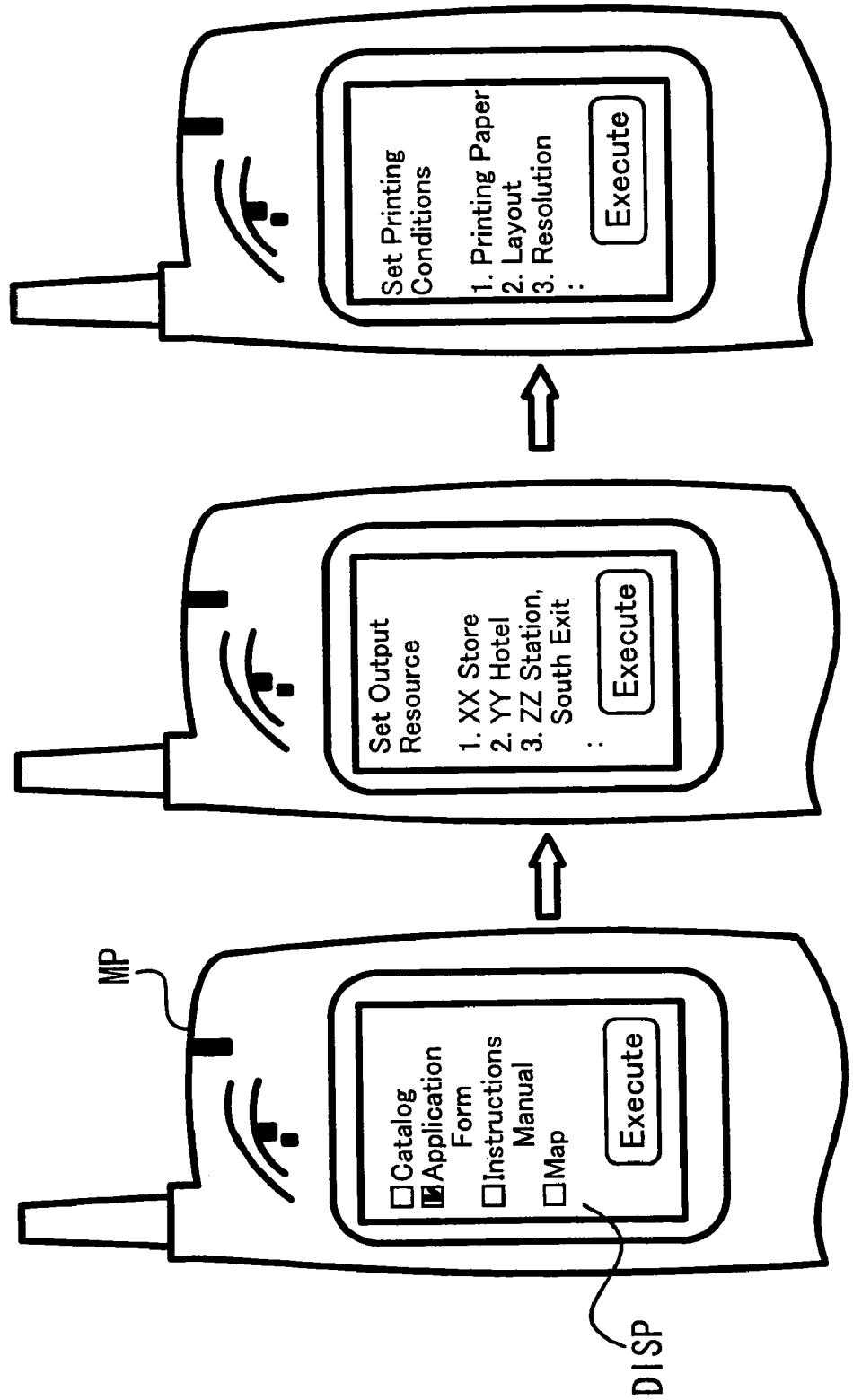
FIG. 58 shows an exemplified interface in the process of printing the registered content.

FIG. 56 shows data transmission in the process of printing a registered content. FIG. 57 is a timing chart in the process of printing the registered content. FIG. 58 shows an exemplified interface in the process of printing the registered content. The following describes the process of printing the registered content with referring to these drawings.

The user first gains access to a Web page provided by the print portal and transmits the user ID and the user password (step Sg01 in FIG. 57). The print portal PP refers to the content holder 150A and causes a list of contents corresponding to the transmitted user ID to be displayed on the client MP (step Sg02). The left-side drawing of FIG. 58 illustrates a display window of the list. In this example, there are four documents, that is, 'catalog', 'application form', 'instructions manual', and 'map', registered as the contents frequently used by the user. One modified procedure displays a menu window to allow the user to select either printing of a registered content or specification of another content, prior to the display of the list.

The user selects a content of interest as the object of printing out of the list (step Sg03). In the example of FIG. 58, the 'application form' has been selected. In the case where only one content is registered, the display of the contents list and the selection of a desired content may be omitted.

The print portal 100 then displays interfaces for specifying the output resource and the printing conditions (step Sg04). The center drawing of FIG. 58 illustrates an interface for specifying the output resource. The right-side drawing of FIG. 58 illustrates an interface for specifying the printing conditions.

Information on the settings of printing conditions, such as the paper size and the layout, may be mapped to each content and stored with the content in the content holder 150A. This application enables the specification of the printing conditions to be omitted.

When the user utilizes these interfaces and sets the desired output resource and the printing conditions, information on the settings is transmitted to the print portal PP (step Sg05). The print portal PP transfers the designated content to the designated printing service provider, based on the transmitted information (step Sg05).

When the address of each content, for example, the URL, is kept in the content holder 150A, the print portal 100 gains access to the designated content provider, fetches a desired content, and transfers the fetched content to the printing service provider.

The printing service provider receiving the print job selects a printing station and transfers the print job to the selected printing station (step Sg07). The printing station executes the print job to implement printing. One modified procedure may give a display including the designated output resource and the specified printing conditions to the client MP for the purpose of check and confirmation, prior to the transfer of the print job to the printing station (step Sg06). On completion of the printing operation, a report of printing results may be transmitted from the printing station PS11 to the print portal PP (step Sg08).

The user may manage the contents registered in the content holder 150A. The user can arbitrarily add contents to the registration in the content holder 150A or delete contents from the registration in the content holder 150A.

Figure 59:
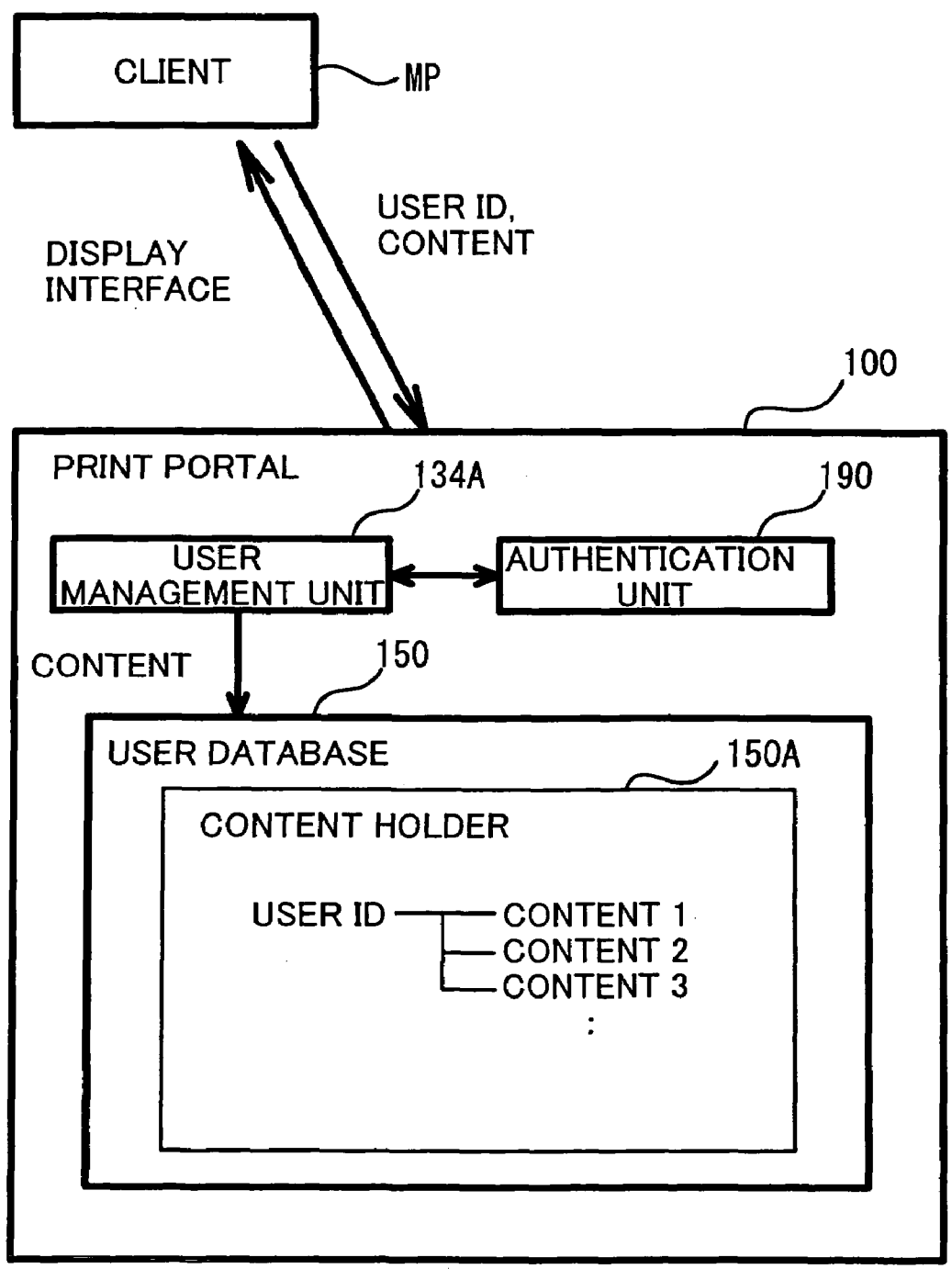
FIG. 59 shows data transmission in the process of adding a content.
Figure 60:
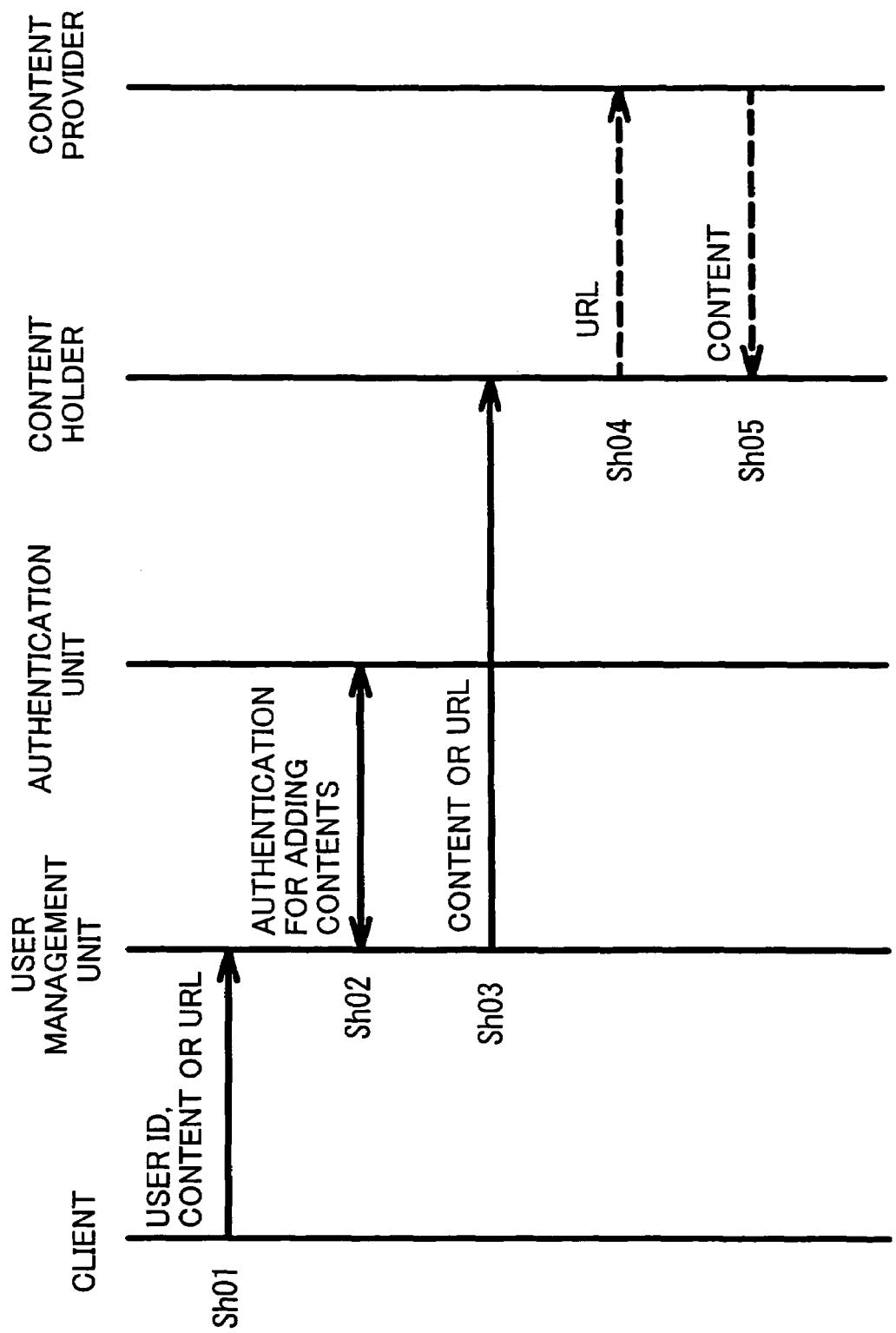
FIG. 60 is a time chart in the process of adding a content.

FIG. 59 shows data transmission in the process of adding a content. FIG. 60 is a time chart in the process of adding a content.

The user gains access to a Web page provided by the print portal and selects a menu for adding contents. The user subsequently transmits the user ID, the user password, and a selected content to be added to the print portal PP (step Sh01). The user may alternatively transmit the URL representing the address of the selected content.

The user management unit 134A of the print portal PP receives the transmitted information and executes a series of processing to add the selected content. The user management unit 134A transfers the user ID and the user password to an authentication unit 190, which identifies the accessed user as the authenticated user who is allowed to add contents (step Sh02). One possible application issues different passwords for printing and for adding contents. This can discriminate the manager of the registered contents from the user of the registered contents.

When the accessed user is identified as the authenticated user who is allowed to add contents, the user management unit 134A stores the content transmitted from the client MP in a specific area of the content holder 150A corresponding to the user ID (step Sh03). In the case where the user transmits the URL, the URL may be stored (step Sh04). The alternative procedure fetches a content specified by the URL from the content provider and stores the content (step Sh06). The user can add a new content according to the above series of processing.

Figure 61:
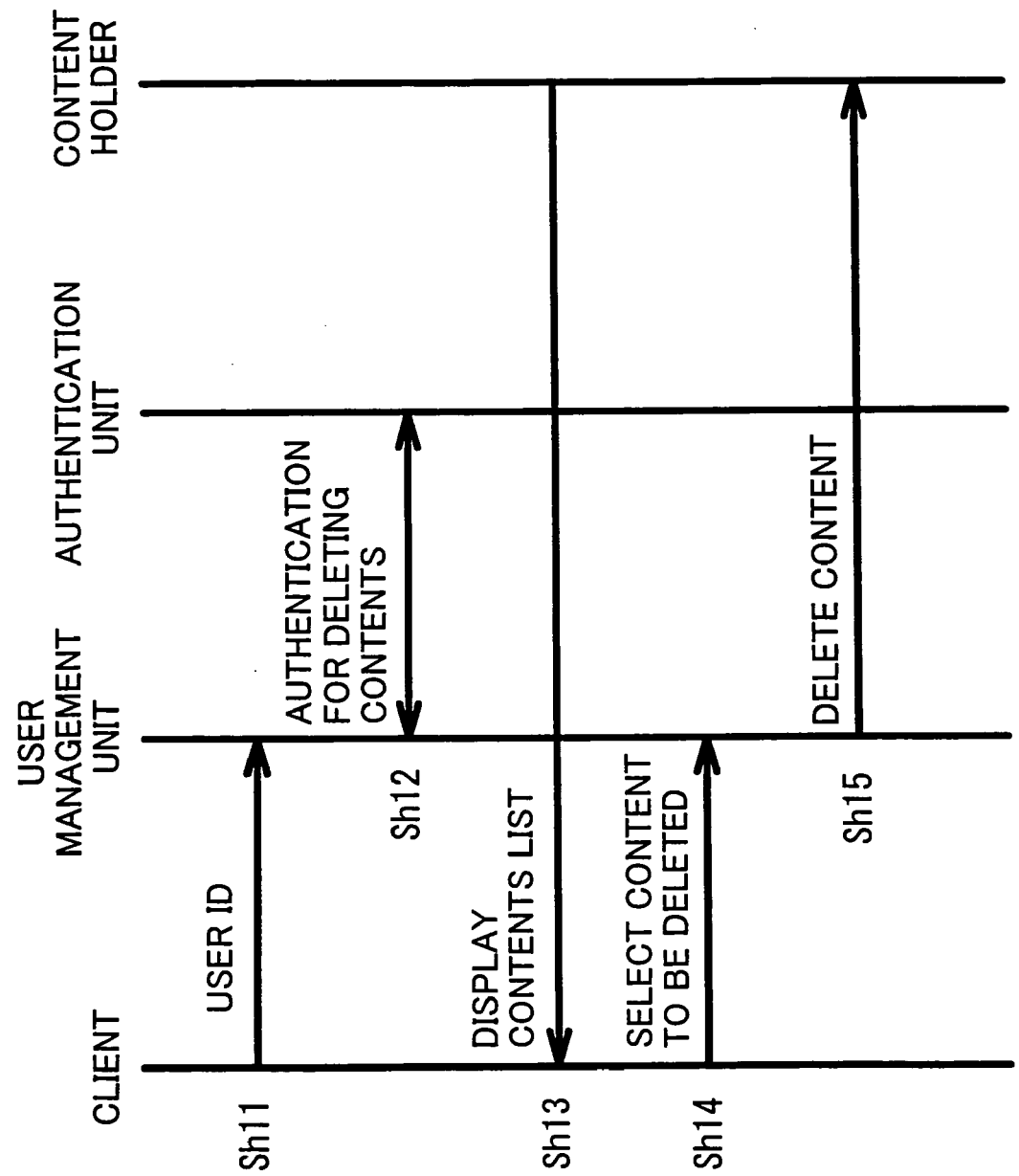
FIG. 61 is a time chart in the process of deleting a content.

FIG. 61 is a time chart in the process of deleting a content.

The user gains access to a Web page provided by the print portal and selects a menu for deleting contents. The user subsequently transmits the user ID and the user password to the print portal PP (step Sh11 in FIG. 61).

The print portal PP carries out a series of processing to delete a selected content, based on the transmitted information. The user management unit 134A transfers the user ID and the user password to the authentication unit 190, which identifies the accessed user as the authenticated user who is allowed to delete contents (step Sh12).

When the accessed user is identified as the authenticated user who is allowed to delete contents, the user management unit 134A displays a list of registered contents (step Sh13). The user selects a content to be deleted out of the list (step Sh14). An interface similar to that of FIG. 58 may be used for selecting the content to be deleted. The user management unit 134A then actually deletes the selected content from the registration in the content holder 150A (step Sh15). The user can delete a non-required content according to the above series of processing.

The customization functionality discussed above does not require the detailed settings of the output resource and the printing conditions every time the user utilizes the print portal system, thus enhancing the utility.

The contents registration functionality does not require transfer of a content every time the content is printed. In the actual service, the user may desire to print an identical document at different places. Typical examples of such document include catalogs, application forms, and estimate sheets. If the user is required to always carry document data for printing these forms, such requirement undesirably damages the utility of the printing environment that allows free choice of the output resource. The contents registration functionality enables the user to print these forms, while the user is not required to carry and manage the print data. This accordingly ensures the printing environment with high utility.

Figure 62:
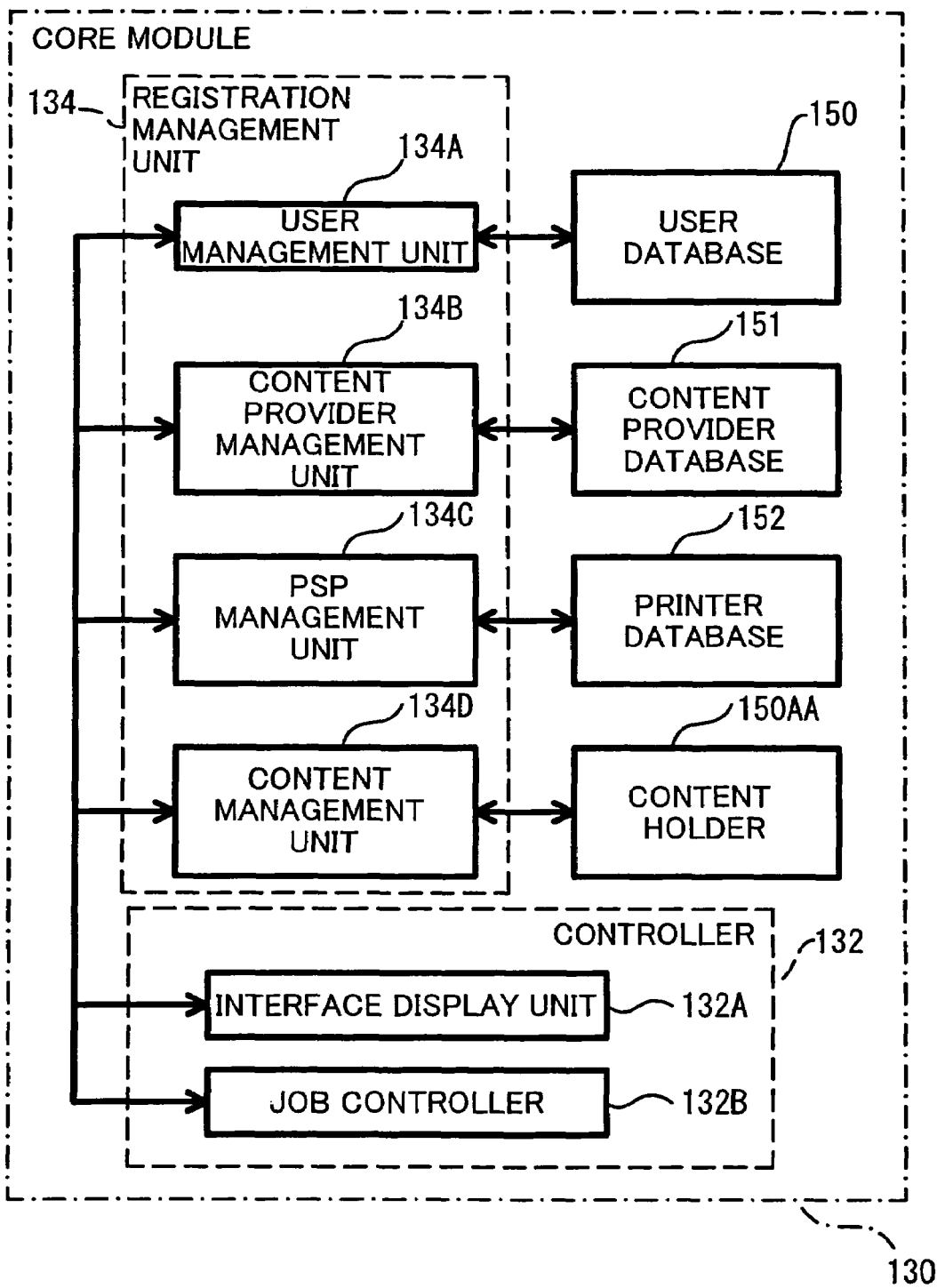
FIG. 62 shows functional blocks in a modified example to attain the contents registration functionality.

In the above embodiment, each content is mapped to the user ID and registered. One possible modification may manage each registered content independently of the user ID. FIG. 62 shows functional blocks in a modified example to attain the contents registration functionality. The difference from the structure of FIG. 51 is that a content management unit 134D and a content holder 150AA are separate from the user management unit 134A and the user database 150.

The content management unit 134D registers and manages contents in the content holder 150AA. In this modified example, an identification code, which is different from the user ID, is used for the management of each content. The content management unit 134D maps each content to the identification code, to the user who is allowed to use the registered content, and to the user who is allowed to delete the registered content. The user management unit 134A manages the users with or without the authentication of adding contents. A diversity of settings may be applied for the identification code. In the description below, it is assumed that a unique code one-to-one mapped to each content is applied for the identification code.

The process of printing a content registered in the content holder 150AA follows the procedure discussed in the above embodiment (see FIGS. 56 to 58). In this modified example, the identification code is unequivocally mapped to the content, so that the user inputs the identification code to specify the content to be printed. This application does not require display of the contents list.

The process of newly registering a desired content also follows the procedure discussed in the above embodiment (see FIG. 60). In the above embodiment, each content is mapped to the user ID and registered. In the modified example, on the other hand, the content is related to the identification code. The identification code is unequivocally mapped to each content and is thus created by the print portal PP. The client MP is notified of the identification code at the time when registration of the corresponding content is completed. Each content is registered with the user who is allowed to use the content and the user who is allowed to delete the content.

Sequential numbers may be applied for the identification codes of the respective contents. The identification code may be created in combination with the user ID. For example, the identification code may include the user ID as the upper digits and the content number as the lower digits.

The arrangement of the modified example uses the identification code for unequivocally identifying each content, thus facilitating specification of the content for printing. Management of the content with the identification code enables a plurality of users to share the registered content. For example, when the common content is news or a circular magazine provided to registered users, each user can print the content according to the requirements. In another example, when the common content is a catalog or an application form to be uniformly used in the organization, members of the organization are notified of the identification code of the common content.

An identification code may be mapped to a plurality of contents. Separately from the user ID given to each user, an identification code for contents registration may be assigned to an organization like a corporation. Registration of contents mapped to this identification code allows members of the organization to readily share the registered contents. Input of the identification code assigned to the organization causes a list of common contents to be displayed for printing.

The arrangement of the modified example ensures flexible management of registered contents according to the definition of the identification code, thus further enhancing the utility.

E2. Customization Functionality for Content Providers

Figure 63:
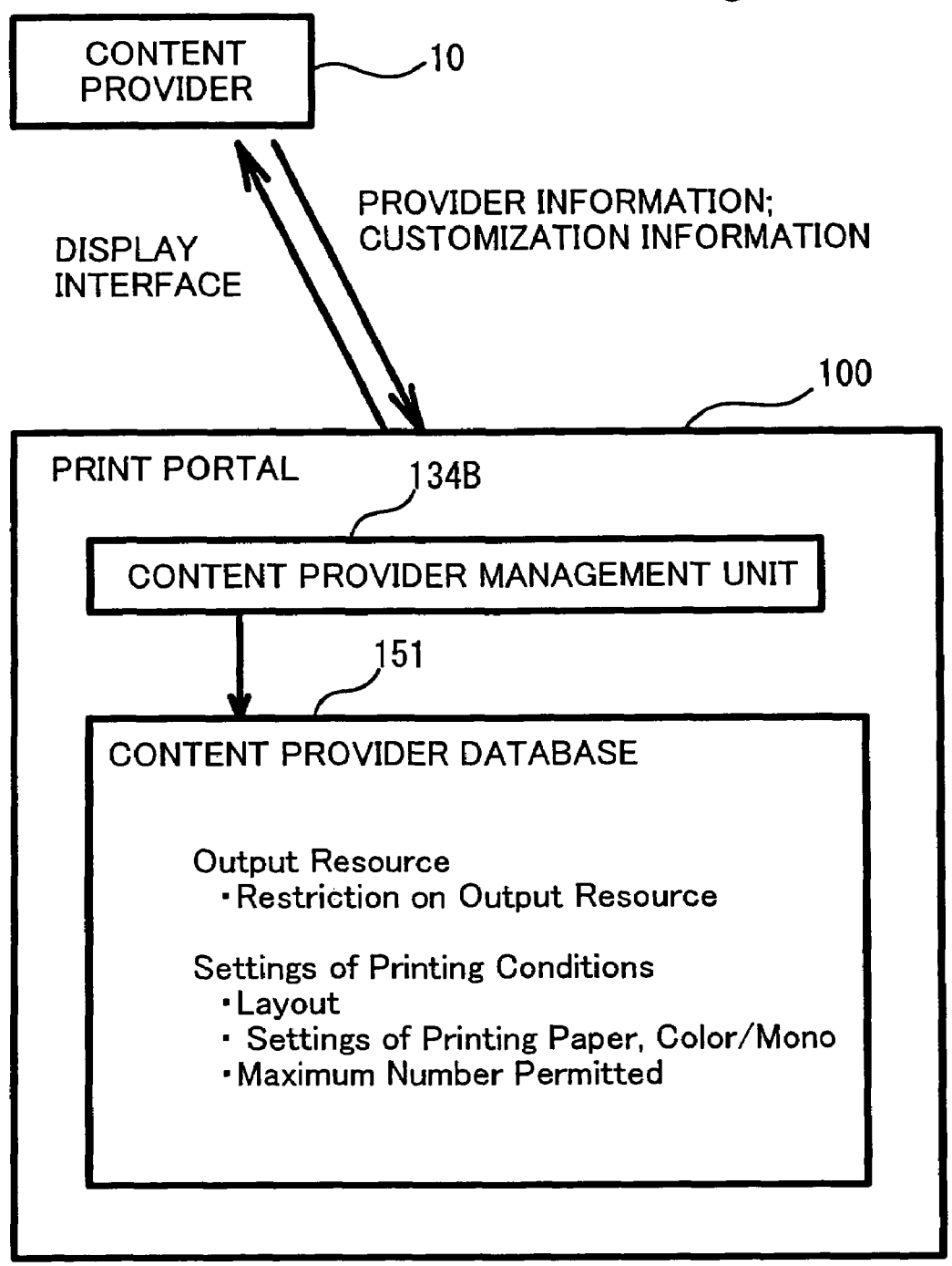
FIG. 63 shows data transmission in the process of registering customization information.

FIG. 63 shows data transmission in the process of registering customization information. The content provider 10 gains access to the print portal 100 to register customization information. The customization information is stored in the content provider database 151 under management of the content provider management unit 134B.

The customization information may include information regarding restriction on the output resource and information on the settings of printing conditions. The former information is effectively used, for example, when the owner of a certain printing service is affiliated with the content provider and other printing services should be excluded from the available output resources.

The information on the settings of printing conditions may include the layout, the paper size, the selection of color or monochromatic printing, and the maximum number of printing sheets permitted. This information is effectively used, for example, when the content provider desires to restrict the user's settings, in order to maximize the value of its own information. Setting the maximum number of printing sheets permitted protects the copyright and other benefits of the content provider.

When the user clicks the 'iPrint' button to link with the print portal 100, the print portal 100 specifies the customization information, based on content provider information, such as a domain name. The printing operation is carried out under the conditions specified by the customization information.

In this embodiment, the print portal 100 manages the customization information. One possible modification minimizes the customization with regard to the content provider and transmits the restrictions attached to the content to the print portal at the time of printing the content.

E3. Customization Functionality for Printing Stations

Figure 64:
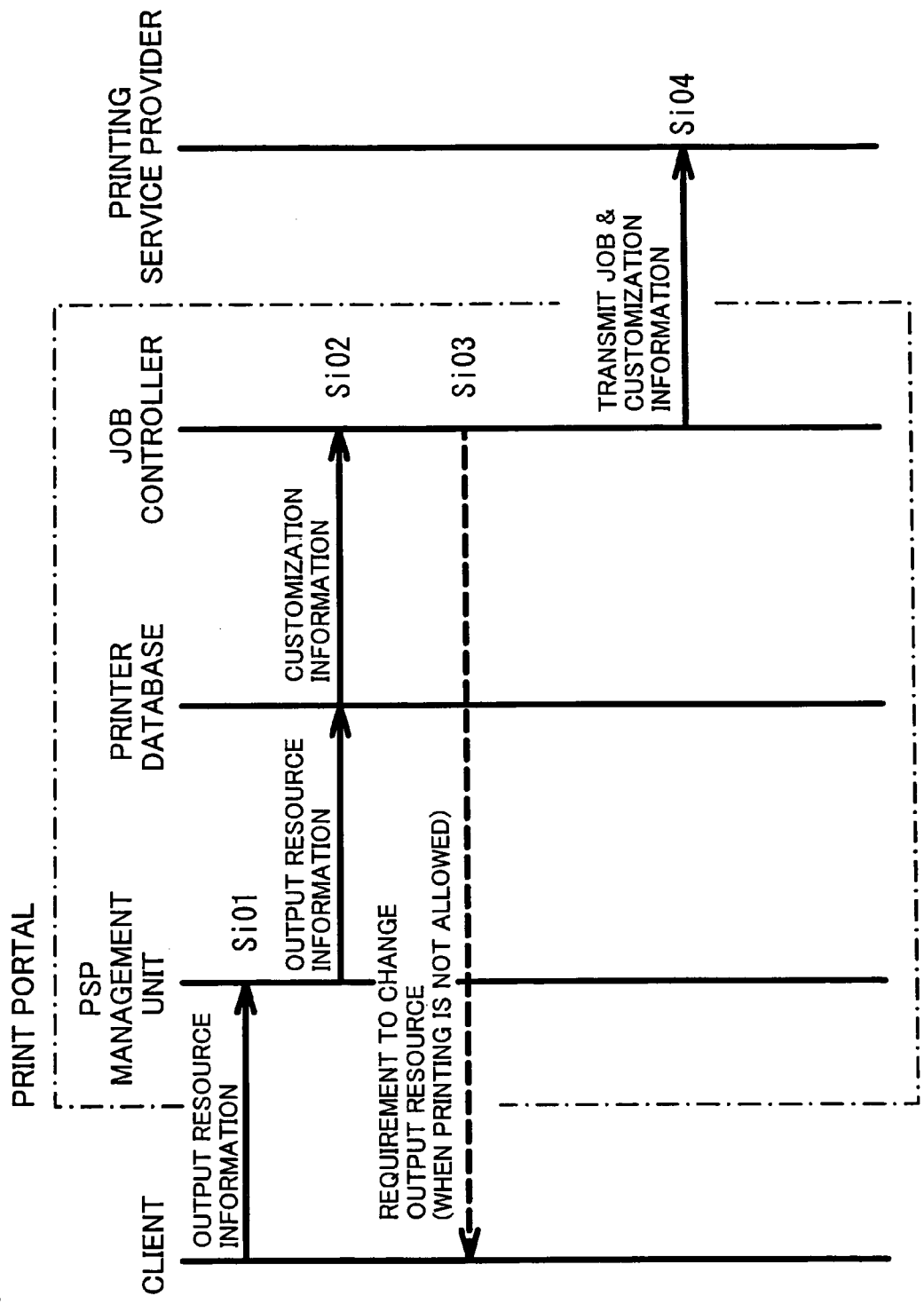
FIG. 64 is a time chart in the process of printing a mail under the customized conditions.

FIG. 64 is a time chart in the process of printing a mail under the customized conditions. The PSP management unit 134C and the printer database 152 manage customization information of the printing station.

When the user specifies the desired output resource and the settings of printing conditions to implement the printing operation, the PSP management unit 134C collects output resource information (step S101).

The PSP management unit 134C subsequently refers to the printer database 152, based on the collected output resource information, and transfers customization information to the job controller 132B (step S102). The customization information represents restrictions on the authenticated users and contents to be printed, which are set by the printing station PS11. In the case where any of the user, the selected print data, and the settings of printing conditions do not meet the customization information, the job controller 132B displays a requirement to change the output resource (step S103). In the case where all the conditions meet the customization information, on the other hand, the job controller 132B transmits the print job to the printing service provider (step S104).

Figure 65:
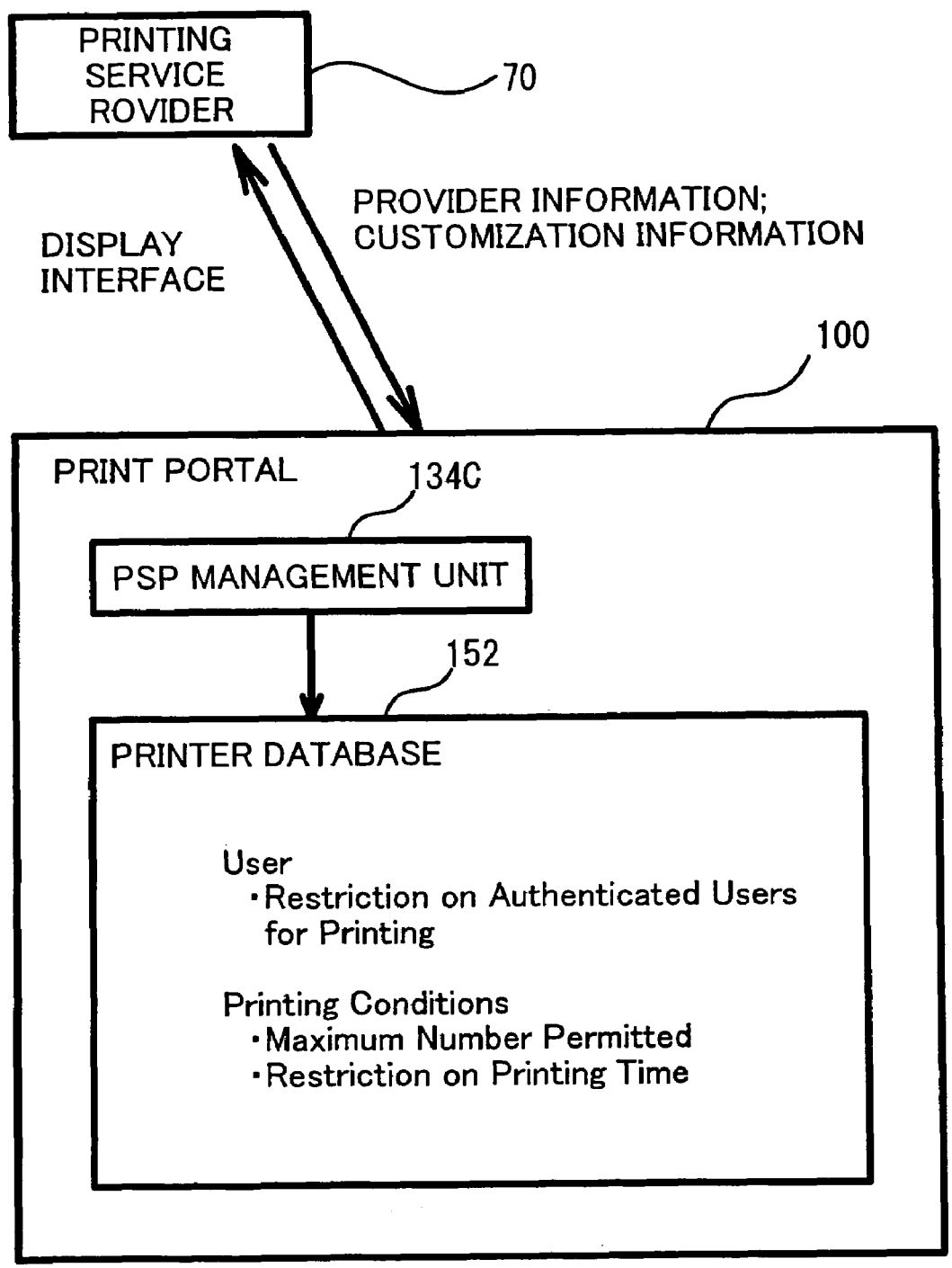
FIG. 65 shows data transmission in the process of registering customization information.

FIG. 65 shows data transmission in the process of registering customization information. The printing station registers the customization information in the print portal 100 by utilizing an interface provided by the interface display unit 132A.

In the print portal 100, the PSP management unit 134C registers the customization information in the printer database 152.

The customization information may include information regarding restrictions on the authenticated users for printing. Namely user information on the authenticated users for printing are registered as the customization information. Such information is effectively used, for example, when the owner of the printing station is a general individual or corporation.

The customization information may also include information on the settings of printing conditions; for example, the maximum number of printing sheets permitted for each job and the restriction on the printing time. Setting the maximum number of printing sheets permitted is effectively used to prevent a certain user from printing an extremely large volume and exclusively occupying the printer and to prevent any unauthorized person from printing an extremely large volume. The restriction on the printing time is effectively used, for example, to allow printing only during business hours of a shop. The customization information is not restricted to such pieces of information but may include additional pieces of information.

F. Settings of Printing Conditions

In the print portal system of the embodiment, plural entities may set different printing conditions. This is because the user, the content provider, and the printing station individually set and restrict the printing conditions. The arrangement of this embodiment sets the order of priority to the authorities for setting the printing conditions, in order to handle the contradictory settings of the printing conditions.

Figure 66:
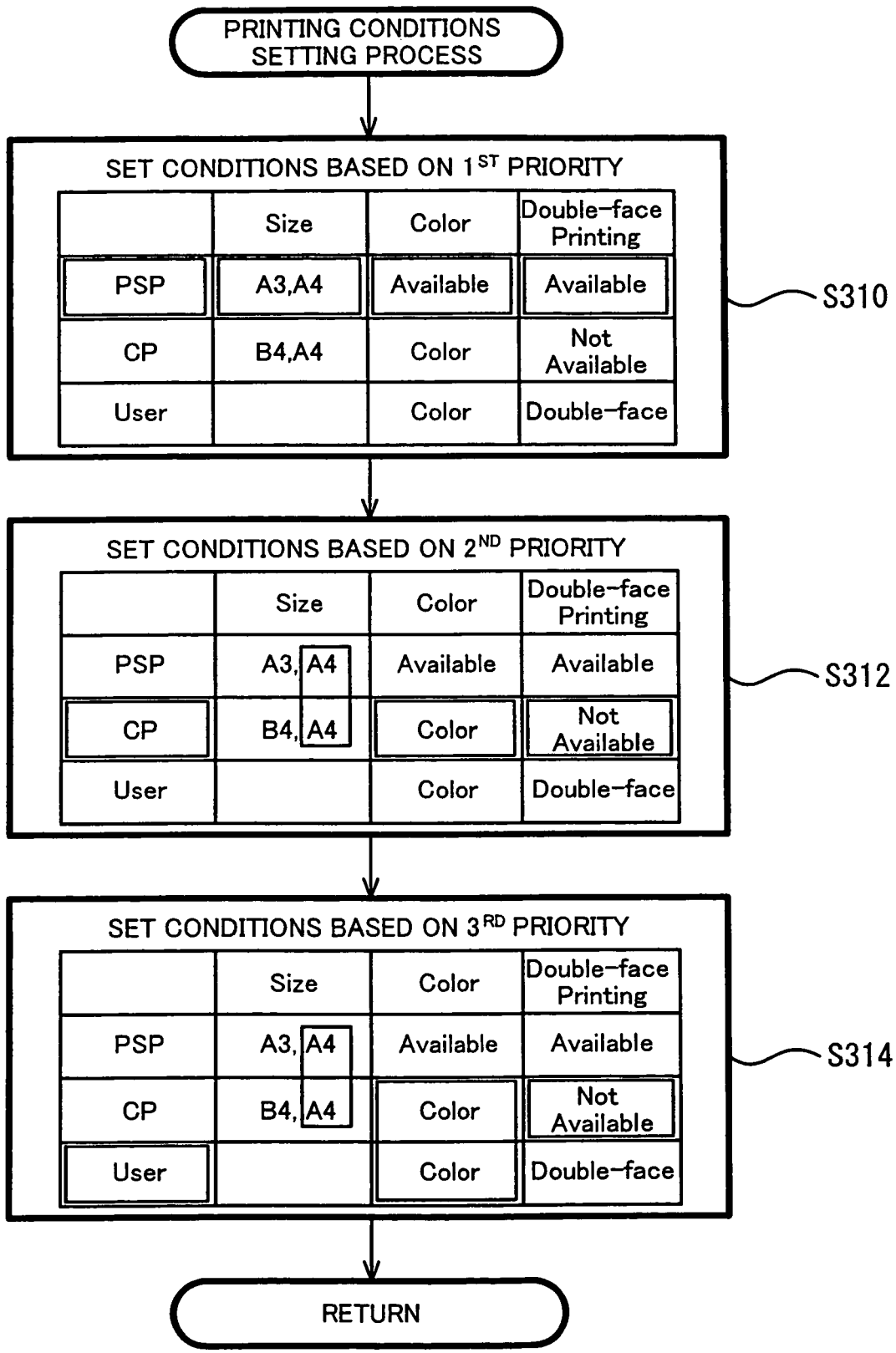
FIG. 66 is a flowchart showing a routine of setting the printing conditions.

FIG. 66 is a flowchart showing a routine of setting the printing conditions. This routine is executed to determine the ultimate printing conditions in the case where the above three entities individually set the printing conditions. The arrangement of this embodiment gives the first priority of setting the printing conditions, the second priority, and the third priority respectively to the printing station or the printing service provider (PSP), to the content provider, to the user.

The processing routine first takes into account the printing conditions set by the printing service provider having the first priority (step S310). The flowchart shows exemplified settings for the paper size, the color/mono printing, and the double-face printing.

The settings of step S310 specify A3 or A4 as the available paper size, availability of both the color printing and the monochromatic printing, and availability of both the double-face printing and the single-face printing, based on the conditions set by the printing service provider (PSP). Namely there are no specific restrictions on the color printing and the double-face printing.

The processing routine then takes into account the printing conditions set by the content provider (CP) having the second priority (step S312). The conditions set by the content provider (CP) are considered only in the available range of the settings by the printing service provider PSP.

In the illustrated example, the content provider sets either B4 or A4 as the available paper size, while the printing service provider allows printing in the size A3 or A4. By referring to both the settings, A4 is selected as the paper size. In a similar manner, color printing and single-face printing are selected for the other settings.

The processing routine subsequently takes into account the printing conditions set by the user having the third priority (step S314). In the illustrated example, the user does not set the paper size, so that the size A4 set at step S312 is determined as the ultimate printing condition.

The user requires color printing. This is consistent with the settings at step S312. The color printing is thus set as the ultimate printing condition.

The user requires double-face printing. This is contradictory to the settings at step S312. The user's requirement is thus rejected, and the single-face printing is set as the ultimate printing condition.

The order of priority may be specified arbitrarily. As illustrated in this embodiment, however, it is preferable to give the higher priority to the settings based on the printing performances and the settings by the content provider than the settings by the user.

G. Accounting

G1. Accounting

Figure 67:
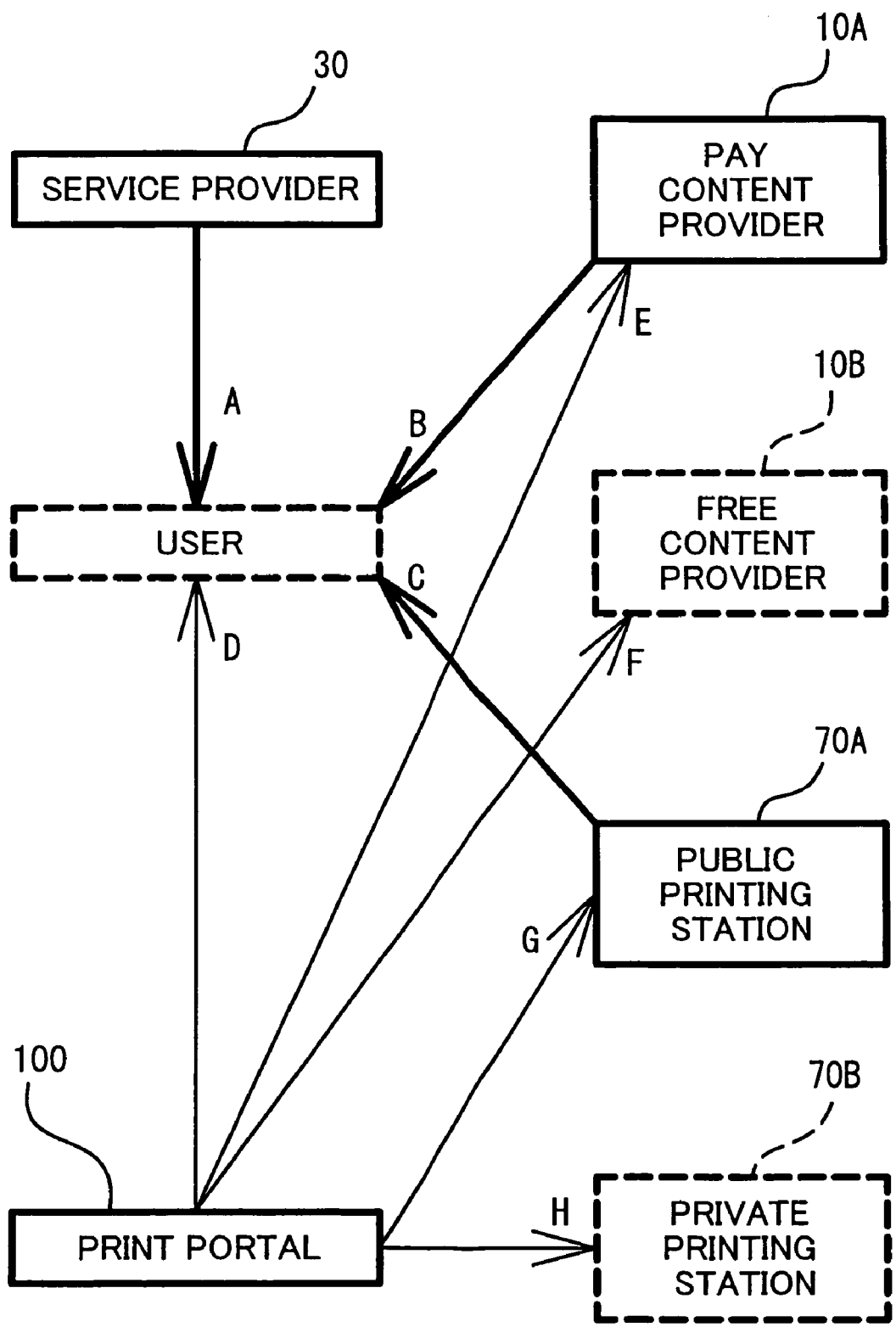
FIG. 67 shows the flow of accounting.

FIG. 67 shows the flow of accounting. The charging from the service provider 30 to the user (charge A in the drawing) is, for example, a communication fee charged for the client's access to the network.

The charging from the content provider to the user depends upon the pay for the content, that is, either the pay content provider or the free content provider. A free content provider 10B that provides information free does not charge the user for the information. A pay content provider 10A that provides charged information, on the other hand, charges the user for the information (charge B in the drawing). Here the term 'pay' or 'charge' means that a fee is required for printing. The content provider that allows free browsing but charges the user for printing is regarded as the 'pay content provider'. The content provider that allows only charged browsing but does not separately charge the user for printing is regarded as the 'free content provider'. The pay content providers include the provider that charges the user for browsing information and has already made a contract with the user for accounting, and the provider that allows free browsing of information and makes no contract with the user for accounting.

The charging from the printing service provider (PSP) to the user depends upon the printer used for printing, that is, either the printer installed in a public space or the printer owned by any individual or private entity. In the case of a public printing station 70A that uses a printer installed in a public space, the charge is mainly for consumption of expendables, for example, printing paper and toner (charge C in the drawing). Depreciation of the printer and its peripheral equipment may be reflected on the charge. The public printing station 70A provides, for example, many and unspecified people with services at a store, a hotel, or a station. A private printing station 70B that uses a printer owned by any individual or private entity does not charge the user for printing. Although the expendables are naturally consumed by printing, the users of such a printer are limited. There is accordingly little necessity of specifically charging the users for printing. The private printing station 70B may utilize, for example, a printer owned by the user, a company, or another corporation.

The charges A to C arise on every execution of printing. The print portal 100 charges the respective system users for the services. In the discussion below, for the clarity of explanation, the printing service provider is included in the print portal 100. This is because the details and the process of accounting by the print portal 100 are similar to those by the printing service provider.

The print portal 100 charges the user, the content providers 10A and 10B, and the printing stations 70A and 70B for the services of the system (charges D to H in the drawing). Diverse accounting systems may be applied for these charges. One applicable procedure sets a fixed rate for every specified time period. For example, a fixed fee may be collected every month. Another applicable procedure sets a charge at the time of registration for the services of the print portal 100. One typical example of this application is an admission fee. Still another applicable procedure sets a quantity-based rate, for example, according to the frequency of printing via the print portal 100. In the description below, the system sets a fixed rate for every specified time period.

In the drawing of FIG. 67, the boxes of the solid line may function to collect the charges. The service provider 30, the pay content provider 10A, the public printing station 70A, and the print portal 100 are potential payment collectors. Each accounting source may work as the payment collector. The respective accounting sources may thus individually collect the charges shown in FIG. 67.

Figure 68:
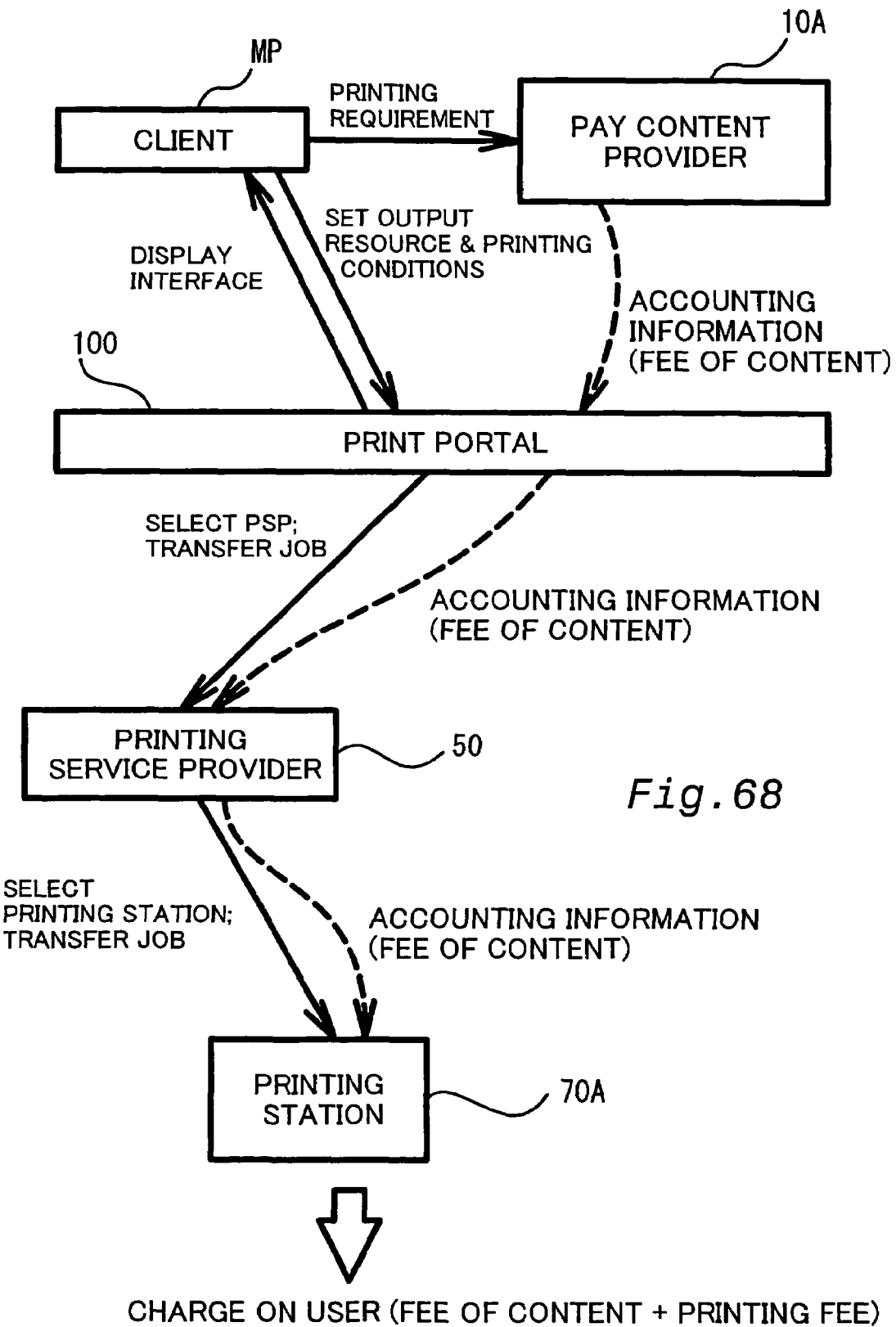
FIG. 68 shows a process of collecting charges at a printing station 70A.

In the print portal system of this embodiment, printing-related information like print data is transmitted among the respective entities shown in FIG. 68 in the printing process. Transmission of information on accounting together with the printing-related information enables total management of plural charges at one place. This arrangement effectively reduces the load of collecting charges and enhances the utility. The lump sum accounting system is especially effective for charging the user on every execution of printing. As examples of the lump sum accounting system, the following describes processes of collecting charges at the printing station, at the print portal, and at the service provider in the case of printing a pay content.

FIG. 68 shows a process of collecting charges at the printing station 70A. In this example, the printing station 70A located at the lowest level collects all the pieces of accounting information arising in the course of printing and takes charge of the lump sum accounting. In the illustrated example, the solid lines represent transmission of printing-related information, which have been discussed previously with the diverse examples. The broken lines represent transmission of the accounting information.

When the client MP issues a printing requirement for a certain pay content provided by the pay content provider 10A, the access of the client MP is changed over to the print portal 100. At this moment, the pay content provider 10A transmits accounting information as well as print data to the print portal 100. The accounting information represents a charge for printing the certain pay content, which is varied according to the number of copies or the number of pages included in the content.

The print portal 100 transfers the input print data to the printing service provider 50, in response to a user's requirement. The accounting information transmitted from the pay content provider 10A is attached to the print data. The printing service provider 50 then transmits the print data and the accounting information attached thereto to the designated printing station 70A. The printing station 70A accordingly receives the accounting information on the fee of the pay content. On completion of the printing operation, the printing station 70A generates accounting information that represents a printing fee charged to the user corresponding to the consumption of printing paper and toner, in addition to the fee of the content. The printing station 70A thus collects all the pieces of accounting information regarding the charges to the user.

The user fetches prints from the printing station 70A, so that the fees can readily be collected at this moment by cash. The payment may alternatively be settled by prepaid card, by credit card, or by transfer to the bank account.

The printing station 70A gains the details of accounting and pays the pay content provider 10A for the fee of the pay content. The payment may be settled individually between the printing station 70A and the pay content provider 10A, but is preferably settled via the print portal 100 as discussed below. After collection of the fees, the printing station 70A transmits the accounting information, which clearly discriminates the fee of the pay content from the printing fee, to the print portal 100. The print portal 100 keeps the accounting information for a preset time period. The print portal 100 regularly processes the stored accounting information and clarifies the accounting between pay content provider 10A and the printing station 70A. In a preferable application, the print portal 100 additionally takes into account the charges to the printing station 70A and the pay content provider 10A for services of the print portal system. The provider of the print portal 100 temporarily pays the pay content provider 10A for the fee of the pay content and demands payment corresponding to the fee of the pay content from the printing station 70A. The printing station 70A and the pay content provider 10A settle the printing-related accounting through transactions with the provider of the print portal 100. This arrangement desirably reduces the load of accounting and decreases the possibility of oversight of charging.

This system is applicable for the case in which the public printing station 70A having the capability of collecting charges is designated as the output resource. Another system is suitable for the case in which the private printing station 70B having no capability of collecting charges is designated as the output resource.

Figure 69:
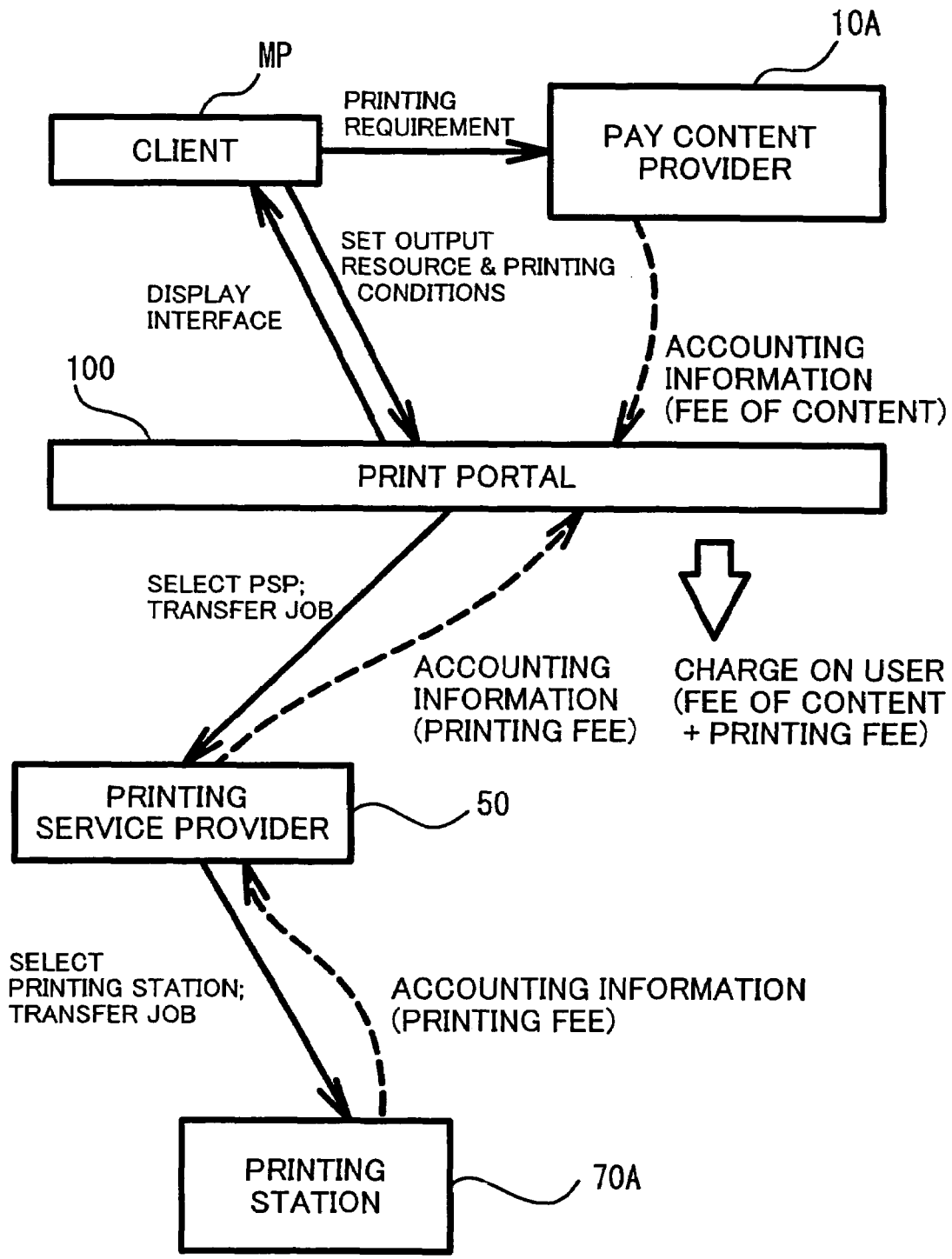
FIG. 69 shows a process of collecting charges at the print portal.

FIG. 69 shows a process of collecting charges at the print portal. As in the case of FIG. 68, the accounting information on the fee of the pay content is transmitted from the pay content provider 10A to the print portal 100 at the time of printing.

The print job is then transferred via the printing service provider to the printing station 70A. The accounting information on the fee of the pay content is related to either the print job or the user and is stored in the print portal 100.

On completion of the printing operation, the printing station 70A creates accounting information on the printing fee. This accounting information is transferred to the print portal 100 via the pathway reverse to the path of the transmission of the print job. The accounting information may be transmitted together with a print report, which represents normal completion of the printing operation. The accounting information may be transmitted directly from the printing station 70A to the print portal 100.

The print portal 100 accordingly gains all the pieces of accounting information on the printing-related charges. The print portal 100 charges the user, based on the collected accounting information. For the enhanced utility, it is preferable to demand payment in a lump sum for every preset time period. The user makes a contract with the print portal 100 to pay for the services of the print portal system. The charges can thus be settled readily by utilizing the same system as the payment for the services; for example, by credit card, by transfer to the bank account, or by electronic prepaid card. The electronic prepaid card gains electronic points, for example, by advanced transfer to the bank account, and decreases the electronic points to pay for the printing-related charges. Another applicable procedure settles the payment by cash via a window opened by the provider of the print portal 100.

The payment to the print portal 100 is distributed to the pay content provider 10A and the printing station 70A by a similar procedure to that in the system of FIG. 68. In the system of FIG. 69, the print portal 100 carries out all the required processes to distribute the payment, demand payment from the user, and charge the respective system users for the services. This arrangement desirably reduces the load of accounting.

Figure 70:
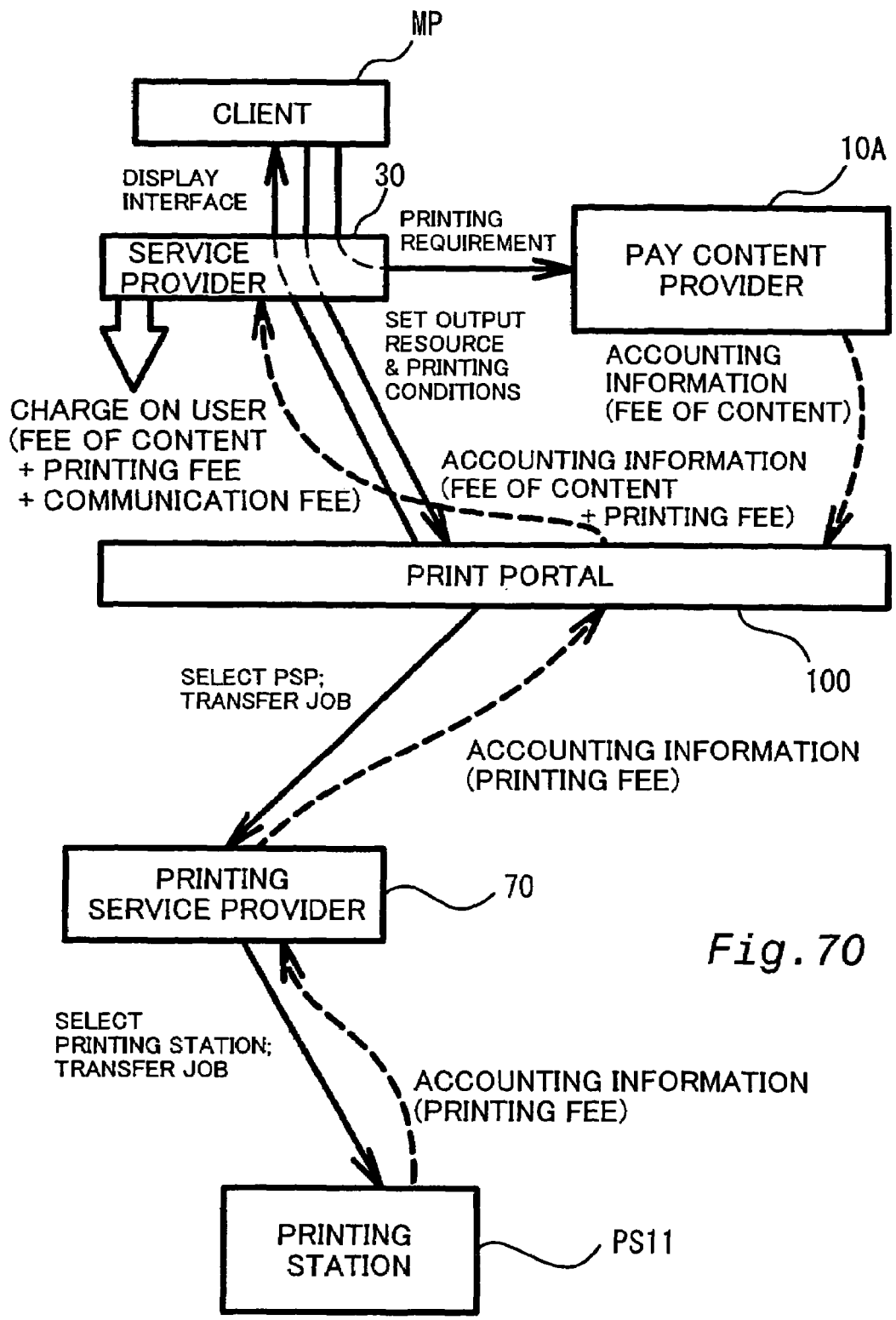
FIG. 70 shows a process of collecting charges at a service provider.

FIG. 70 shows a process of collecting charges at a service provider. A cellular phone as the client MP utilizes a specific service provider 30 to access the Internet. The service provider 30 charges the user of the client MP for the communication. The charges for the services of the print portal system may thus be demanded with the charge for the communication. In the example of FIG. 70, the service provider 30 is explicitly illustrated to clarify the transmission of information. This illustration does not mean the different configuration from those of FIGS. 68 and 69.

The transmission of accounting information until completion of the printing operation follows the process in the system of FIG. 69. Namely accounting information is transmitted from the pay content provider 10A to the print portal 100 in response to a printing requirement and is kept in the print portal 100 until completion of the printing operation. The printing station 70A transmits information on the printing fee to the print portal 100 on completion of the printing operation. The print portal 100 thus collects all the pieces of printing-related accounting information on completion of the printing operation.

In this system, the service provider 30 takes charge of accounting, so that the print portal 100 transmits the accounting information including the fee of the pay content and the printing fee to the service provider 30. The print portal 100 may add the charges for the services of the print portal system to the transmission to the user. Here the total sum of the charges is transmitted to the service provider 30, and transmission of the details of accounting is not required. The service provider 30 charges the user for the total of the communication fee and the total sum transmitted from the print portal 100. The accounting is settled by a specific method, for example, by credit card, by transfer to the bank account, or by cash, according to a contract between the user and the service provider 30.

The service provider 30 distributes a certain amount of money, which is part of the payment from the user and corresponds to the total sum demanded by the print portal 10, to the print portal 100 based on the accounting information transmitted from the print portal 100. The print portal 100 further distributes the payment to the pay content provider 10A and the printing station 70A.

The system of collecting charges at the service provider 30 advantageously has the high certainty. Delinquency in payment for the communication fee of the service provider 30 imposes the significant disadvantages, for example, no use of the cellular phone, on the user. The system of FIG. 70 thus desirably ensures collection of charges demanded by the print portal. The above discussion regards the case in which the cellular phone is used as the client MP. One possible modification uses a carrier of the general communication line or an access service provider, which is utilized for access to the Internet via dialup connection, for the payment collector in place of the service provider 30 in the system of FIG. 70.

The above description omits the charges for the services of the printing service provider. The printing service provider may require each user to pay for the services. In such cases, the print portal 100 may collect the information on the service charges in addition to the other pieces of accounting information and settle the accounting.

The above description also omits a process of collecting charges at the pay content provider 10A. This is because there is a relatively small number of pay content providers 10a and thus little necessity of constructing the system for collecting charges at the pay content provider. As one application of the process of collecting charges at the service provider 30, the pay content provider 10A may collect all the pieces of accounting information and function as the payment collector.

G2. Authentication

Appropriate authentication of each system user is essential for the proper accounting. Many and unspecified users use the print portal system via the network, so that authentication is very important to eliminate illegal uses. The print portal 100 functions as the hub of the system users and thus enables unified authentication.

FIG. 71 shows objects and methods of authentication. The subjects of authentication by the print portal include the user, the content provider, and the printing service provider or the printing station.

Authentication of the user is mainly based on three objects. The first object is to identify the accessed user as a user authorized by the print portal. The print portal system is pay services, so that elimination of illegal accesses is essential for protection of the profits of the print portal business. The print portal utilizes information and equipment owned by third entities for the printing services, and is required to meet user's printing requirements with certainty. From this point of view, adequately handling the potential troubles in printing and definitely rejecting illegal printing requirements are important to assure the benefits of the respective users of the print portal system.

The second object is to identify the accessed user as a user authorized to use pay contents. This is based on the necessity that collection of a content fee should be assured in the case of printing a pay content. The pay content provider allows only contractors to browse information, so that the printing services should be restricted to the users authorized by the pay content provider.

The third object is to assure adequate charging and payment. In the case of an illegal access, the charges for printing may not be paid. The authentication of the user is thus required to avoid such troubles and ensure proper accounting.

Because of such objects, the print portal authenticates the user. The authentication is carried out, for example, by comparing user information collected from the user at the time of a printing requirement with user information registered in advance in the user database 150. The user information may be the user ID and the user password registered in the print portal. When it is highly probable that the client MP is one-to-one mapped to the user, as in the case of the cellular phone, address information for identifying the client MP on communication via the network may be applied for the user information.

The user information may be collected at diverse timings. One applicable procedure collects the user information at the time of an access from the client MP to the print portal 100. The authentication is, however, not restricted to this timing, but may be carried out on completion of the settings of the output resource and the printing conditions.

In the case of a printing requirement from the pay content provider, the pay content provider may have already authenticated the user who desires to browse information. In such cases, the print portal may collect information regarding the authenticated user from the pay content provider, instead of independently carrying out the authentication.

Authentication of the content provider is mainly based on two objects. The first object is to identify the content provider as a legal registrant authorized by the print portal. The content provider provides information that is object to be printed. It is technically possible to make the content provider free without registration into the print portal. In the actual state, however, there are often business-based requirements of restricting the output resource and the maximum number of printing sheets permitted, according to the information to be printed. The print portal should register the content provider, in order to ensure stable management of such requirements. The print portal advantageously provides the content provider with flexible printing environments. Authentication of the legal registrant is required from the business-based viewpoint, that is, to collect the service fees from the content provider.

The second object is to confirm whether the content to be printed is a free content or a pay content. In the case of the pay content provider, specific processing is required to allow only authorized users to print the content and to collect the content fee.

Because of these objects, the print portal authenticates the content provider. The authentication is carried out, for example, by comparing content information collected from the content provider or the user at the time of a printing requirement with information registered in advance in the content provider database 151. The content information may be the URL of the content or the domain name.

The content information may be collected at diverse timings. One applicable procedure collects the content information simultaneously with transmission of print data from the content provider to the print portal 100. The print portal 100 may authenticates the content provider at a timing that does not affect the user interface. For example, the print portal 100 gains access to the content provider and confirms that execution of printing is permitted under the specified settings of printing conditions, while the print portal 100 transfers the print job to the printing service provider on completion of the settings of printing conditions.

Authentication of the printing service provider or the printing station is mainly based on two objects. The first object is to identify the printing service provider or the printing station as a legal registrant of the print portal. The second object is to confirm if the printing service provider or the printing station functions as a payment collector. These lead to assure proper printing operations and adequate accounting. A diversity of procedures may be applied for the authentication. The print portal 100 may directly authenticate the printing station. The hierarchical authentication policy may be adopted; that is, the print portal 100 authenticates the printing service provider, while the printing service provider authenticates the printing station.

The authentication is carried out, for example, by comparing output resource information for identifying the output resource with information registered in advance in the printer database 152. The output resource information may be the IP address used for communication. The authentication may be carried out at diverse timings, for example, at the time of specifying the output resource or at the time of transferring a print job to the printing service provider and the printing station 70A.

The print portal may not carry out the authentication by itself but may entrust any of various authentication services constructed outside the print portal. The system users who are not required for authentication may be excluded from the subjects of authentication by taking into account the objects discussed above.

H. Maintenance and Management of Printers

In the system of this embodiment, the print portal 100 collects information on the working state of each printing station. The print portal may manage and maintain the respective printing stations by taking advantage of this functionality.

Figure 72:
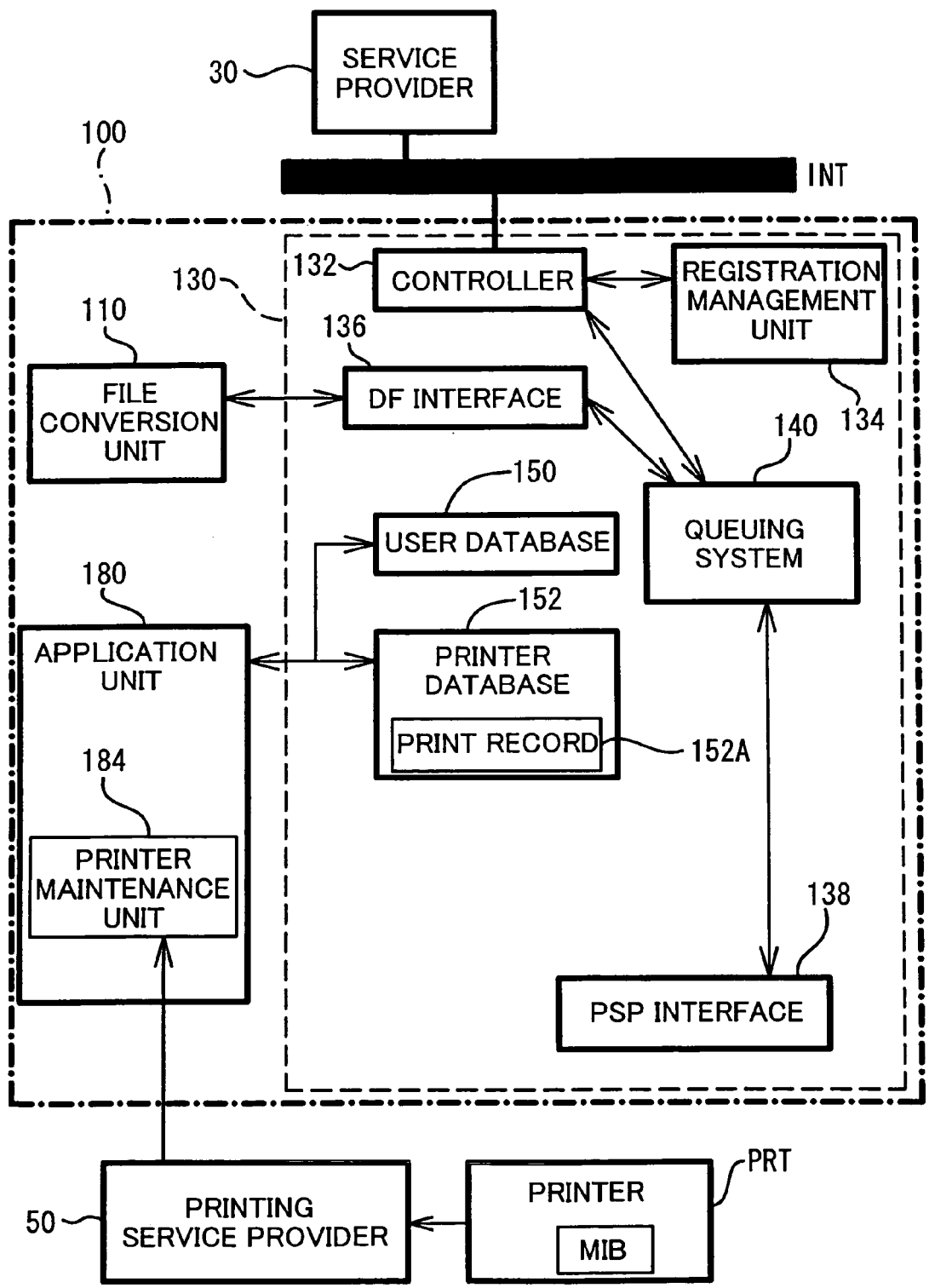
FIG. 72 shows functional blocks to attain the maintenance and management functionality.

FIG. 72 shows functional blocks to attain the maintenance and management functionality. For the purpose of clarity, functional blocks having little relations to this functionality may be omitted from the illustration.

In this embodiment, the application unit 180 includes a printer maintenance unit 184 as a functional block of the maintenance and management functionality. A print record 152A of each printer is stored in the printer database 152.

The printer PRT utilized in this system includes an MIB (Management Information Base). The MIB is a database for storing the status of the printer PRT and reports the remaining quantity of the toner and the loss of the photosensitive drum in response to an external inquiry.

The printer maintenance unit 184 regularly checks the working status of each printer PRT. The check is implemented by, for example, asking the MIB of each printer PRT about the remaining quantities of the expendables via the printing service provider.

In the case where the printer PRT is used exclusively for printing via the print portal, the remaining quantities of the expendables may be estimated from the print record 152A.

In order to relieve the load of checking a large number of printers PRT, one practical procedure selects the printers that require inspection based on the print record 152A and collect their status information via the MIB.

The printer maintenance unit 184 checks the status of each printer PRT and provides maintenance information according to the requirements. The maintenance information includes pieces of information to instruct supplement of the toner and paper and replacement of the photosensitive drum. The maintenance information is preferably given to the printing station or the printing service provider that owns the printer PRT. Required expendables may be ordered simultaneously with issuance of the maintenance information, based on the advanced approval of the printing station or the printing service provider.

I. Mediation Via Single-Layer Server

The above embodiment and examples regard the process of printing information via the double-layer servers, that is, the print portal and the printing service provider. Mediation of printing may be implemented by a single-layer server.

Figure 73:
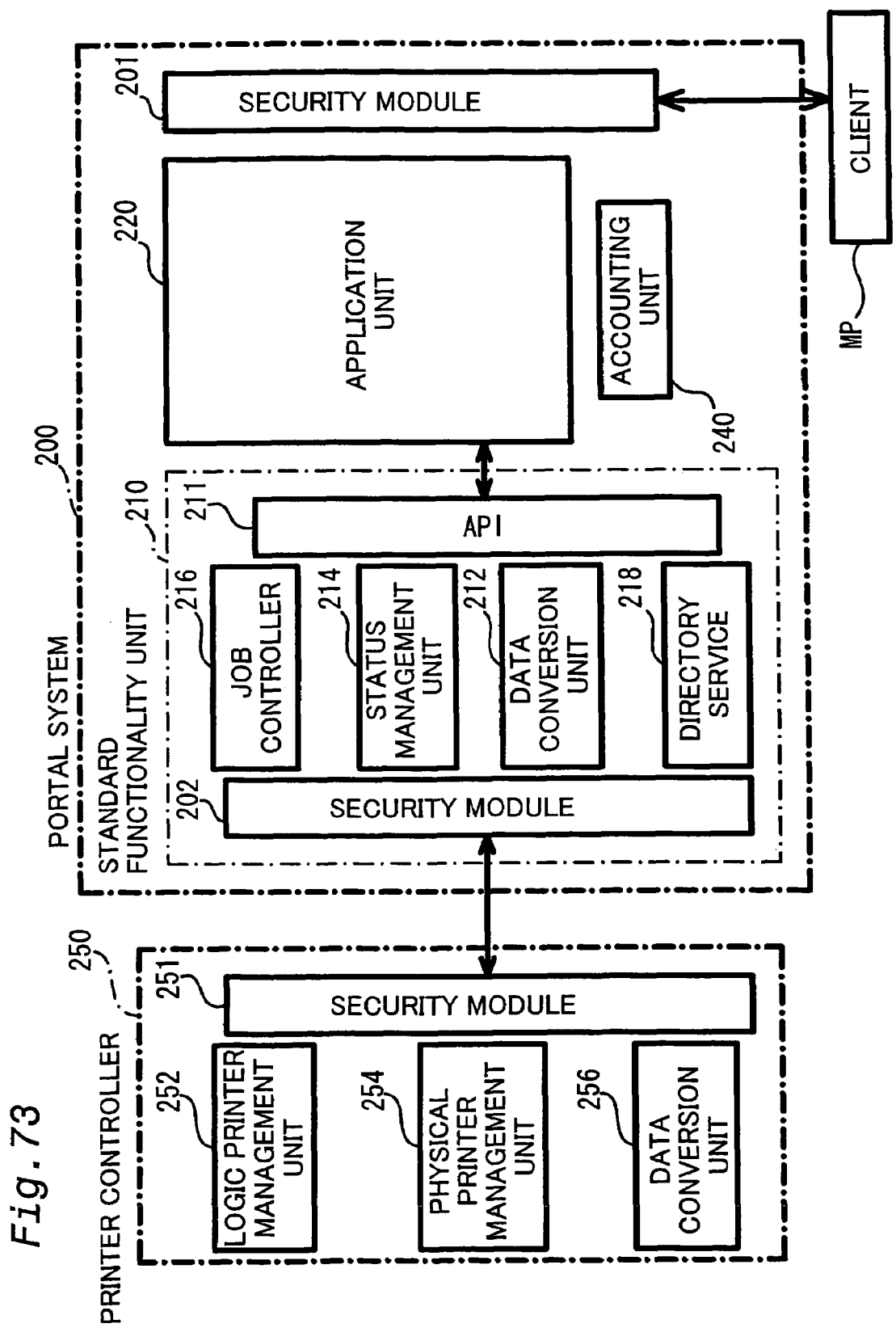
FIG. 73 shows functional blocks to mediate printing via a single-layer server.

FIG. 73 shows functional blocks to mediate printing via a single-layer server. In this configuration, a portal system 200 mediates transmission of print data to a printer controller 250, in response to a printing requirement from the client MP. The portal system 200 exerts combined functions of the print portal and the printing service provider discussed above.

The printer controller 250 functions as a printing station. In this example, the printer controller 250 has the functions of managing several printers connected by a LAN or the like. The printer controller 250 managing several printers also exerts part of the functions of the printing service provider.

The printer controller 250 includes a logic printer management unit 252, a physical printer management unit 254, a data conversion unit 256, and a security module 251. The logic printer management unit 252 manages printers by the unit of executing each print job. For example, when one document is printed with two printers, the two printers constitute one logic printer.

The physical printer management unit 254 functions to manage the working status of each printer, for example, the remaining quantities of toner and paper. The physical printer management unit 254 is provided for each machine of the printer, irrespective of the construction of the logic printer.

The data conversion unit 256 exerts functions corresponding to the printer driver. The data conversion unit 256 converts data transmitted from the portal system 200 to control data intrinsic to the printer, which is the object to be controlled, that is, data representing the dot on-off state in each pixel. The security module 251 functions to encode data and authenticate data transmission, in order to eliminate illegal accesses to the printer controller 250.

The portal system 200 mainly includes a standard functionality unit 210, an application unit 220, an accounting unit 240, and a security module 201. The standard functionality unit 210 exerts the main functions to attain printing via the portal system 200. The standard functionality unit 210 includes a data conversion unit 212, a status management unit 214, a job controller 216, a directory service 218, an API (Application Programming Interface) 211, and a security module 202. The functions of the security modules 201 and 202 are substantially identical with those of the security module 251 in the printer controller 250.

The data conversion unit 212 functions to convert print data specified by the client 5 to a general purpose format, which does not depend upon the model of the printer.

The status management unit 214 functions to monitor the working status of each printer. The working status represents the conditions of each printer intimately related to execution of printing, for example, the remaining quantity of ink or toner and the remaining quantity of printing paper. The object of management is the physical printer. The status management unit 214 carries out such management via communication with the physical printer management unit 254.

The job controller 216 functions to manage print jobs output to the printer controller 250. As discussed previously, the printer as the output resource is designated arbitrarily on the network. The job controller 216 transmits print jobs to the respective output resources and manages a record of the transmission, in response to the designation. In the case where an instruction is given to stop a certain print job or change the print mode in the course of printing, the job controller 216 identifies the printer that has received the print job and outputs the instruction to the identified printer. Like the spooler, the job controller 216 controls execution of print jobs. The difference from the spooler is that the job controller 216 controls not only accumulated print data but transmitted print data.

The directory service 218 functions to manage information for identifying the authenticated users of the portal system 200 and the available printers. The user-related information includes an identification number and a password assigned to each user and information on the address of charging. The printer-related information includes information required for communication with the printer, for example, information for identifying the printer on the network like the URI or the IP address. The printer-related information also includes information on the connection of the printer with the network, such as an exclusive line or dialup connection.

The application unit 220 is a functional block of exerting diverse functions to enhance the utility. For example, the application unit 220 causes a window for specifying the content to be printed and the printer of the output resource to be displayed on the client 5. The displayed window depends upon the type of the client 5; for example, different windows are provided for the computer and the cellular phone. The application unit 220 is the functional block provided individually corresponding to the type of the client and the content to be printed.

The API (Application Programming Interface) 211 is an interface between the application unit 220 and the standard functionality unit 210. The API 211 functions to transfer the individually provided data of the application unit 220 to the standard functionality unit 210 in a specific format. The mediation of the API 211 enables application of a common module to the standard functionality unit 210, while providing diverse application units 220 for each portal system.

The accounting unit 240 takes charge of accounting in the case of printing via the print portal 200. This functional block is provided individually corresponding to the type of the client 5.

The functional blocks of the portal system are not restricted to the configuration of FIG. 2.

Figure 74:
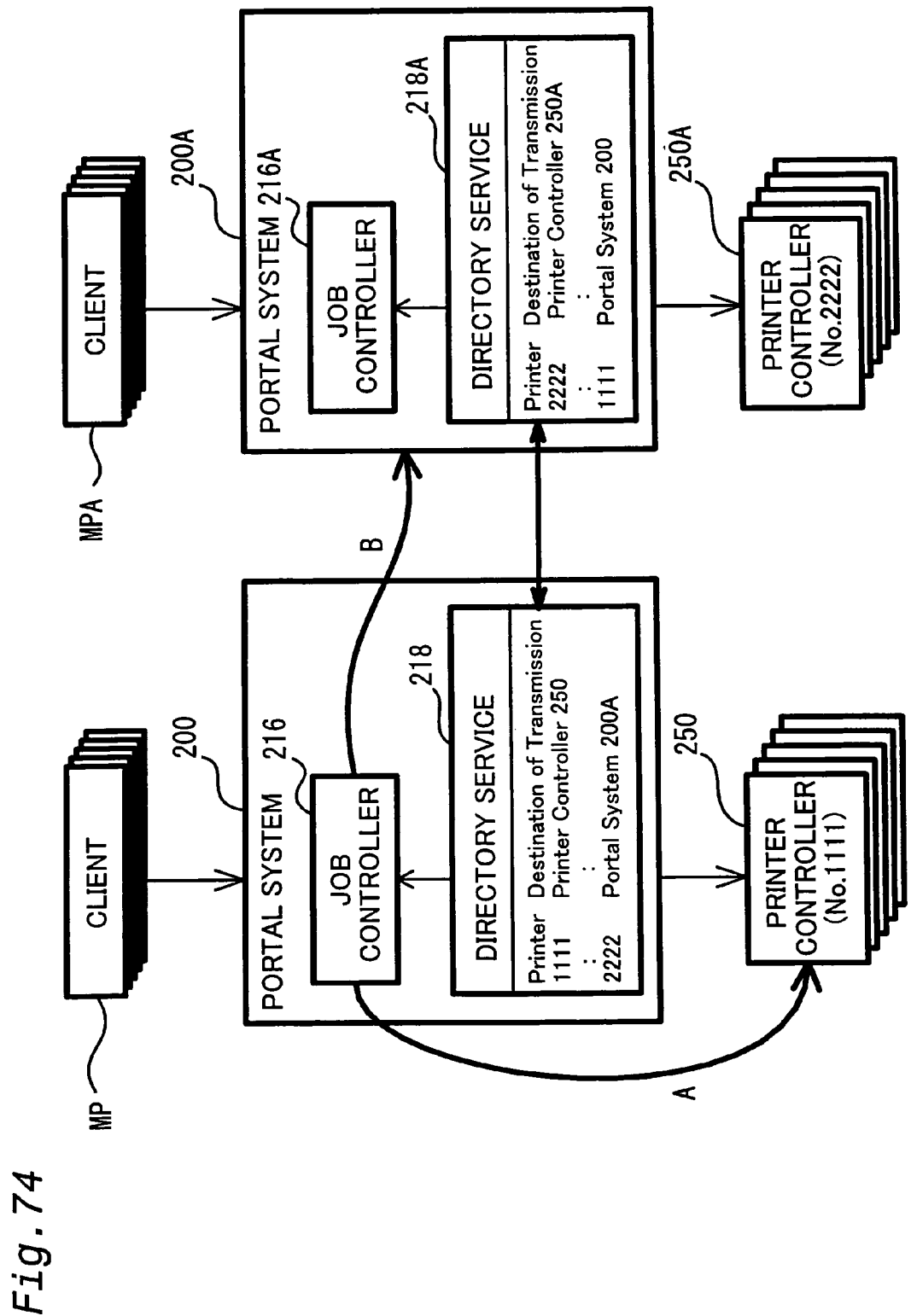
FIG. 74 shows possible extension of the system utilizing the single-layer server.

FIG. 74 shows possible extension of the system utilizing the single-layer server. In this example, two portal systems 200 and 200A are used in a cooperative manner. Multiple clients MP and MPA and multiple printer controllers 250 and 250A are related to the portal systems 200 and 200A.

Directory services 218 and 218A in the respective portal systems manage mapping of the clients to the printer controllers. Exemplified pieces of information managed by the directory services 218 and 218A are shown in the drawing. The directory service 218 maps information for identifying the destination of transmission of print data to the identification number of each printer under management of its own portal system 200 and manages the mapping. For example, the print controller 250 as the destination of transmission of print data is mapped to a printer with an identification number '1111' under management of its own portal system 200. Information for identifying the destination of transmission on the network, for example, the IP address, is registered as the destination of transmission of print data. In a similar manner, the print controller 250A as the destination of transmission of print data is mapped to a printer with an identification number '2222' under management of its own portal system 200A, and the mapping is registered in the directory service 218A.

Each directory service also stores the mapping of printers to the other directory service. For example, the identification number '2222' allocated to the specific printer under management of the cooperative portal system 200A is registered in the directory service 218. The portal system 200A that manages the specific printer is registered as the destination of transmission of print data.

On the contrary, the identification number '1111' allocated to the specific printer under management of the cooperative portal system 200 is registered in the directory service 218A of the other portal system 200A. The portal system 200 that manages the specific printer is registered as the destination of transmission of print data.

The following briefly describes the printing process via the plurality of portal systems in response to a printing requirement from the client MP. In response to a printing requirement that specifies the printer of the identification number '1111' under management of the portal system 200 as the output resource, print data is transmitted to the printer controller 250, based on the information managed by the directory service 218 (see the arrow A in the drawing).

In response to a printing requirement that specifies the printer of the identification number '2222' under management of the cooperative portal system 200A as the output resource, on the other hand, both the portal systems 200 and 200A are used for printing. The job controller 216 in the portal system 200 transfers the printing requirement to the cooperative portal system 200A, based on the information managed by the directory service 218 (see the arrow B in the drawing). The portal system 200A receives the transferred printing requirement and causes the printer controller 250A to execute the printing operation. The PDF conversion may be performed in either of the portal systems 200 and 200A.

A printing requirement from the client MPA is treated in a similar manner. In the case where the printer under management of the portal system 200A is designated as the output resource, the portal system 200A transmits print data to the printer controller 250A. In the case where the printer under management of the cooperative portal system 200 is designated as the output resource, the portal system 200A transfers the printing requirement to the portal system 200.

The above description regards cooperation of two portal systems. Storage of management information in the directory service enables cooperation of three or more portal systems. The portal systems 200 and 200A may be cooperated in a single direction, instead of the interactive manner. For example, the directory service 218 stores information of printers under management of the portal system 200A, whereas the directory service 281A does not store information of printers under management of the portal system 200. In this configuration, the clients MP can use all the printers under management of either the portal system 200 or the portal system 200A, whereas the clients MPA can use only the printers under management of the portal system 200A. The system of FIG. 73 enables construction of such unbalanced cooperation.

INDUSTRIAL APPLICABILITY

The present invention provides a technique of intermediating between multiple content provider servers and multiple printing apparatuses to execute a printing operation in response to an instruction from a client connected to a network.

What is claimed is:

1. A print portal system intermediating between a client and multiple printing apparatuses so as to execute a printing operation of contents data provided by a content provider, wherein the client, the multiple printing apparatuses and the content provider are connected to a network, the print portal system comprising:
   an upper-layer portal server that:
   receives a print job from the client via the network, the print job including address information for specifying an address of the contents data on the network, and output resource information for specifying the printing apparatus as an output resource; and
   fetches the contents data from the content provider via the network based on the received address information; and
   multiple lower-layer portal servers that:
   communicate directly with at least one of the multiple printing apparatuses; and
   receive the fetched contents data and the output resource information from the upper-layer portal server and transfer the received fetched contents data to the printing apparatus specified by the received output resource information when the printing apparatus specified by the received output resource information is the printing apparatus communicating directly with the lower-layer portal server,
   wherein the upper-layer portal server further comprises:
   a restriction database module for storing restriction information for restricting a transfer of the fetched contents data to the lower-layer portal server according to the relation between the multiple printing apparatuses and at least one of the client and the contents data;
   a determination module that determines, based on the stored restriction information and when the print job is received from the client, whether or not the transfer of the fetched contents data and the output resource information to the lower-layer portal server is to be executed;
   a change request module that requests the client to change the output resource information when the determination module determines that the transfer of the fetched contents data and the output resource information to the lower-layer portal server is not to be executed;
   an upper-layer portal module that transfers the fetched contents data and the output resource information to the lower-layer portal server when the determination module determines that the transfer of the fetched contents data to the lower-layer portal server is to be executed; and
   a restriction customization module that accepts registration of the restriction information to the restriction database module from at least one of the client, the content provider and the multiple printing apparatuses.

2. The print portal system according to claim 1, wherein the upper-layer portal server further comprises an interface providing module that provides the client with an interface for receiving a printing condition for printing the contents data, wherein the interface is formed in a unified format independent of the contents data and the multiple lower-layer portal servers.

3. The print portal system according to claim 2, wherein the interface providing module comprises: an interface database module for storing interface contents displayed in the interface according to relation to the client; an interface customization module that accepts registration of the interface contents to the interface database from the client; and an interface control module that reflects the stored interface contents to the provided interface.

4. The print portal system according to claim 2, wherein the interface providing module comprises: a condition presentation module that presents the client with an option for selecting the output resource from the multiple printing apparatuses; an input module that accepts a selection result based on the presented option from the client; a search module that searches a printing apparatus adapting to the accepted selection result from the multiple printing apparatuses; and a printer presentation module that presents the client with the searched printing apparatus.

5. The print portal system according to claim 1, wherein the upper-layer portal server further comprises an authentication module that authenticates at least one of the client, the lower-layer portal server, the content provider, and the printing apparatus, when the printing operation is intermediated.

6. The print portal system according to claim 1, wherein: a connection between the client and the network is executed via a carrier system that provides the client with a connection environment to the network; and the upper-layer portal server further comprises a charging receiving module that receives, with data communication of the intermediated printing operation, charging information for specifying cost imposed on a user of the client for at least one of the lower-layer portal server, the printing apparatus, the content provider and the carrier system.

7. The print portal system according to claim 6, wherein the upper-layer portal server further comprises a charging sending module that sends, with data communication of the intermediated printing operation, the received charging information to at least one of the lower-layer portal server, the printing apparatus, the content provider and the carrier system.

8. An upper-layer portal server managing multiple lower-layer portal servers to intermediate between a client and multiple printing apparatuses so as to execute a printing operation of contents data provided by a content provider, wherein the client, the multiple printing apparatuses and the content provider are connected to a network, and each of the multiple lower-layer portal servers communicates directly with at least one of the multiple printing apparatuses, the upper-layer portal server comprising:

a job receiving module that receives a print job from the client via the network, the print job including address information for specifying an address of the contents data on the network, and output resource information for specifying the printing apparatus as an output resource;

a contents fetching module that fetches the contents data from the content provider via the network based on the received address information;

a transfer module that transfers the received output resource information and the fetched contents data to a lower-layer portal server communicating directly with the printing apparatus specified by the received output resource information;

a restriction database module for storing restriction information for restricting a transfer of the fetched contents data to the lower-layer portal server according to the relation between the multiple printing apparatuses and at least one of the client and the contents data;

a determination module that determines, based on the stored restriction information and when the print job is received from the client, whether or not the transfer of the fetched contents data and the output resource information to the lower-layer portal server is to be executed;

a change request module that requests the client to change the output resource information when the determination module determines that the transfer of the fetched contents data and the output resource information to the lower-layer portal server is not to be executed; and an upper-layer portal module that transfers the fetched contents data and the output resource information to the lower-layer portal server when the determination module determines that the transfer of the fetched contents data to the lower-layer portal server is to be executed; and a restriction customization module that accepts registration of the restriction information to the restriction database module from at least one of the client, the content provider and the multiple printing apparatuses.

9. A method for intermediating between a client and multiple printing apparatuses so as to execute a printing operation of contents data provided by a content provider, wherein the client, the multiple printing apparatuses and the content provider are connected to a network, the method comprising:

providing an upper-layer portal server that:

receives a print job from the client via the network, the print job including address information for specifying an address of the contents data on the network, and output resource information for specifying the printing apparatus as an output resource; and fetches the contents data from the content provider via the network based on the received address information;

providing multiple lower-layer portal servers that:

communicates directly with at least one of the multiple printing apparatuses; and receives the fetched contents data and the received output resource information from the upper-layer portal server and transfer the received fetched contents data to the printing apparatus specified by the received output resource information when the printing apparatus specified by the received output resource information is the printing apparatus communicating directly with the lower-layer portal server;

managing, by the upper-layer portal server, restriction information f or restricting a transfer of the fetched contents data to the lower-layer portal server according to relation between the multiple printing apparatuses and at least one of the client and the contents data;

determining, by the upper-layer portal server, based on the managed restriction information and when the print job is received from the client, whether or not the transfer of the fetched contents data and the output resource information to the lower-layer portal server is to be executed;

requesting the client to change the output resource information when the determination module determines that the transfer of the fetched contents data and the output resource information to the lower-layer portal server is not to be executed;

transferring the fetched contents data and the output resource information to the lower-layer portal server when the determination module determines that the transfer of the fetched contents data to the lower-layer portal server is to be executed; and accepting registration of the restriction information from at least one of the client, the content provider and the multiple printing apparatuses.

* * * * *